(12) United States Patent
Jin et al.

(10) Patent No.: US 11,564,229 B2
(45) Date of Patent: Jan. 24, 2023

(54) METHODS AND APPARATUS FOR RELATED TO A TRANSMISSION AND RECEPTION POINT

(71) Applicant: Samsung Electronics Co., Ltd., Suwon-si (KR)

(72) Inventors: Seungri Jin, Suwon-si (KR); Anil Agiwal, Suwon-si (KR); Hoondong Noh, Suwon-si (KR); Jinhyun Park, Suwon-si (KR); Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 17/034,623

(22) Filed: Sep. 28, 2020

(65) Prior Publication Data

US 2021/0105780 A1    Apr. 8, 2021

(30) Foreign Application Priority Data

Oct. 2, 2019 (KR) .......................... 10-2019-0122346
Nov. 7, 2019 (KR) .......................... 10-2019-0141767

(51) Int. Cl.
*H04W 72/04* (2009.01)
*H04W 76/27* (2018.01)
(Continued)

(52) U.S. Cl.
CPC ...... *H04W 72/0493* (2013.01); *H04B 7/0413* (2013.01); *H04L 5/001* (2013.01);
(Continued)

(58) Field of Classification Search
CPC .......... H04W 72/0493; H04W 72/042; H04W 72/0453; H04W 76/27; H04W 80/02;
(Continued)

(56) References Cited

U.S. PATENT DOCUMENTS

2019/0297603 A1    9/2019  Guo et al.
2021/0084625 A1*   3/2021  Ryu .................. H04W 56/0005
(Continued)

OTHER PUBLICATIONS

Samsung, Support of Multiple Beam Indication for MultipleTRPs, 3GPP TSG-RAN WG2 Meeting #107, R2-1911359, Aug. 16, 2019, XP051769116, Prague, Czech Republic.
(Continued)

*Primary Examiner* — Omar J Ghowrwal
(74) *Attorney, Agent, or Firm* — Jefferson IP Law, LLP

(57) ABSTRACT

A communication method and a system for converging a 5th-Generation (5G) communication system for supporting higher data rates beyond a 4th-Generation (4G) system with a technology for Internet of Things (IoT) are provided. The disclosure may be applied to intelligent services based on the 5G communication technology and the IoT-related technology, such as smart home, smart building, smart city, smart car, connected car, health care, digital education, smart retail, security and safety services. The disclosure discloses a method and apparatus for supporting transmission and reception to a plurality of TRPs, and a method and apparatus for updating PDSCH beam information of several serving cells together in a CA situation.

8 Claims, 35 Drawing Sheets

(51) Int. Cl.
    *H04W 80/02* (2009.01)
    *H04L 5/00* (2006.01)
    *H04W 72/12* (2009.01)
    *H04B 7/0413* (2017.01)
    *H04B 7/06* (2006.01)

(52) U.S. Cl.
    CPC .......... *H04L 5/0044* (2013.01); *H04L 5/0053* (2013.01); *H04W 72/042* (2013.01); *H04W 72/0453* (2013.01); *H04W 72/1273* (2013.01); *H04W 72/1289* (2013.01); *H04W 76/27* (2018.02); *H04W 80/02* (2013.01); *H04B 7/0639* (2013.01); *H04B 7/0695* (2013.01)

(58) Field of Classification Search
    CPC ............. H04W 7/0639; H04W 7/0695; H04W 5/0044; H04W 5/001; H04W 5/0053; H04W 5/0098
    See application file for complete search history.

(56) References Cited

U.S. PATENT DOCUMENTS

2021/0376897 A1* 12/2021 Park ........................ H04B 7/024
2022/0078828 A1*  3/2022 Takeda ................ H04W 72/042

OTHER PUBLICATIONS

Samsung, MAC CE design for support of multiple beam indication for multiple TRPs, 3GPP TSG-RAN WG2 Meeting #107, R2-1911360, Aug. 16, 2019, XP051769117, Prague, Czech Republic.
Asustek, Enhancements on multiple TRP or panel transmission, 3GPP TSG RAN WG1 #97, R1-1907443, May 13, 2019, XP051728875, Reno, USA.
European Search Report dated Dec. 1, 2021, issued in European Application No. 20871624.1.
ZTE, "Further details on multi-beam/TRP operation", R1-1908194, 3GPP TSG RAN WG1 Meeting #98, Prague, Czech, Aug. 17, 2019.
Qualcomm Incorporated, "Enhancement TCI States Activation/Deactivation PDSCH MAC CE for Multi-TRP", R2-1911375, 3GPP TSG RAN WG2 Meeting #107, Prague, Czech, Aug. 16, 2019.
ZTE et al., "Consideration on Enhancement of TCI-State MAC CE for Multi-TRP transmission", R2-1910401, 3GPP TSG RAN WG2 Meeting #107, Prague, Czech, Aug. 16, 2019.
NTT Docomo, Inc., "Enhancements on Multi-TRP/panel transmission", R1-1909201, 3GPP TSG RAN WG1 Meeting #98, Aug. 17, 2019.
International Search Report dated Dec. 30, 2020, issued in International Application No. PCT/KR2020/013268.

* cited by examiner

FIG. 1H
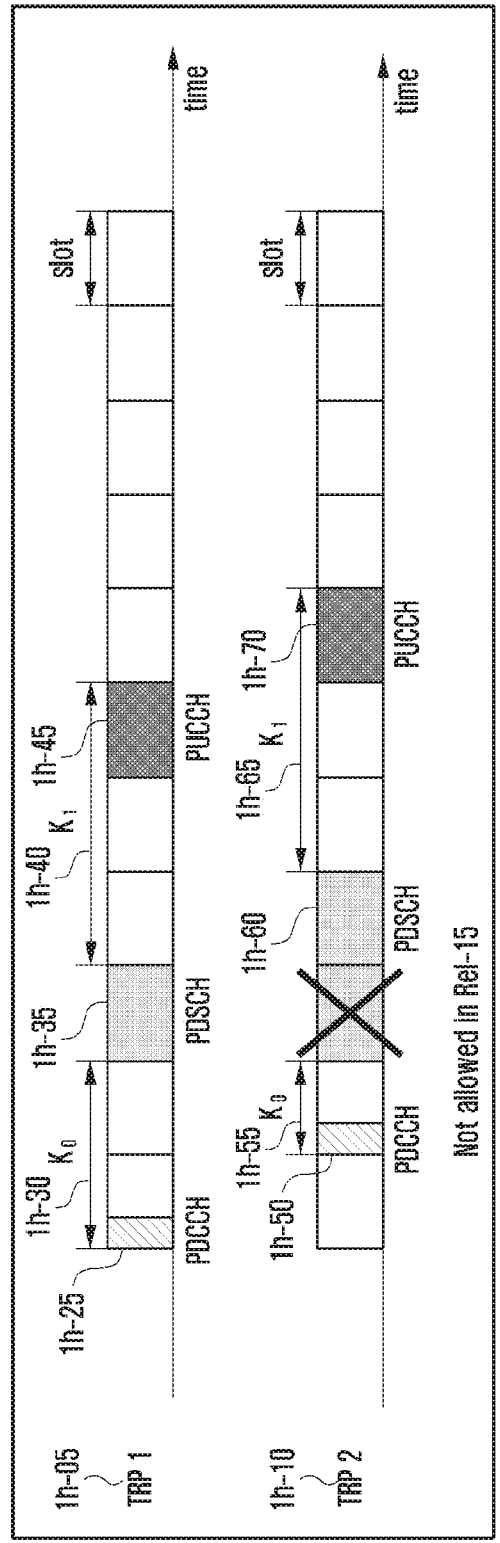
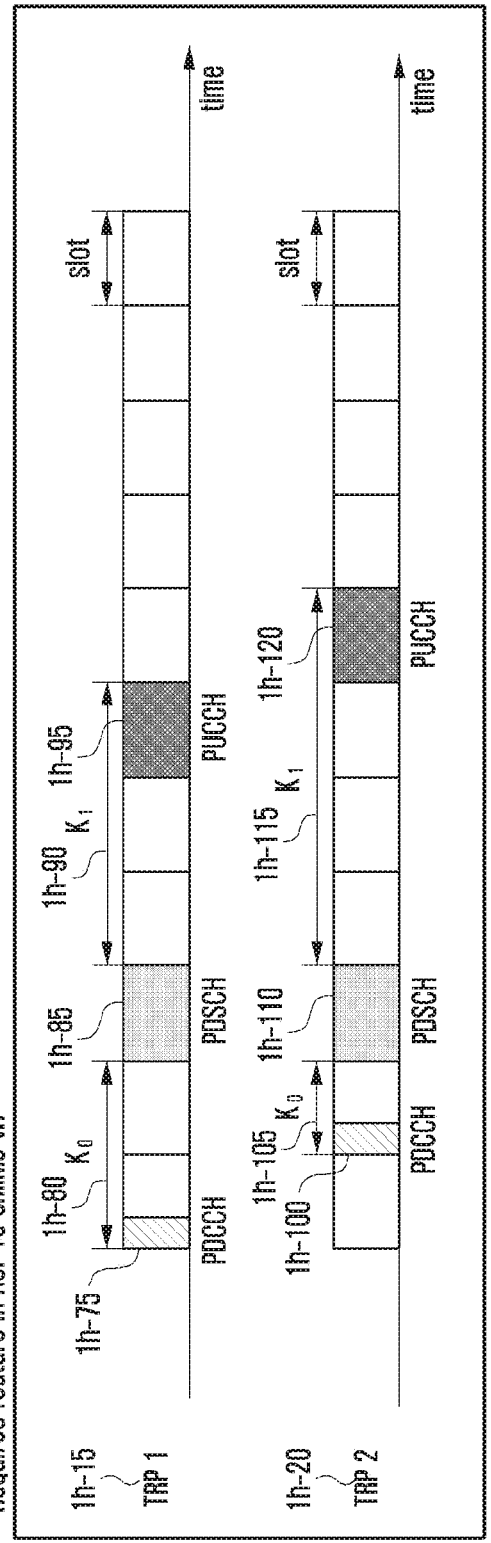

FIG. 1IB

B. New MAC CE format of TCI state indication for PDCCH for multi TRP : Introduce a new LCID for TRP2

< Option 1: Extend CORESET ID from 4 bits to 5 bits >

< Option 2: Introduce a new LCID for TRP2 and use same format of legacy MAC CE >

< Option 3-1: Assign a separate serving cell ID for TRP2, and use same format of legacy MAC CE >

< Option 3-2: Assign a separate serving cell ID for TRP2, and increase 1 bits of serving cell ID >

< Option 3-2: Assign a separate serving cell ID for TRP2, increase 1 bits of serving cell ID and CORESET ID >

FIG. 1JA

A. Legacy MAC CE format of TCI state Activation/deactivation for PDSCH

| R | Serving Cell ID | BWP ID | Oct 1 |
|---|---|---|---|
| $T_7$ | $T_6$ $T_5$ $T_4$ $T_3$ $T_2$ $T_1$ | $T_0$ | Oct 2 |
| $T_{15}$ | $T_{14}$ $T_{13}$ $T_{12}$ $T_{11}$ $T_{10}$ $T_9$ | $T_8$ | Oct 3 |
| ... | | | |
| $T_{(N-2)\times 8+7}$ | $T_{(N-2)\times 8+6}$ $T_{(N-2)\times 8+5}$ $T_{(N-2)\times 8+4}$ $T_{(N-2)\times 8+3}$ $T_{(N-2)\times 8+2}$ $T_{(N-2)\times 8+1}$ | $T_{(N-2)\times 8}$ | Oct N |

B. Use same MAC CE format and NW just allocate beams for both TRP1 and TRP2

| R | Serving Cell ID | BWP ID | Oct 1 |
|---|---|---|---|
| $T_7$ | $T_6$ $T_5$ $T_4$ $T_3$ $T_2$ $T_1$ | $T_0$ | Oct 2 |
| $T_{15}$ | $T_{14}$ $T_{13}$ $T_{12}$ $T_{11}$ $T_{10}$ $T_9$ | $T_8$ | Oct 3 |
| ... | | | |
| $T_{(N-2)\times 8+7}$ | $T_{(N-2)\times 8+6}$ $T_{(N-2)\times 8+5}$ $T_{(N-2)\times 8+4}$ $T_{(N-2)\times 8+3}$ $T_{(N-2)\times 8+2}$ $T_{(N-2)\times 8+1}$ | $T_{(N-2)\times 8}$ | Oct N |

C. Independent MAC CE can select the candidate TCI-states for PDSCH of TRP2

| I | Serving Cell ID | BWP ID | Oct 1 |
|---|---|---|---|
| $T_7$ | $T_6$ $T_5$ $T_4$ $T_3$ $T_2$ $T_1$ | $T_0$ | Oct 2 |
| $T_{15}$ | $T_{14}$ $T_{13}$ $T_{12}$ $T_{11}$ $T_{10}$ $T_9$ | $T_8$ | Oct 3 |
| ... | | | |
| $T_{(N-2)\times 8+7}$ | $T_{(N-2)\times 8+6}$ $T_{(N-2)\times 8+5}$ $T_{(N-2)\times 8+4}$ $T_{(N-2)\times 8+3}$ $T_{(N-2)\times 8+2}$ $T_{(N-2)\times 8+1}$ | $T_{(N-2)\times 8}$ | Oct N |

< Option 1: use same LCID but change R bit to indicator of TRP2 >

FIG. 1JB

| I | Serving Cell ID | BWP ID | Oct 1 |
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N-1 |
| R | R | R | R | R | TRP ID | | | Oct N |

< Option 2: Change R bit to indicator of extension of MAC CE (add TRP id: for future release) >

| R | Serving Cell ID | BWP ID | Oct 1 |
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

< Option 3: Introduce new LCID for TRP2 and use the same format of MAC CE >

| R | Serving Cell ID | BWP ID | Oct 1 |
| R | R | R | R | R | TRP ID | | | Oct 2 |
| $T_7$ | $T_6$ | $T_5$ | $T_4$ | $T_3$ | $T_2$ | $T_1$ | $T_0$ | Oct 3 |
| $T_{15}$ | $T_{14}$ | $T_{13}$ | $T_{12}$ | $T_{11}$ | $T_{10}$ | $T_9$ | $T_8$ | Oct 4 |

...

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

< Option 4: Introduce the new MAC CE and new LCID for TRP2 >

A. Legacy MAC CE format of PUCCH spatial relation Activation/Deactivation

FIG. 1LB
B. Two independent MAC CEs for PUCCH spatial relations can be activated
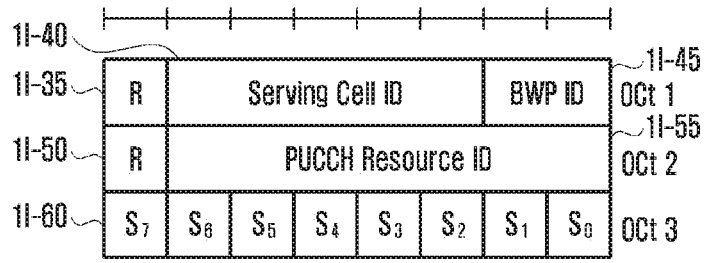
< Option 1: No MAC CE change, and use legacy field by implementation >
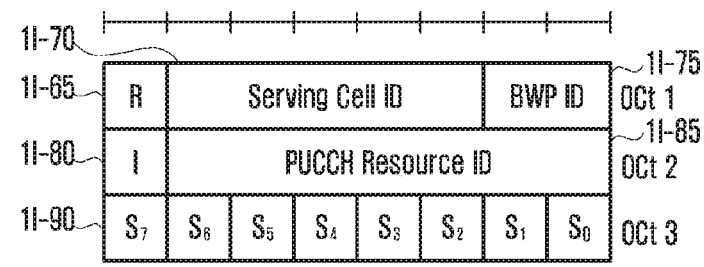
< Option 2: change R bit to indicator for TRP2 >
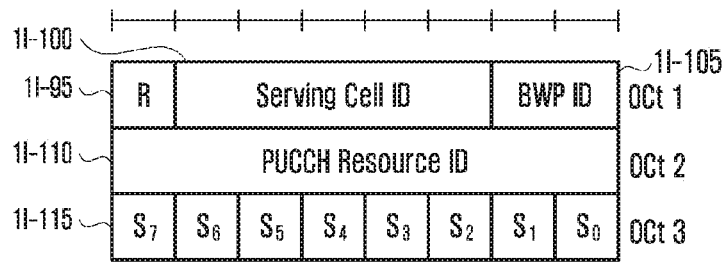
< Option 3: Distinguished by extended PUCCH resource ID >
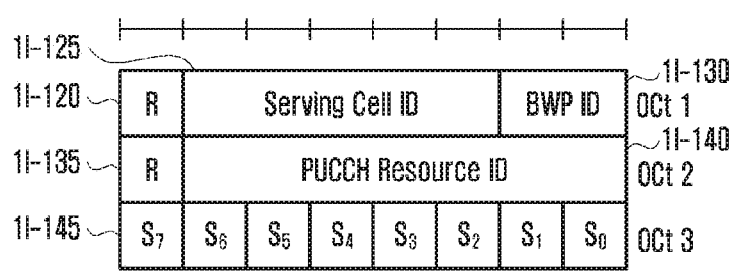
< Option 4: Introduce the new LCID and use same MAC CE format >
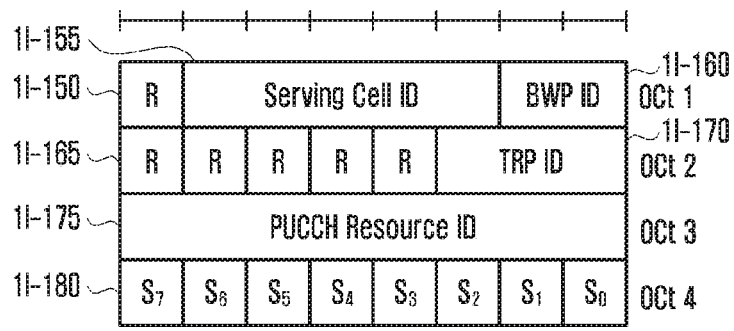
< Option 5: Introduce the new LCID and MAC CE format With TRP ID >

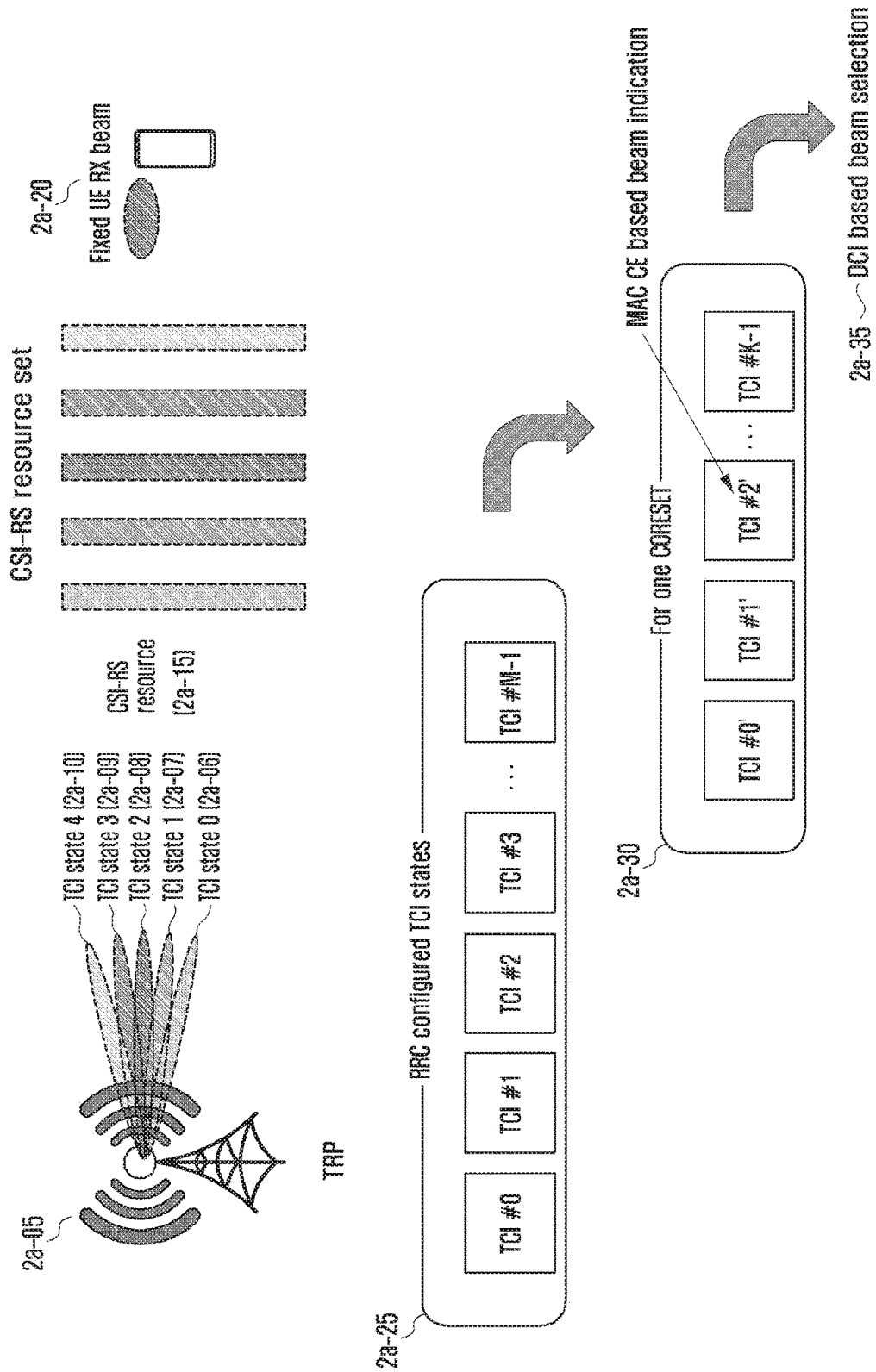

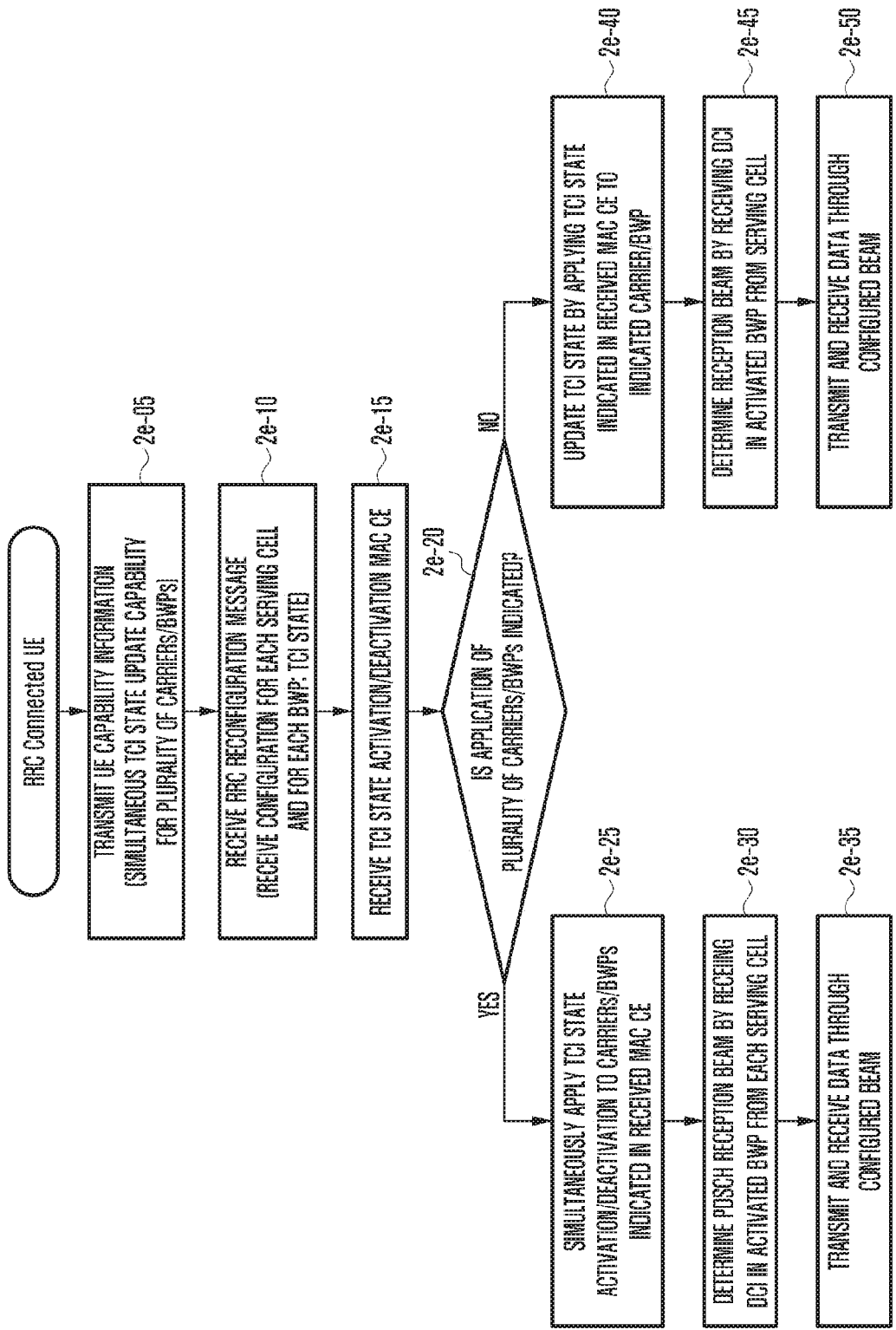

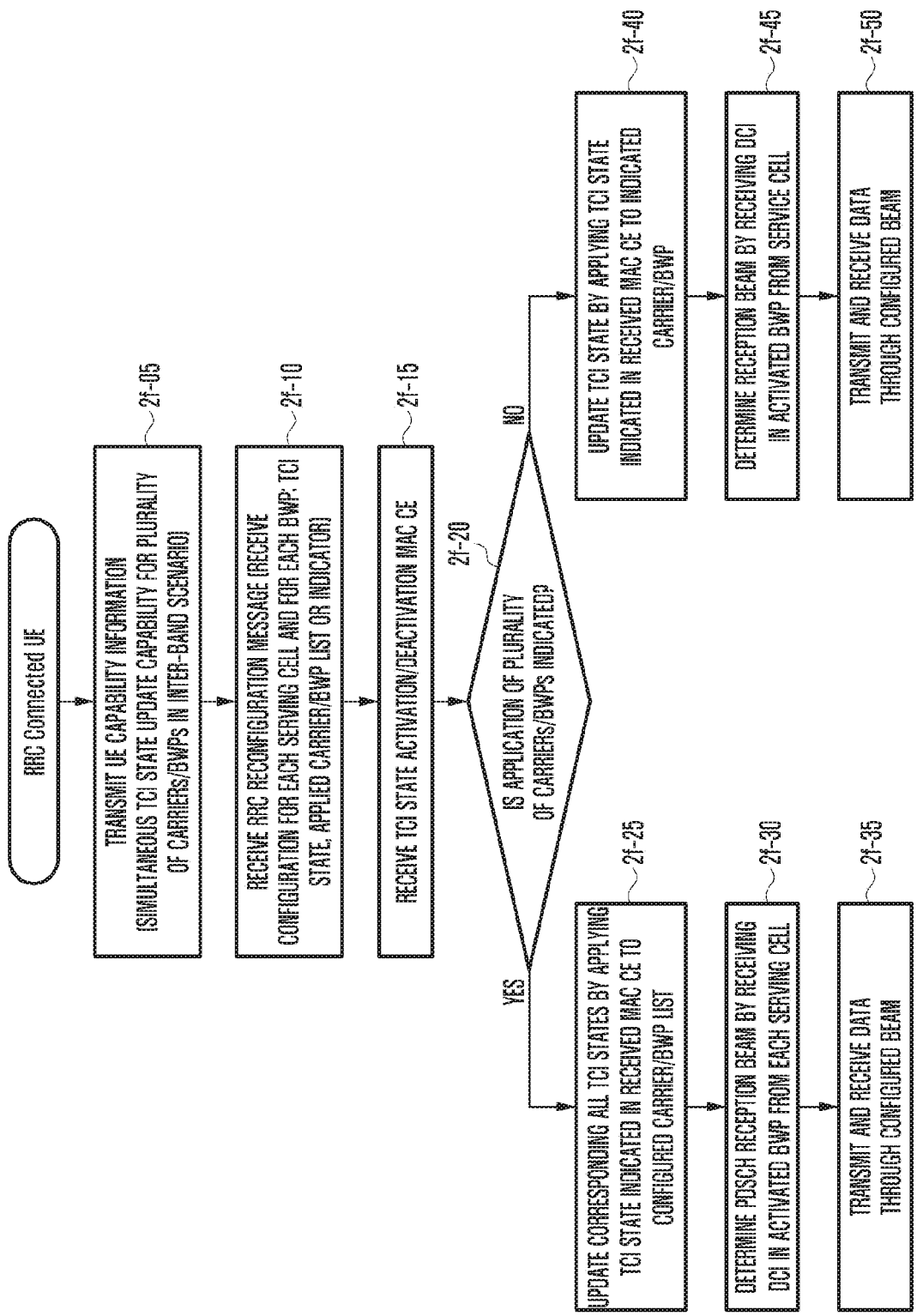

FIG. 2HA

A. Legacy MAC CE format of TCI states activation/deactivation for PDSCH

| | | | | | | | | |
|---|---|---|---|---|---|---|---|---|
| 2h-05 | R | \multicolumn{5}{c}{Serving Cell ID} | BWP ID | | Oct 1 |
| 2h-20 | $T_7$ | $T_6$ | $T_5$ | $T_4$ | $T_3$ | $T_2$ | $T_1$ | $T_0$ | Oct 2 |
| | $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N | with 2h-10 pointing to Serving Cell ID and 2h-15 pointing to BWP ID.

METHODS AND APPARATUS FOR RELATED TO A TRANSMISSION AND RECEPTION POINT

CROSS-REFERENCE TO RELATED APPLICATION(S)

This application is based on and claims priority under 35 U.S.C. § 119(a) of a Korean patent application number 10-2019-0122346, filed on Oct. 2, 2019, in the Korean Intellectual Property Office, and of a Korean patent application number 10-2019-0141767, filed on Nov. 7, 2019, in the Korean Intellectual Property Office, the disclosure of each of which is incorporated by reference herein in its entirety.

BACKGROUND

1 Field

The disclosure relates to a next-generation mobile communication system. More particularly, the disclosure relates to a method and apparatus for supporting simultaneous transmission and reception to a plurality of transmission and reception points (TRPs) in a next-generation mobile communication system.

2 Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post long term evolution (LTE) System'. The 5G communication system defined by 3rd generation partnership project (3GPP) is called the New Radio (NR) system. The 5G communication system defined by 3GPP is called the New Radio (NR) system.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques have been discussed and adopted in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, with the recent development of communication systems, research on communication methods based on a plurality of transmission and reception points (TRPs) has been actively conducted, and improvements of such communication methods are being made.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method in which a terminal performs data transmission and reception to and from a plurality of (or dual) transmission reception points (TRPs) through the reception of a plurality of (or dual) physical downlink control channels (PDCCHs) in a next-generation mobile communication system using beams. To this end, multiple input multiple output (MIMO) capability of the terminal is utilized, and a base station performs data transmission and reception to and from the corresponding terminal through a dual TRP configured in a cell or in an adjacent cell.

In addition, in relation to an operation of configuring and activating beam information (e.g., a transmission configuration indication (TCI) state) used by a terminal to receive a physical downlink shared channel (PDSCH) in the next-generation mobile communication system using beams, in general, only beam (or TCI state) activation/deactivation for a specific bandwidth part (BWP) in one serving cell is possible. Accordingly, in a state in which carrier aggregation (CA) is applied, in order to update beam configuration for a plurality of carriers and the BWP, several activation/deactivation indication operations are required to be sequentially repeated. Another aspect of the disclosure is to provide a method for solving the delay and signaling overhead due thereto.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving a radio resource control (RRC) message configuring a plurality of transmission configuration indicator (TCI) states associated with a physical downlink shared channel (PDSCH), receiving a medium access control (MAC) control element (CE) activating at least one TCI state for a bandwidth part (BWP) of a serving cell among the plurality of TCI states, wherein the MAC CE includes information indicating that the at least one TCI state is for a transmission and reception point (TRP) of a first TRP or a second TRP, receiving, from the TRP, downlink control information (DCI) scheduling a PDSCH, the DCI including TCI information indicating a TCI state for the PDSCH from the at least one TCI state, and receiving, from the TRP, the PDSCH scheduled by the DCI based on the TCI state indicated by the TCI information.

The information may include 1 bit corresponding to the first TRP or the second TRP.

The RRC message may further configure a control resource set (CORESET) for the BWP of the serving cell with an index for the CORESET.

The TRP may be identified by the information from the first TRP or the second TRP, based on the index.

PDSCHs scheduled by a first physical downlink control channel (PDCCH) from the first TRP and a second PDCCH from the second TRP may overlap in time and frequency domain.

In accordance with another aspect of the disclosure, a method performed by a transmission and reception point (TRP) in a wireless communication system is provided. The method includes transmitting, to a terminal, a radio resource control (RRC) message configuring a plurality of transmission configuration indicator (TCI) states associated with a physical downlink shared channel (PDSCH), transmitting, to the terminal, a medium access control (MAC) control element (CE) activating at least one TCI state for a bandwidth part (BWP) of a serving cell among the plurality of TCI states, wherein the MAC CE includes information indicating that the at least one TCI state is for the TRP of a first TRP or a second TRP, transmitting, to the terminal, downlink control information (DCI) scheduling a PDSCH, the DCI including TCI information indicating a TCI state for the PDSCH from the at least one TCI state, and transmitting, to the terminal, the PDSCH scheduled by the DCI based on the TCI state indicated by the TCI information.

In accordance with another aspect of the disclosure, a terminal in a wireless communication system is provided. The terminal includes a transceiver configured to transmit and receive a signal, and a controller configured to receive a radio resource control (RRC) message configuring a plurality of transmission configuration indicator (TCI) states associated with a physical downlink shared channel (PDSCH), receive a medium access control (MAC) control element (CE) activating at least one TCI state for a bandwidth part (BWP) of a serving cell among the plurality of TCI states, wherein the MAC CE includes information indicating that the at least one TCI state is for a transmission and reception point (TRP) of a first TRP or a second TRP, receive, from the TRP, downlink control information (DCI) scheduling a PDSCH, the DCI including TCI information indicating a TCI state for the PDSCH from the at least one TCI state, and receive, from the TRP, the PDSCH scheduled by the DCI based on the TCI state indicated by the TCI information.

In accordance with another aspect of the disclosure, a transmission and reception point (TRP) in a wireless communication system is provided. The transmission and TRP includes a transceiver configured to transmit and receive a signal, and a controller configured to transmit, to a terminal, a radio resource control (RRC) message configuring a plurality of transmission configuration indicator (TCI) states associated with a physical downlink shared channel (PDSCH), transmit, to the terminal, a medium access control (MAC) control element (CE) activating at least one TCI state for a bandwidth part (BWP) of a serving cell among the plurality of TCI states, wherein the MAC CE includes information indicating that the at least one TCI state is for the TRP of a first TRP or a second TRP, transmit, to the terminal, downlink control information (DCI) scheduling a PDSCH, the DCI including TCI information indicating a TCI state for the PDSCH from the at least one TCI state, and transmit, to the terminal, the PDSCH scheduled by the DCI based on the TCI state indicated by the TCI information.

According to embodiments of the disclosure, a method in which a terminal performs data transmission and reception to and from a plurality of (or dual) TRPs through the reception of a plurality of (or dual) PDCCHs in a beam-based communication system can be improved. In addition, a method in which a base station performs data transmission and reception to and from a terminal through a dual TRP configured in a cell or in an adjacent cell by utilizing MIMO capability of the terminal can be improved.

According to another embodiment of the disclosure, in a next-generation mobile communication system, it is possible to simultaneously update beam information applied to the reception of a plurality of serving cells and a PDSCH configured in a BWP of a corresponding cell in a state in which CA is configured, thereby reducing a delay time to which the corresponding configuration is applied and reducing signaling overhead for this.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1H is a diagram illustrating a method of enabling the reception of a physical downlink shared channel (PDSCH) from each of multiple TRPs configured in an NR system according to an embodiment of the disclosure in the same time unit (e.g., slot or symbol);

FIGS. 1JA and 1JB are diagrams illustrating an overall effect on a PDSCH transmitted from a plurality of TRPs, a method of activating a downlink candidate beam group, and a MAC CE structure according to various embodiments of the disclosure;

FIG. 1O is a diagram illustrating an overall operation of an eNB according to an embodiment of the disclosure;

FIG. 2A is a diagram illustrating a method of enabling PUCCH transmission to each of multiple TRPs configured in an NR system according to an embodiment of the disclosure;

FIG. 2E is a diagram illustrating a method 2-2 of simultaneously updating a TCI state in all configured carriers and BWPs through one TCI state activation/deactivation MAC CE with respect to a plurality of carriers and BWPs in a situation where intra-band CA is applied according to an embodiment of the disclosure (specifying corresponding carrier/BWP information in MAC CE);

FIG. 2F is a diagram illustrating a method 2-3 of simultaneously updating a TCI state in all configured carriers and BWPs through one TCI state activation/deactivation MAC CE with respect to a plurality of carriers and BWPs in a situation where inter-band CA is applied according to an embodiment of the disclosure (mapping corresponding carrier/BWP information to RRC configuration);

Throughout the drawings, like reference numerals will be understood to refer to like parts, components, and structures.

DETAILED DESCRIPTION

Figure 1A:
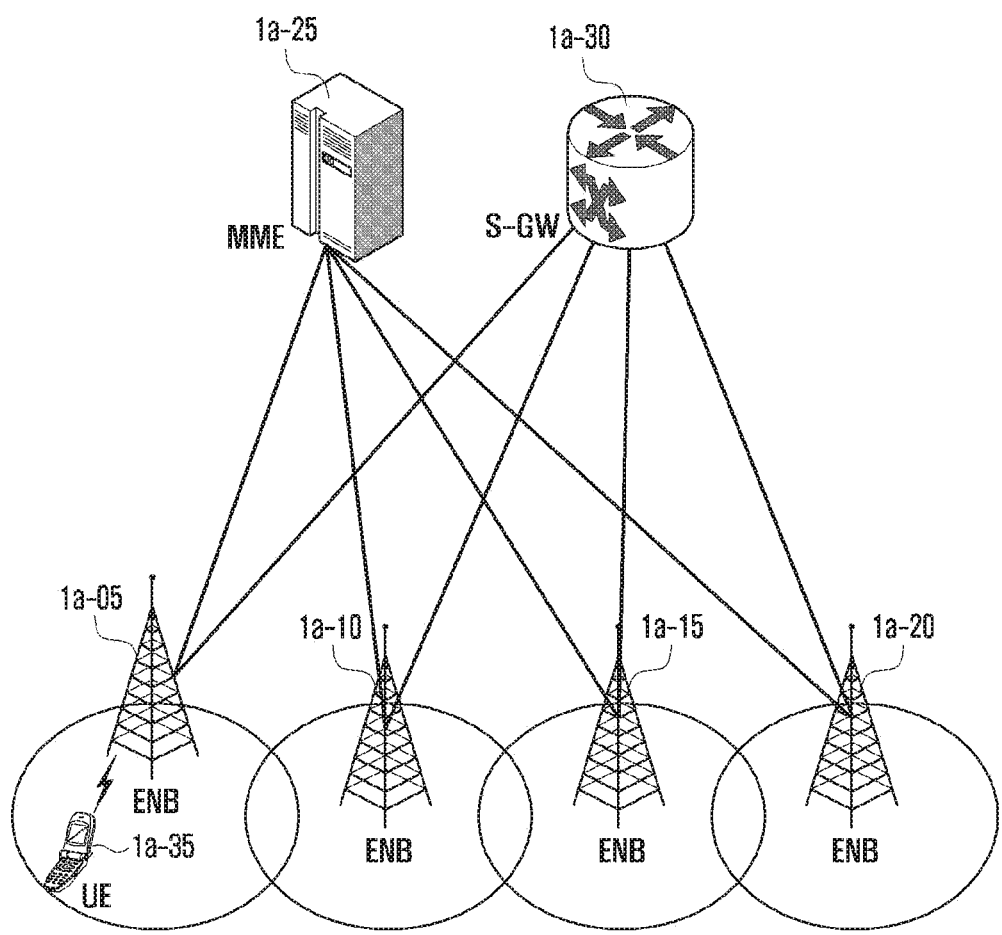
FIG. 1A is a diagram illustrating a structure of an LTE system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

First Embodiment

FIG. 1A is a diagram illustrating a structure of an LTE system referred to for description according to an embodiment of the disclosure.

Referring to FIG. 1A, a radio access network of an LTE system includes next-generation base stations (evolved node B, hereinafter referred to as an "eNB", a "Node B" or a "base station") 1a-05, 1a-10, 1a-15, and 1a-20, a mobility management entity (MME) 1a-25, and a serving-gateway (SG) 1a-30. User equipment (hereinafter, referred to as a "UE" or a "terminal") 1a-35 accesses an external network through the eNBs 1a-05 to 1a-20 and the S-GW 1a-30.

In FIG. 1a, the eNBs 1a-05 to 1a-20 correspond to the existing Node B of a universal mobile telecommunication system (UMTS) system. The eNB is connected to the UE 1a-35 through a radio channel and performs a more complex role than the existing Node B. In the LTE system, all user traffic, including real-time services such as a voice over IP (VoIP) through an Internet protocol, is serviced through a shared channel, so a device for collecting and scheduling status information such as a buffer status of UEs, an available transmission power status, and a channel status is required, and the eNBs 1a-05 to 1a-20 is in charge of this. One eNB typically controls multiple cells. For example, in order to implement a transmission rate of 100 Mbps, the LTE system uses, for example, an orthogonal frequency division multiplexing (OFDM) in a bandwidth of 20 MHz as a radio access technology. In addition, an adaptive modulation & coding (AMC) scheme is applied to determine a modulation scheme and a channel coding rate according to the channel state of the UE. The S-GW 1a-30 is a device that provides a data bearer, and generates or removes the data bearer under the control of the MME 1a-25. The MME is a device responsible for various control functions as well as mobility management functions for a UE, and is connected to a plurality of eNBs.

Figure 1B:
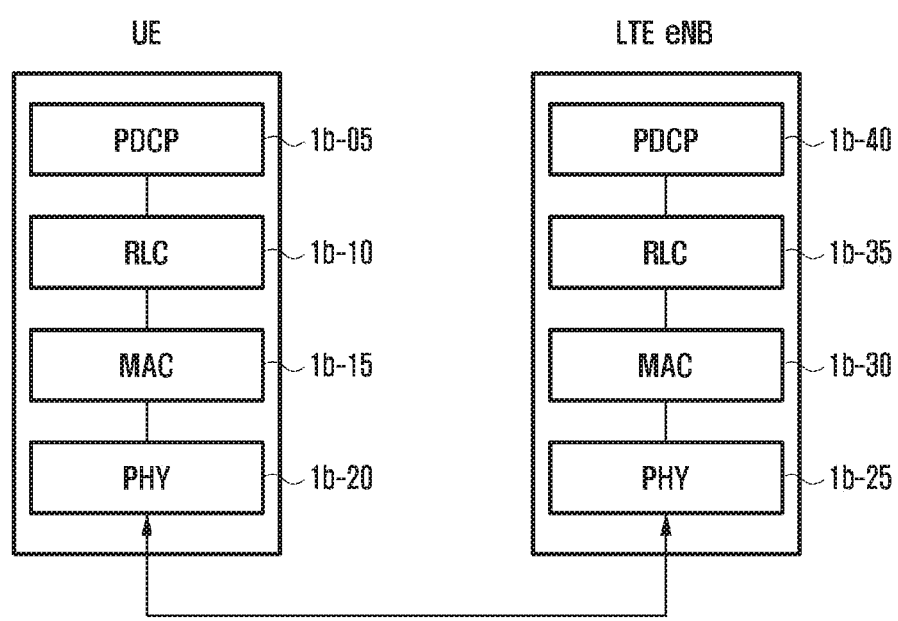
FIG. 1B is a diagram illustrating a radio protocol structure in an LTE system according to an embodiment of the disclosure.

FIG. 1B is a diagram illustrating a radio protocol structure in an LTE system according to an embodiment of the disclosure.

Referring to FIG. 1B, the radio protocol of the LTE system includes packet data convergence protocols (PDCPs) 1b-05 and 1b-40, radio link control (RLC) 1b-10 or 1b-35, and medium access control (MAC) 1b-15 or 1b-30, respectively, in a UE and an eNB. The PDCPs 1b-05 and 1b-40 are in charge of operations such as IP header compression/restoration, or the like. The main functions of the PDCP are summarized as follows:

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception)
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM)
Ciphering and deciphering
Timer-based SDU discard in uplink The RLC 1b-10 or 1b-35 reconfigures a PDCP protocol data unit (PDU) to an appropriate size and performs an automatic repeat request (ARQ) operation. The main functions of the RLC are summarized as follows:

Transfer of upper layer PDUs
Error Correction through ARQ (only for AM data transfer)
Concatenation, segmentation and reassembly of RLC SDUs (only for unacknowledged mode (UM) and acknowledged mode (AM) data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC service data unit (SDU) discard (only for UM and AM data transfer)
RLC re-establishment The MACs 1b-15 and 1b-30 are connected to several RLC layer devices configured in one UE, and perform an operation of multiplexing RLC PDUs to a MAC PDU and demultiplexing the RLC PDUs from the MAC PDU. The main functions of the MAC are summarized as follows:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding A physical layer 1b-20 or 1b-25 channel-codes and modulates upper layer data and converts the obtained data into OFDM symbols to transmit the OFDM symbols to a radio channel, or demodulates and channel-decodes the OFDM symbols received through the radio channel to transmit the obtained data to the upper layer. In addition, the physical layer also uses hybrid ARQ (HARQ) for additional error correction, and the reception end transmits whether a packet transmitted by the transmission end is received in 1 bit. This is called HARQ ACK/NACK information. Downlink HARQ ACK/NACK information on uplink transmission may be transmitted through a physical hybrid-ARQ indicator channel (PHICH) physical channel, and uplink HARQ ACK/NACK information on downlink transmission may be transmitted through a physical uplink control channel (PUCCH) or physical uplink shared channel (PUSCH) physical channel.

The PHY layer may include one or a plurality of frequencies/carriers. A technology for simultaneously configuring and using a plurality of frequencies is referred to as a carrier aggregation (CA) technology. Only one carrier was used for communication between a terminal (or UE) and a base station (eNB), but in the CA technology, a primary carrier and one or a plurality of subcarriers are additionally used to dramatically increase the amount of transmission by the number of subcarriers. In LTE, a cell in an eNB using a primary carrier is called a primary cell (PCell), and a subcarrier is called a secondary cell (SCell).

Although not shown in this figure, there is a radio resource control (hereinafter, referred to as "RRC") layer, respectively, above the PDCP layer of the UE and the eNB. The RRC layer transmits and receives access and measurement-related configuration control messages for radio resource control.

Figure 1C:
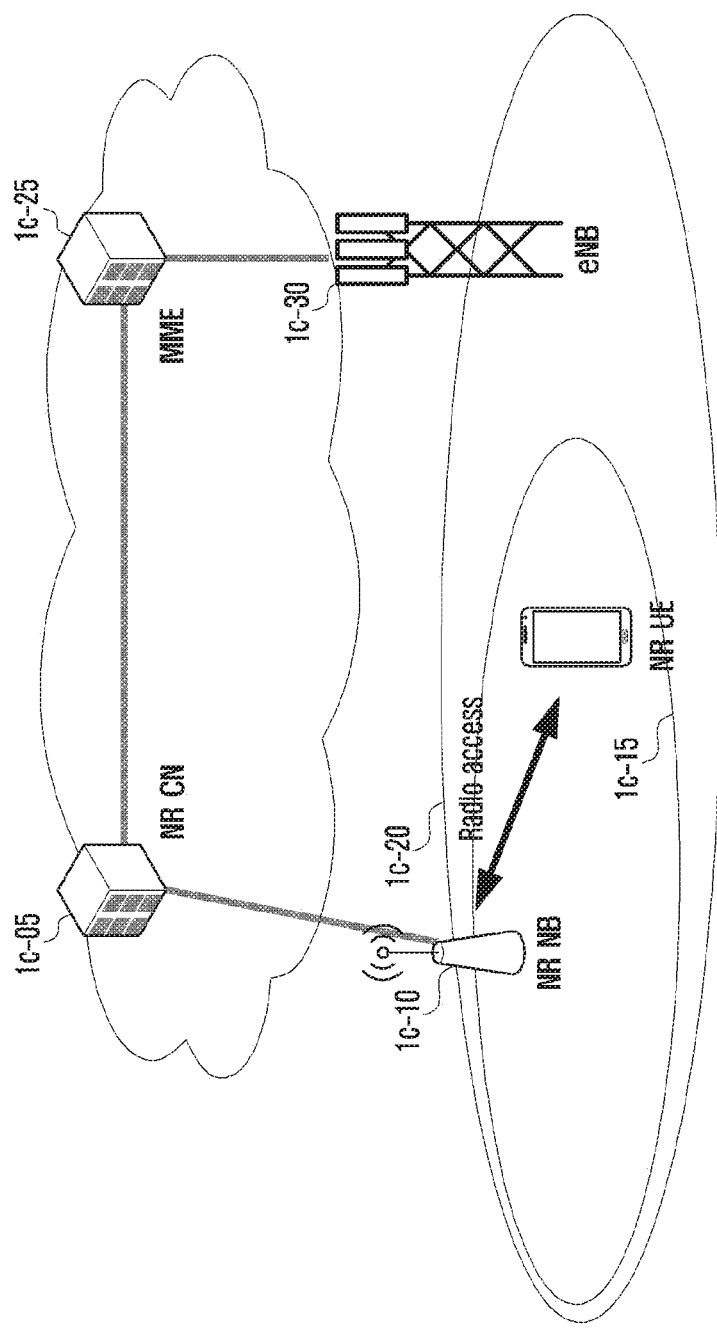
FIG. 1C is a diagram illustrating a structure of a next-generation mobile communication system according to an embodiment of the disclosure.

FIG. 1C is a diagram illustrating a structure of a next-generation mobile communication system according to an embodiment of the disclosure.

Referring to FIG. 1C, a radio access network of a next-generation mobile communication system includes a next-generation base station (new radio Node B (NR NB) or a next-generation node B (gNB)) 1c-10 and a new radio core network (NR CN or next-generation core network (NG CN)) 1c-05. A UE (new radio user equipment, hereinafter, referred to as "NR UE" or "terminal") 1c-15 accesses an external network through the NR NB 1c-10 and the NR CN 1c-05.

In FIG. 1c, the NR NB 1c-10 corresponds to an evolved Node B (eNB) of the existing LTE system. The NR NB is connected to the NR UE 1c-15 through a radio channel and can provide a service superior to that of the existing Node B. In the next-generation mobile communication system, all user traffic is serviced through a shared channel, so a device that collects and schedules status information such as a buffer status, an available transmission power status, and a channel status of UEs is required, and the NR NB 1c-10 is in charge of this. One NR NB typically controls multiple cells. In order to implement ultra-high-speed data transmission compared to the existing LTE, it may have more than the existing maximum bandwidth, and an additional beam-forming technology may be grafted using orthogonal frequency division multiplexing (OFDM) as a radio access technology. In addition, an adaptive modulation & coding (hereinafter, referred to as "AMC") scheme that determines a modulation scheme and a channel coding rate according to the channel status of a UE is applied. The NR CN 1c-05 performs functions such as mobility support, bearer configuration, and quality of service (QoS) configuration. The NR CN is a device responsible for various control functions as well as a mobility management function for a UE, and is connected to a plurality of eNBs. In addition, the next-generation mobile communication system can be linked with the existing LTE system, and the NR CN is connected to the MME 1c-25 through a network interface. The MME is connected to the existing eNB 1c-30.

Figure 1D:
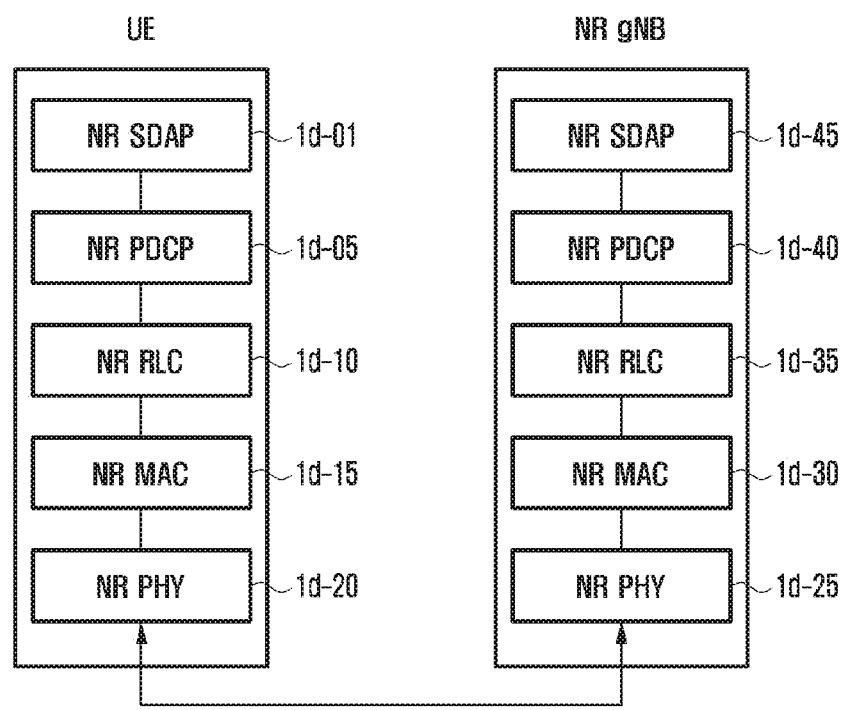
FIG. 1D is a diagram illustrating a radio protocol structure of a next-generation mobile communication system according to an embodiment of the disclosure.

FIG. 1D is a diagram illustrating a radio protocol structure of a next-generation mobile communication system according to an embodiment of the disclosure.

Referring to FIG. 1D, a radio protocol of a next-generation mobile communication system includes NR service data adaptation protocols (SDAPs) 1d-01 and 1d-45, NR PDCPs 1d-05 and 1d-40, NR RLCs 1d-10 and 1d-35, and NR MACs 1d-15 and 1d-30, respectively, in a UE and an NR eNB.

The main functions of the NR SDAP 1d-01 and 1d-45 may include one or more of the following functions:
- Transfer of user plane data
- Mapping between a QoS flow and a DRB for both DL and UL
- Marking QoS flow ID in both DL and UL packets
- Mapping reflective QoS flow to DRB for UL SDAP PDUs For the SDAP layer device, the UE may be configured with an RRC message as to whether to use the header of the SDAP layer device or whether to use the function of the SDAP layer device for each PDCP layer device, for each bearer, or for each logical channel. When the SDAP header is configured, the UE may instruct the NAS reflective QoS configuration 1-bit indicator and AS reflective QoS configuration 1-bit indicator of the SDAP header to update or reconfigure mapping information for UL and DL QoS flow and DRB. The SDAP header may include QoS flow ID information indicating QoS. The QoS information may be used as data processing priority, scheduling information, etc., to support a smooth service.

The main functions of NR PDCPs 1d-05 and 1d-40 may include one or more of the following functions:
- Header compression and decompression: ROHC only
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink In the above, the reordering function of the NR PDCP device refers to a function of reordering the PDCP PDUs received from the lower layer in order based on the PDCP sequence number (SN), and may include a function of delivering data to the upper layer according to the reordering or include a function of immediately delivering data without considering the order. In addition, the reordering function may include a function of recording lost PDCP PDUs through reordering, a function of reporting the status of lost PDCP PDUs with respect to a transmission side, and a function of requesting retransmission of lost PDCP PDUs.

The main functions of the NR RLCs 1d-10 and 1d-35 may include at least one of the following functions:
- Transfer of upper layer PDUs
- In-sequence delivery of upper layer PDUs
- Out-of-sequence delivery of upper layer PDUs
- Error Correction through ARQ
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment In the above, the in-sequence delivery function of the NR RLC device refers to a function of sequentially delivering RLC SDUs received from the lower layer to the upper layer. When one RLC SDU is originally divided into several RLC SDUs and received, the in-sequence delivery function may include functions of: reassembling and delivering the several RLC SDUs; reordering the received RLC PDUs with respect to an RLC sequence number (SN) or a PDCP SN; reordering and recording lost RLC PDUs; reporting the status of the lost RLC PDUs with respect to the transmission side; requesting retransmission of the lost RLC PDUs; sequentially delivering only RLC SDUs before the lost RLC SDU to the upper layer when there is a lost RLC SDU; sequentially delivering, to the upper layer, all RLC SDUs received before a predetermined timer starts when the timer is expired even if there is a lost RLC SDU; and sequentially delivering, to the upper layer, all RLC SDUs received so far when a predetermined timer is expired even if there is a lost RLC SDU. In addition, the RLC PDUs may be processed in the order in which they are received (regardless of the order of serial number and sequence number, in the order of arrival) and delivered to the PDCP device out-of-sequence delivery. In case of segments, the segments stored in a buffer or to be received in the future may be received, reconfigured into one complete RLC PDU, processed, and then delivered to the PDCP device. The NR RLC layer may not include the concatenation function, and the above function may be performed in the NR MAC layer or may be replaced with a multiplexing function of the NR MAC layer.

In the above, the out-of-sequence delivery function of the NR RLC device refers to a function of directly delivering the RLC SDUs received from the lower layer to the upper layer regardless of the order. The out-of-sequence delivery function may include, when one RLC SDU is originally divided into several RLC SDUs and received, a function of reassembling and transmitting the several RLC SDUs, and a function of storing and recording the RLC SN or PDCP SN of the received RLC PDUs to record lost RLC PDUs.

The NR MACs 1d-15 and 1d-30 may be connected to several NR RLC layer devices configured in one UE, and the main functions of the NR MAC may include one or more of the following functions:
- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding The NR PHY layers 1d-20 and 1d-25 may channel-code and modulate upper layer data and may convert the obtained data into OFDM symbols to transmit the OFDM symbols to a radio channel, or may demodulate and channel-decode the OFDM symbols received through the radio channel to transmit the obtained data to the upper layer.

Figure 1E:
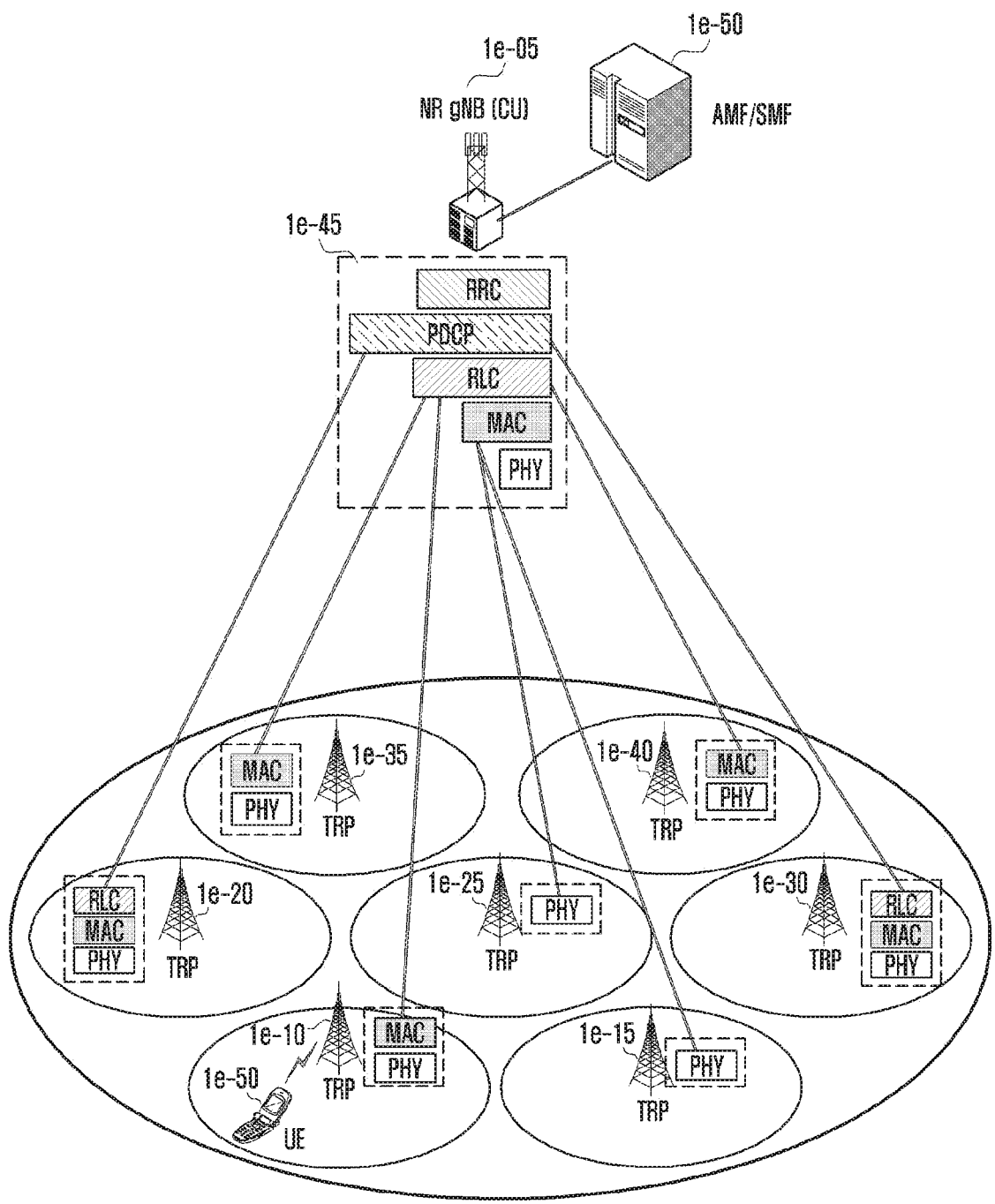
FIG. 1Ee is a diagram illustrating a structure of another next-generation mobile communication system according to an embodiment of the disclosure.

FIG. 1E is a diagram illustrating a structure of another next-generation mobile communication system according to an embodiment of the disclosure.

Referring to FIG. 1E, cells served by an NR gNB 1e-05 operating on a beam basis include multiple transmission reception points (TRPs) 1e-10, 1e-15, 1e-20, 1e-25, 1e-30, 1e-35, and 1e-40. The TRPs 1e-10 to 1e-40 represent blocks in which some functions of transmitting and receiving physical signals in the existing NR eNB are separated, and are composed of a plurality of antennas. The NR gNB 1e-05 may be expressed as a central unit (CU) and a TRP may be expressed as a distributed unit (DU). The functions of the NR gNB 1e-05 and the TRP may be configured by separating each layer from the PDCP/RLC/MAC/PHY layer such as 1e-45. The TRP may have only the PHY layer and perform the function of the PHY layer (1e-15 and 1e-25), the TRP may have only the PHY layer and the MAC layer and perform the functions of the PHY layer and the MAC layer (1e-10, 1e-35, and 1e-40), and the TRP may have only the PHY layer, the MAC layer, and the RLC layer and perform the functions of the PHY layer, the MAC layer, and the RLC layer (1e-20 and 1e-30). In particular, the TRPs 1e-10 to 1e-40 may use a beamforming technique that transmits and receives data by generating narrow beams in various directions using a plurality of transmission/reception antennas. The UE accesses the NR gNB 1e-05 and an external network through the TRPs 1e-10 to 1e-40. The NR gNB 1e-05 collects and schedules status information such as buffer status, available transmission power status, and channel status of the UEs to service users, and supports a connection between the UEs and a core network (CN), particularly, between an access and mobility management function (AMF)/session management function (SMF) 1e-50.

Figure 1F:
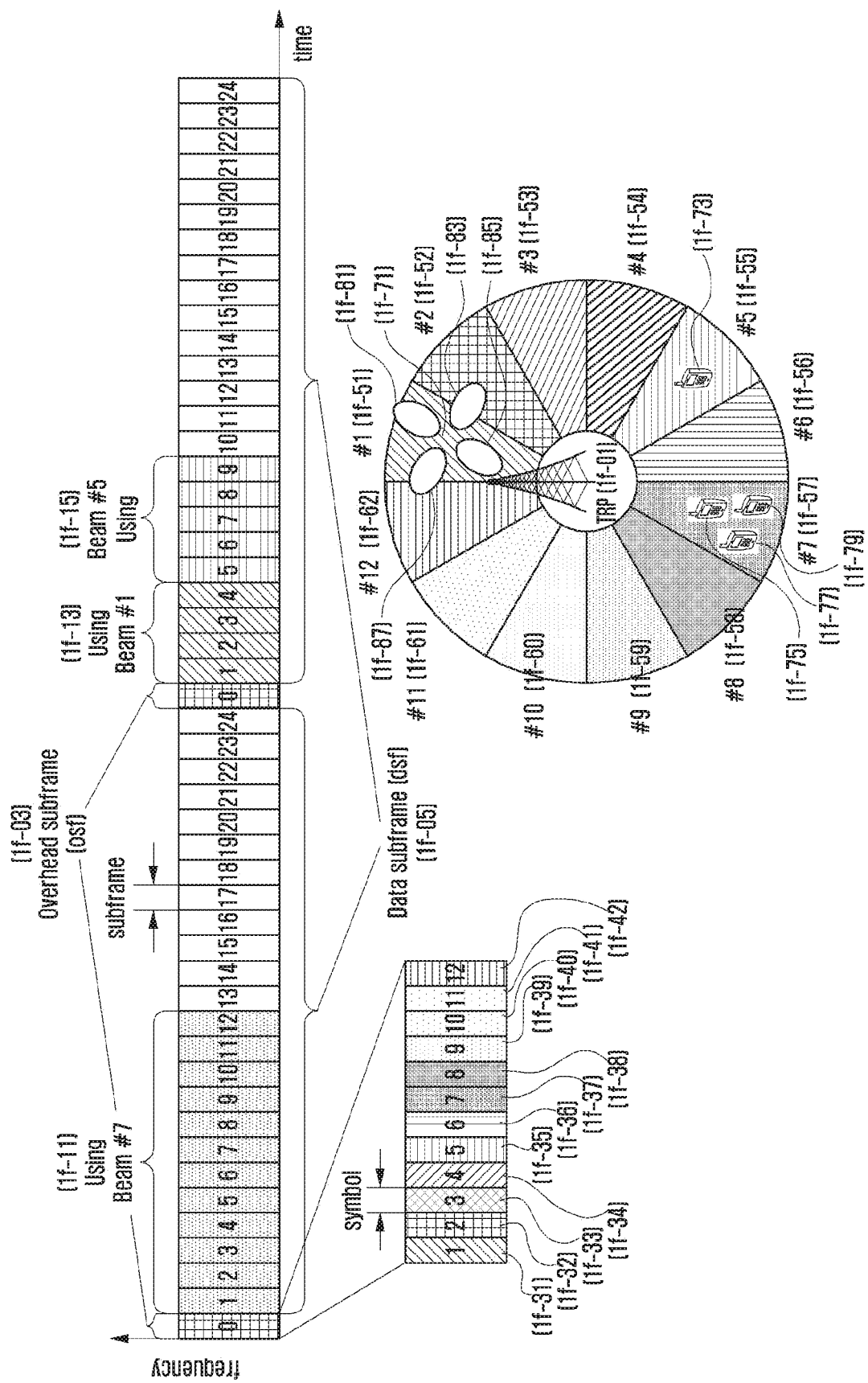
FIG. 1F is a diagram illustrating an example of a frame structure used by an NR system according to an embodiment of the disclosure.

FIG. 1F is a diagram illustrating an example of a frame structure used by an NR system according to an embodiment of the disclosure.

The NR system aims at a higher transmission rate than LTE, and considers a scenario that operates at high frequencies to secure a wide bandwidth. In particular, a scenario in which data having a high data rate is transmitted to a UE by generating a directional beam at a high frequency can be considered.

Accordingly, when an NR eNB or a TRP 1f-01 communicates with UEs 1f-71, 1f-73, 1f-75, 1f-77, and 1f-79 in a cell, a scenario for performing communication using different beams can be considered. That is, in this drawing, a scenario is assumed in which a UE 1 (1f-71) performs communication using a beam #1 (1f-51), a UE 2 (1f-73) performs communication using a beam #5 (1f-55), and UEs 3, 4, and 5 (1f-75, 1f-77, and 1f-79) perform communication using a beam #7 (1f-57).

In order to measure through which beam the UE communicates with the TRP, an overhead subframe (osf) 1f-03 through which a common overhead signal is transmitted exists in time. The osf may include a primary synchronization signal (PSS) for obtaining timing of an orthogonal frequency division multiplexing (OFDM) symbol, a secondary synchronization signal (SSS) for detecting a cell ID, and the like. In addition, a physical broadcast channel (PBCH) containing system information, master information block (MIB), or information essential for the UE to access the system (e.g., containing bandwidth of a downlink beam, system frame number, etc.) may be transmitted. In addition, in the osf, the eNB transmits a reference signal using different beams for each symbol (or over several symbols). A beam index value for distinguishing beams may be derived from the reference signal. In this drawing, it is assumed that there are 12 beams from #1 (1f-51) to #12 (1f-62) transmitted by the eNB, and different beams are swept for each symbol in the osf. Each beam is transmitted for each symbol within the osf (e.g., a beam #1 (1f-51) is transmitted in a first symbol 1f-31, a beam #2 is transmitted in a second symbol 1f-32, and a beam #12 is transmitted in a twelfth symbol 1f-42), and the UE measures the osf to measure from which beam transmitted within the osf the signal is strongest.

In this drawing, a scenario is assumed in which the corresponding osf is repeated every 25 subframes, and the remaining 24 subframes are data subframes (hereinafter, referred to as "dsf") 1f-05 through which general data is transmitted and received. Accordingly, according to the scheduling of the eNB, the UE 3 (1f-75), UE 4 (1f-77), and UE 5 (1f-79) perform communication using the beam #7 in common (1f-11), the UE 1 (1f-71) performs communication using the beam #1 (1f-13), and the UE 2 (1f-73) performs communication using the beam #5 (1f-15). In this drawing, the transmission beam #1 (1f-51) to #12 (1f-62) of the eNB are mainly schematically illustrated, but a reception beam of the UE for receiving the transmitted beam of the eNB (e.g., four beams 1f-81, 1f-83, 1f-85, and 1f-87 of the UE 1f-71) can be additionally considered. In this drawing, the UE 1 has four beams 1f-81, 1f-83, 1f-85, and 1f-87, and performs beam sweeping in order to determine which a beam has the best reception performance. In this case, when multiple beams cannot be used at the same time, one reception beam for each osf may be used to receive as many osfs as the number of reception beams to find the optimal transmission beam of the eNB and the optimal reception beam of the UE.

The disclosure aims to enable transmission and reception in a plurality of TRPs in order to improve MIMO operation in a next-generation mobile communication system. A case in which a plurality of TRPs are configured in one serving cell may be referred to as "intra-cell multi TRP", and a case in which TRPs enabling TRP transmission and reception in association with different serving cells are configured may be referred to as "inter-cell multi TRP". Functions which are not supported in the existing NR system and additionally required are summarized in FIGS. 1g and 1h below.

Figure 1G:
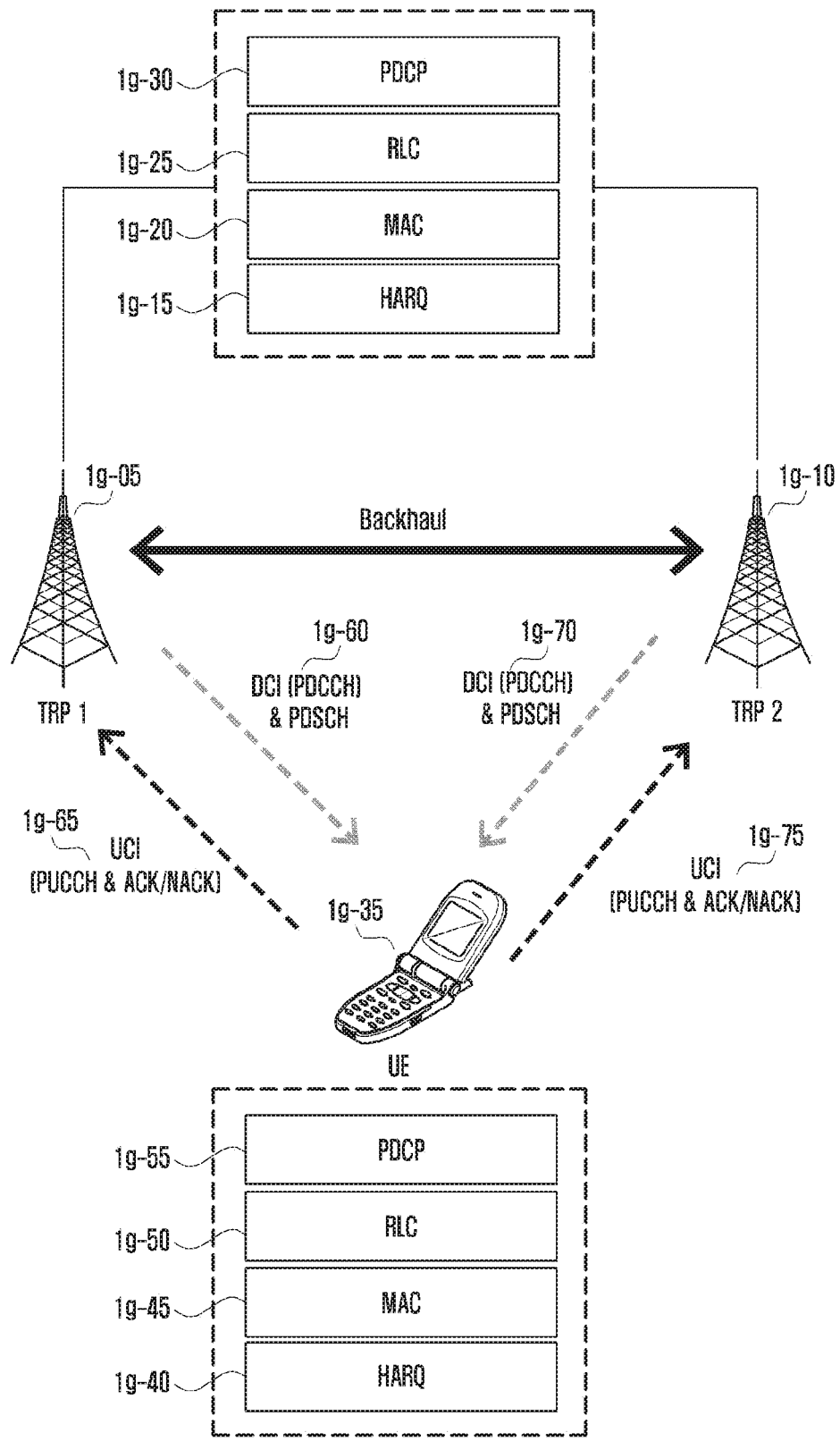
FIG. 1G is a diagram illustrating a method of enabling PUCCH transmission for each of multiple TRPs configured in an NR system according to an embodiment of the disclosure.

FIG. 1G is a diagram illustrating a method of enabling PUCCH transmission for each of multiple TRPs configured in an NR system according to an embodiment of the disclosure.

Referring to FIG. 1G, independent PUCCH and HARQ ACK/NACK transmission is possible for PDSCH resources transmitted in each TRP. For reference, a structure in which a plurality of TRPs are included in one serving cell or a structure in which each TRP is treated as a serving cell may be considered to support the corresponding operation, and in the disclosure, a structure in which a plurality of TRPs are included in one serving cell is assumed and will be described.

An eNB may perform data transmission and reception through TRPs 1g-05 and 1g-10 existing in one serving cell or different serving cells. The TRP is composed of an RF part and a physical domain part, and is a node that mainly performs functions for transmission and reception. When a plurality of TRPs are configured in one serving cell, general configuration information on the serving cell is transmitted in common, and only some RF/physical domain-related parameters have a difference. A HARQ entity 1g-15, a MAC entity 1g-20, an RLC entity 1g-25, and a PDCP entity 1g-30 of the eNB are commonly used for TRP1 and TRP2. This means that one eNB is responsible for scheduling and data processing for a plurality of TRPs (TRP1 1g-05 and TRP2 1g-10). A UE 1g-35 has a HARQ entity 1g-40, a MAC entity 1g-45, an RLC entity 1g-50, and a PDCP entity 1g-55, including one protocol stack as before.

In particular, the UE 1g-35 may perform UL/DL transmission/reception with the TRP1 1g-05 and the TRP2 1g-10, respectively. DCI (PDCCH) reception and PDSCH reception are possible with the TRP1 through a dedicated DL channel as in 1g-60, and HARQ ACK/NACK transmission for corresponding PDSCH reception and PUCCH transmission (UCI transmission) for the TRP1 are possible as in 1g-65. Likewise, the UE can receive DCI (PDCCH) and PDSCH from the TRP2 through a dedicated DL channel as in 1g-70, and can transmit HARQ ACK/NACK for the corresponding PDSCH reception and transmit PUCCH (UCI transmission) for the TRP1 as in 1g-75.

FIG. 1H is a diagram illustrating a method of enabling the reception of a physical downlink shared channel (PDSCH) from each of multiple TRPs configured in an NR system according to an embodiment of the disclosure in the same time unit (e.g., slot or symbol).

Referring FIG. 1H, in the existing NR system, even when multiple TRPs are configured, PUCCH transmission is only possible through one TRP. This is because only one activation for PUCCH resources is defined, and even if a plurality of TRPs are defined in the existing NR system, a UE cannot simultaneously receive a plurality of PDSCHs from the TRPs at one point in time (slot or symbol). This is because a series of operations for each of PDCCH reception, PDSCH reception, and PUCCH transmission are required to be performed sequentially. In this disclosure, it is referred to support a method of simultaneously receiving and processing the PDSCH through two TRPs at one same time point (slot or symbol).

In the existing system, PUCCH transmission in a TRP2 1h-10 is not allowed for a TRP1 1h-05 and the TRP2 1h-10. However, when the function in FIG. 1G is introduced, PDCCH reception (1h-25), PDSCH reception (1h-35) after K0 (1h-30), and PUCCH transmission (1h-45) after K1 (1h-40) are possible with respect to the actual TRP1 1h-05. PDCCH reception (1h-50), PDSCH reception (1h-60) after K0 (1h-55), and PUCCH transmission (1h-70) after K1 (1h-65) are possible with respect to the TRP2 1h-10. Here, the PDSCH reception (1h-60) in the TRP2 1h-10 cannot be performed at the same time (slot or symbol) as the PDSCH reception (1h-35) in the TRP1 1h-05.

In new functions applied to the disclosure, PDCCH reception (1h-75) for the TRP1 1h-15, PDSCH reception (1h-85) after K0 (1h-80), and PUCCH transmission (1h-95) after K1 (1h-90) are possible with respect to the TRP 11h-15 an the TRP2 1h-20. PDCCH reception (1h-100), PDSCH reception (1h-110) after K0 (1h-105), and PUCCH transmission (1h-120) after K1(1h-115) are possible with respect to the TRP2 1h-20. Here, the PDSCH reception (1h-110) in the TRP2 1h-20 is performed at the same time (slot or symbol) as the PDSCH reception (1h-85) in the TRP1 1h-15.

Figure 1I:
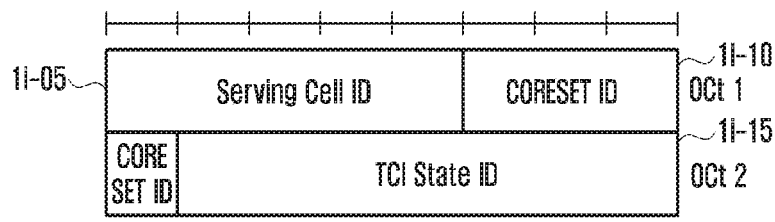
FIGS. 1IA and 1IB are diagrams illustrating an overall effect on a PDCCH transmitted from a plurality of TRPs, a method of activating a downlink candidate beam group, and a structure of a medium access control (MAC) control element (CE) according to various embodiments of the disclosure.

FIGS. 1IA and 1IB are diagrams illustrating an overall effect on a PDCCH transmitted from a plurality of TRPs, a method of activating a downlink candidate beam group, and a MAC CE structure according to various embodiments of the disclosure.

Referring to FIG. 1IA, in the existing NR system, a TCI state indication procedure for PDCCH reception may be defined as follows. First, an eNB may configure a candidate TCI state to a maximum of 64 beams for each control resource set (CORESET) in PDCCH-Config through an RRC message. For reference, the TCI state ID is defined with reference to a TCI state value (there are maximum 128 TCI states) configured in the PDSCH. After the above RRC configuration, the eNB indicates the TCI state ID for PDCCH reception in a specific CORESET through a MAC CE. Currently, three CORESETs can be configured per one BWP, and since a maximum of four BWPs can be configured in one serving cell, the CORESET ID can also be configured from 0 to 11. The above-described contents were for PDCCH configuration and CORESET configuration when only one TRP exists in one serving cell, but in the case of supporting multiple TRPs, that is, TRP1 and TRP2, in the configuration for PDCCH delivered by the TRP2, in particular, CORESET configuration may be different from the TRP1. For this, it is necessary to increase the number of CORESETs that were previously configurable up to 3 per BWP, to 5 per BWP. The increase in the number of CORESETs per BWP may lead to an increase in the number of CORESETs configured in all serving cells (for example, 20), or the number of CORESETs configured in all serving cells may be fixed to 12 as before. According to the above determination, the size of the CORESET ID may be changed, the number of bits for indicating this may be changed, and the structure of the TCI state indication MAC CE for the PDCCH may be changed.

In the following, the effect of introducing a plurality of TRPs on the TCI state indication MAC CE for the PDCCH will be described.

A. The TCI state indication MAC CE for PDCCH reception in a system supporting multi TRP has the following options:

Option A (if it is necessary to increase the size of CORESET ID per Cell is not necessary, FIG. 1IA):
  Maintain the existing RRC configuration and MAC CE format, and activate (transfers) two MAC CEs for TRP1 and TRP2, in this case, a UE performs PDCCH reception from TRP1 and TRP2 while monitoring the twice-indicated beam (TCI state).
  The structure of the existing TCI state indication MAC CE for PDCCH reception is as follows:
    Serving cell ID (5 bits, 1i-05)
    CORESET ID (4 bits, 1i-10)
    TCI state ID (7 bits, 1i-15)

Option B (if it is necessary to increase the size of CORESET ID per Cell, FIG. 1IB): Introducing a new MAC CE for TRP2 (allocation of a new LCID)
  Option B-1: Extend CORESET ID to 5 bits and design new MAC CE
    Serving cell ID (5 bits, 1i-25)
    CORESET ID (5 bits, 1i-35)
    TCI state ID (7 bits, 1i-45)
    Reserved bits (included for byte alignment, 1i-20, 1i-30, and 1i-40)
  Option B-2: Use the existing MAC CE format as it is, and distinguish MAC CE for TRP2 with a new logical channel identifier (LCID)
    Serving cell ID (5 bits, 1i-50)
    CORESET ID (4 bits, 1i-55)
    TCI state ID (7 bits, 1i-60)
  Option B-3: Assign a separate virtual serving cell ID for TRP2 (assign a separate serving cell ID for TRP2 to SpCellConfig and SCellConfig)
    Method 1: can be solved by the operation of eNB through existing MAC CE structure without extension of SCell ID; is applicable even if there is no extension for CORESET ID (1i-70), and available even in case of extension 1 bit. In this case, the MAC CE may be composed of 5 serving cell ID bits (1i-65), CORESET ID 4 bits (1i-70), and TCI state ID 7 bits (1i-75).
    Method 2: In case of extension of SCell ID, the explanation that the increased SCell ID should be allocated only for TRP2 is added, and the serving cell ID needs to be increased by 1 bit in the MAC CE. In this case, the MAC CE may be composed of serving cell ID 6 bits (1i-85), CORESET ID 4 bits (1i-95), TCI state ID 7 bits (1i-105), and other reserved bits (1i-80, 1i-90, and 1i-100).
    Method 3: In case of extension of SCell ID, the explanation that the increased SCell ID should be allocated only for TRP2 is added, and it is necessary to increase 1 bit of serving cell ID and 1 bit of CORESET ID in MAC CE. In this case, the MAC CE may be composed of a serving cell ID 6 bits (1i-115), CORESET ID 5 bits (1i-125), TCI state ID 7 bits (1i-135), and other reserved bits (1i-110, 1i-120, and 1i-130).

As the above-proposed options are applied, a change may occur in a method of indicating a TCI state (beam) when receiving a PDCCH for each TRP. Table 1 below shows expected changes in RRC ASN.1 for reference.

TABLE 1

```
    PDCCH-Config ::= SEQUENCE {
        controlResourceSetToAddModList SEQUENCE(SIZE (1..3)) OF
ControlResourceSet OPTIONAL, --Need N
        controlResourceSetToReleaseList SEQUENCE(SIZE (1..3)) OF
ControlResourceSetId OPTIONAL, -- Need N
        searchSpacesToAddModList SEQUENCE(SIZE (1..10)) OF
SearchSpace OPTIONAL, -- Need N
        searchSpacesToReleaseList SEQUENCE(SIZE (1..10)) OF
SearchSpaceId OPTIONAL, -- Need N
        downlinkPreemption SetupRelease { DownlinkPreemption }
OPTIONAL, -- Need M
        tpc-PUSCH SetupRelease { PUSCH-TPC-
CommandConfig } OPTIONAL, -- Need M
        tpc-PUCCH SetupRelease { PUCCH-TPC-
CommandConfig } OPTIONAL, -- Need M
        tpc-SRS SetupRelease { SRS-TPC-CommandConfig}
OPTIONAL, -- Need M
            ...,
        [[
        controlResourceSetToAddModListExt SEQUENCE(SIZE (1..2)) OF
ControlResourceSet OPTIONAL, -- Need N
        controlResourceSetToReleaseListExt SEQUENCE(SIZE (1..2)) OF
ControlResourceSetId OPTIONAL, -- Need N
        ]]
    }
    -- NOTE: instead of using 'EXT' structure for the extended list, we can use
the full extended new list with size of five.
    ControlResourceSetId ::= INTEGER
(0..maxNrofControlResourceSets-1)
    ControlResourceSetIdExt ::= INTEGER
(maxNrofControlResourceSets..maxNrofControlResourceSetsExt-1)
    maxNrofControlResourceSets-1 INTEGER ::= 11 -- Max
number of CoReSets configurable on a serving cell minus 1
    maxNrofControlResourceSetsExt-1 INTEGER ::= 19 -- Max
number of CoReSets configurable on a serving cell minus 1 for multi TRPs
    ControlResourceSet ::= SEQUENCE {
        controlResourceSetId ControlResourceSetId,
        frequencyDomainResources BIT STRING (SIZE (45)),
        duration INTEGER (1..maxCoReSetDuration),
        cce-REG-MappingType CHOICE {
            interleaved SEQUENCE {
                reg-BundleSize ENUMERATED {n2, n3, n6},
                interleaverSize ENUMERATED {n2, n3, n6},
                shiftIndex
INTEGER(0..maxNrofPhysicalResourceBlocks-1) OPTIONAL -- Need S
            },
            non Interleaved NULL
        },
        precoderGranularity ENUMERATED {sameAsREG-bundle,
allContiguousRBs},
        tci-StatesPDCCH-ToAddList SEQUENCE(SIZE (1..maxNrofTCI-
StatesPDCCH)) OF TCI-StateId OPTIONAL, -- Cond NotSIB1-initialBWP
        tci-StatesPDCCH-ToReleaseList SEQUENCE(SIZE
(1..maxNrofTCI-StatesPDCCH)) OF TCI-StateId OPTIONAL, -- Cond NotSIB1-
initialBWP
        tci-PresentInDCI ENUMERATED {enabled}
OPTIONAL, -- Need S
        pdcch-DMRS-ScramblingID INTEGER (0..65535)
OPTIONAL, -- Need S
            ...,
        [[
        HigherLayerIndexPerCORESET ENUMERATED {0, 1} OPTIONAL, -
- Need N
        tci-StatesPDCCH-ToAddListExt SEQUENCE(SIZE (1 ..maxNrofTCI-
StatesPDCCH)) OF TCI-StateId OPTIONAL, -- Cond MultiTRP
        tci-StatesPDCCH-ToReleaseListExt SEQUENCE(SIZE
(1..maxNrofTCI-StatesPDCCH)) OF TCI-StateId OPTIONAL, -- Cond MultiTRP
        ]]
    }
```

FIGS. 1JA and 1JB are diagrams illustrating an overall effect on a PDSCH transmitted from a plurality of TRPs, a method of activating a downlink candidate beam group, and a MAC CE structure according to various embodiments of the disclosure.

Referring to FIGS. 1JA and 1JB, an entire procedure for indicating a beam of a downlink signal transmitted to a PDSCH in an NR system will be described as follows.

A UE may be configured with a direction of a beam through which a channel state information reference signal (CSI-RS) resource is transmitted for a connected eNB and TRP. The beam configuration can be applied to a beam in which all transmission resources transmitted from the PDSCH are transmitted, and the procedure is as follows.

Operation 1: Configure the TCI state in PDSCH-Config for each BWP of the serving cell through RRC configuration (up to 128 beams can be configured)

Operation 2: For the TCI state, which is the beam through which the PDSCH configured in the RRC message is transmitted, a beam candidate group to be activated to a UE is indicated by the MAC CE (maximum 8 beams, that is, the TCI state can be activated). The purpose of the MAC CE can be understood as a process of selecting candidate beams that can be dynamically indicated by DCI during TCI state configured by RRC, may reduce the TCI state that the UE must manage, and may reduce the number of bits indicated by the DCI.

Operation 3: Indicate a specific beam from among the candidate beams indicated by the MAC CE through an indicator of DCI (indicator consists of 3 bits)

In particular, the TCI state activate/inactive MAC CE used for PDSCH reception defined in Operation 2 is shown in FIG. 1JA and has the following values.

Reserved bit (Included for byte alignment, 1j-05)
Serving cell ID (5 bits, 1j-10)
BWP ID (2 bits, 1j-15)
TCI states bit map (1 bit up to 128 bitmaps, 1j-20)

In this disclosure, it is determined whether the use of the existing MAC CE is applied to the multi TRP system as it is, and further, an additional option is proposed as follows.

Option B (supported by NW (network) operation without changing the existing structure):
The RRC configuration for the existing TCI state and the TCI state configuration of the MAC CE include both TRP1 and TRP2, and activate the TCI state that is activated in TRP1 and TRP2 through DCI delivered from each PDCCH, respectively.
The usage is the same as that in the existing MAC CE structure.
Reserved bit (included for byte alignment, 1j-25)
Serving cell ID (5 bits, 1j-30)
BWP ID (2 bits, 1j-35)
TCI states bitmap (one state is indicated by 1 bit, up to 128 bitmaps, 1j-40)

Option C (Introducing separate TCI state MAC CE for TRP2):
Option C-1: Change the existing R bit to an indicator (I) indicating TRP2
TRP2 indicator (1 bit, 1j-45)
Serving cell ID (5 bits, 1j-50)
BWP ID (2 bits, 1j-55)
TCI states bitmap (one state is indicated by 1 bit, up to 128 bitmaps, 1j-60)
Option C-2: Change the existing R bit to an indicator (I) indicating that there is an additional extension
Indicator indicating that there is an additional extension (1 bit, 1j-65)
Serving cell ID (5 bits, 1j-70)
BWP ID (2 bits, 1j-75)
TCI states bitmap (one state is indicated by 1 bit, up to 128 bitmaps, 1j-80)
Reserved bits (included for byte alignment, 1j-85)
TRP ID (e.g., 2 bits, determined according to the number of TRPs to be introduced later, 1j-90)
Option C-3: Introduce a new LCID for TRP2 and reuse the existing MAC CE format
Reserved bit (included for byte alignment, 1j-95)
Serving cell ID (5 bits, 1j-100)
BWP ID (2 bits, 1j-105)
TCI states bitmap (one state is indicated by 1 bit, up to 128 bitmaps, 1j-110)
Option C-4: Introduce a new LCID for TRP2 and design a new MAC CE (considering future release)
Serving cell ID (5 bits, 1j-120)
BWP ID (2 bits, 1j-125)
Reserved bits (included for byte alignment, 1j-115, 1j-130)
TRP ID (for example, 2 bits, determined according to the number of TRPs to be introduced later, 1j-135)
TCI states bitmap (one state is indicated by 1 bit, up to 128 bitmaps, 1j-140)

Figure 1K:
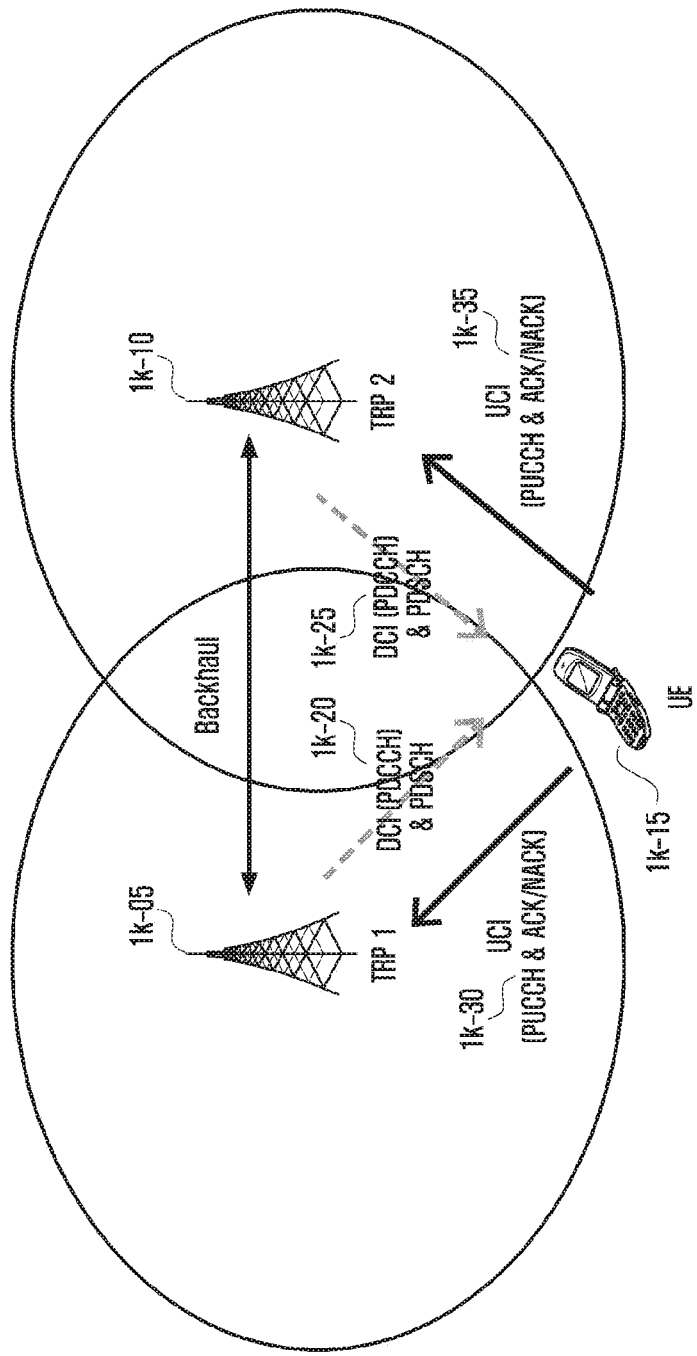
FIG. 1K is a diagram illustrating a configuration method for enabling PUCCH transmission to a plurality of TRPs according to an embodiment of the disclosure.

FIG. 1K is a diagram illustrating an overall effect for enabling a UE 1k-15 to transmit a PUCCH to a plurality of TRPs 1k-05 and 1k-10 and a method of configuring the UE according to an embodiment of the disclosure.

Referring to FIG. 1K, a method will be described in which PUCCH transmission is enabled through each TRP 1k-05 or 1k-10 in an inter-cell multi TRP situation where a plurality of TRPs 1k-05 and 1k-10 are configured in different serving cells other than an intra-cell multi TRP operation in which the plurality of TRPs 1k-05 and 1k-10 are configured in the serving cell.

In the existing NR system, transmission beam configuration related to PUCCH resources for the plurality of TRPs 1k-05 and 1k-10 can be simultaneously performed in one PUCCH-Config. 1n other words, separate PUCCH resources 1k-30 and 1k-35 for the TRP1 1k-05 and the TRP2 1k-10 can be configured in the PUCCH-Config in a network, and it is possible to indicate a beam through which PUCCH resources 1k-30 and 1k-35 applied to the TRP1 1k-05 and the TRP2 1k-10 are transmitted through appropriate configuration of spatialRelationInfoToAddModList existing in PUCCH-Config.

In the case of PDSCH-Config, it is also possible to commonly apply (configure per serving cell) to the TRP1 1k-05 and the TRP2 1k-10, and the plurality of TRPs 1k-05 and 1k-10 may be configured for the serving cell in which PUCCH SCell is configured. Currently, one PUCCH SCell can be configured in addition to a PCell/PSCell (primary secondary cell group (SCG) cell) in one cell group. In the intra-cell multi TRP system, even if the corresponding condition is applied as it is, it is possible to configure PUCCH transmission (1k-30 and 1k-35) in the plurality of TRPs 1k-05 and 1k-10 in one serving cell. In this case, the same is possible if the corresponding serving cell is an sPCell (PCell/PSCell) or a PUCCH SCell. However, in the inter-cell multi TRP system, for the PUCCH transmission (1k-35) of the TRP2 1k-10, it is necessary to configure a SCell capable of two PUCCH transmissions (1k-30 and 1k-35). There are two possible solutions.

Option 1: Configure sPCell for TRP1+PUCCH SCell for TRP2
Maintain the current operation (only one PUCCH SCell can be configured) by adding the above constraints Option 2: PUCCH SCell1 for TRP1+PUCCH SCell2 for TRP2

In the current condition (only one PUCCH SCell can be configured), the operation is not possible, so two or more PUCCH SCells must be configured.

In this case, simultaneous PUCCH transmission in TRP is possible even if the serving cells for TRP1 and TRP2 are not sPCell (PCell/PSCell).

Table 2 below shows a RRC structure for configuring the PUCCH SCell in the existing system.

TABLE 2

```
PDSCH-ServingCellConfig ::= SEQUENCE {
    codeBlockGroupTransmission SetupRelease { PDSCH-
CodeBlockGroupTransmission } OPTIONAL, -- Need M
    xOverhead ENUMERATED { xOh6, xOh12, xOh18 }
OPTIONAL, -- Need S
    nrofHARQ-ProcessesForPDSCH ENUMERATED {n2, n4, n6, n10,
n12, n16} OPTIONAL, -- Need S
    pucch-Cell ServCellIndex OPTIONAL,
-- Cond SCellAddOnly
    ...,
    [[
    maxMIMO-Layers INTEGER (1..8)
OPTIONAL, -- Need M
    processingType2Enabled BOOLEAN
OPTIONAL -- Need M
    ]]
}
```

Figure 1L:
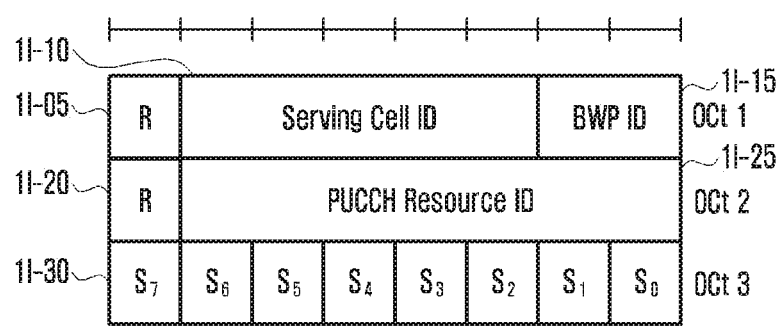
FIGS. 1LA and 1LB are diagrams illustrating a separate PUCCH configuration enabling PUCCH transmission to a plurality of TRPs, a method of activating beams transmitting the same, and a MAC CE structure according to various embodiments of the disclosure.

FIGS. 1LA and 1LB are diagrams illustrating a separate PUCCH configuration enabling PUCCH transmission to a plurality of TRPs, a method of activating a beam transmitting the same, and a MAC CE structure according to various embodiments of the disclosure.

Referring to FIGS. 1LA and 1LB, the entire procedure of configuring a PUCCH resource in an NR system and indicating a beam of an uplink signal transmitting the corresponding resource will be described below.

A plurality of PUCCH resources may be configured through PUCCH-Config for an eNB and a TRP to which a UE is connected, and beam configuration information through which the corresponding PUCCH resource is transmitted may be configured as PUCCH-SpatialRelationInfo. For reference, the number of PUCCH resources and PUCCH-SpatialRelationInfo that can be currently configured may be additionally increased for TRP2, or one of existing values may be distributed and used in a manner of eNB implementation. The operation of actually activating the PUCCH resources and PUCCH-SpatialRelationInfo configured in the RRC message is performed through a PUCCH spatial relation MAC CE, and a detailed structure of the existing MAC CE is shown in FIG. 1LA and has the following values.

Reserved bit (included for byte alignment, 1*l*-05, 1*l*-20)
Serving cell ID (5 bits, 1*l*-10)
BWP ID (2 bits, 1*l*-15)
PUCCH resource ID (7 bits, 1*l*-25)
Spatial relation bitmap (1 bit enable only one of up to 8 bitmaps, 1*l*-30)

Even if the current PUCCH configuration-related RRC structure is applied as it is, it is necessary to change the entire procedure in which two PUCCH transmissions can be delivered in one serving cell. However, in the current MAC CE structure, there is no linking information indicating that the current MAC CE structure is a MAC CE for which TRP. In terms of even the RRC, whether additional PUCCH resource configuration for TRP2 and PUCCH-SpatialRelationInfo for TRP2 are needed or whether to reuse the existing structure and use the same by coordination for TRP1 and TRP2 are not determined. It may be necessary to expand the size of the PUCCH resource to be configured and the size of the PUCCH-SpatialRelationInfo (or configure a separate field for TRP2).

Hereinafter, methods of changing RRC and MAC CE for PUCCH transmission in TRP2 proposed in the disclosure will be described based on FIG. 1LB.

Option B-1: The existing MAC CE structure is applied to both TRP1 and TRP2 and used.
NW assigns PUCCH resource ID and PUCCH-SpatialRelationInfold to be applied to both TRP1 and TRP2
Activate PUCCH resources for TRP1 and TRP2 by transmitting MAC CE twice
MAC CE detailed structure
Reserved bit (included for byte alignment, 1*l*-35, 1*l*-50)
Serving cell ID (5 bits, 1*l*-40)
BWP ID (2 bits, 1*l*-45)
PUCCH resource ID (7 bits, 1*l*-55)
Spatial relation bitmap (1 bit, activate only one among maximum 8 bitmaps, 1*l*-60)

Hereinafter, for the proposed options, it is characterized that a separate MAC CE for TRP2 is introduced. In addition, all options in which the size of PUCCH-SpatialRelationInfold is increased may be applied to the following options. That is, in the current structure, the corresponding PUCCH-SpatialRelationInfold is indicated as 8 bits, but may be extended to 16 bits. In this case, a description that IDs 8 to 15 are applied to TRP2 may be added.

Option B-2: Reuse the existing MAC CE, and change and use R bit to an indicator (I) indicating TRP2.
MAC CE detailed structure
Reserved bit (included for byte alignment, 1l-65, 1*l*-80)
Serving cell ID (5 bits, 1*l*-70)
BWP ID (2 bits, 1*l*-75)
PUCCH resource ID (7 bits, 1*l*-85)
Spatial relation bitmap (1 bit, activate only one among maximum 8 bitmaps, 1*l*-90)

Option B-3: Used to reuse the existing MAC CE and extend the length of a PUCCH resource ID by 1 bit by extending R bit (the increased PUCCH resource is allocated exclusively for TRP2 or the PUCCH resource for TRP2 can be identified according to the configuration)
MAC CE detailed structure
Reserved bit (included for byte alignment, 1*l*-95)
Serving cell ID (5 bits, 1*l*-100)
BWP ID (2 bits, 1*l*-105)
PUCCH resource ID (8 bits, 1*l*-110)
Spatial relation bitmap (1 bit, activate only one among maximum 8 bitmaps, 1*l*-115)

Option B-4: Introduce a new LCID and applied to a new MAC CE (format uses the existing MAC CE format-TRP2 only)
MAC CE detailed structure
Reserved bit (included for byte alignment, 1*l*-120, 1*l*-135)
Serving cell ID (5 bits, 1*l*-125)
BWP ID (2 bits, 1*l*-130)
PUCCH resource ID (7 bits, 1*l*-140)
Spatial relation bitmap (1 bit, activate only one among maximum 8 bitmaps, 1*l*-145)

Option B-5: Introduce a new LCID and applied to a new MAC CE (generate a new format including a TRP ID in consideration of an increase in the number of TRPs in the future)
MAC CE detailed structure
    Reserved bit (included for byte alignment, 1*l*-150, 1*l*-165)
    Serving cell ID (5 bits, 1*l*-155)
    BWP ID (2 bits, 1*l*-160)
    TRP ID (For example, 2 bits, may be larger, 1*l*-170)
    PUCCH resource ID (8 bits, 1*l*-175)
    Spatial relation bitmap (1 bit, activate only one of maximum 8 bitmaps, 1*l*-180)

For reference, in the case in which the proposed disclosure is applied, RRC ASN.1 changes are shown in Table 3 below.

TABLE 3

```
PUCCH-Config ::= SEQUENCE {
    resourceSetToAddModList SEQUENCE (SIZE (1..maxNrofPUCCH-
ResourceSets)) OF PUCCH-ResourceSet OPTIONAL, -- Need N
    resourceSetToReleaseList SEQUENCE (SIZE (1..maxNrofPUCCH-
ResourceSets)) OF PUCCH-ResourceSetId OPTIONAL, -- Need N
    resourceToAddModList SEQUENCE (SIZE (1..maxNrofPUCCH-
Resources)) OF PUCCH-Resource OPTIONAL, -- Need N
    resourceToReleaseList SEQUENCE (SIZE (1..maxNrofPUCCH-
Resources)) OF PUCCH-ResourceId OPTIONAL, -- Need N
        format1 SetupRelease { PUCCH-FormatConfig }
OPTIONAL, -- Need M
        format2 SetupRelease { PUCCH-FormatConfig }
OPTIONAL, -- Need M
        format3 SetupRelease { PUCCH-FormatConfig }
OPTIONAL, -- Need M
        format4 SetupRelease { PUCCH-FormatConfig }
OPTIONAL, -- Need M
    schedulingRequestResourceToAddModList SEQUENCE (SIZE
(1..maxNrofSR-Resources)) OF SchedulingRequestResourceConfig
OPTIONAL, -- Need N
    schedulingRequestResourceToReleaseList SEQUENCE (SIZE
(1..maxNrofSR-Resources)) OF SchedulingRequestResourceId
OPTIONAL, -- Need N
    multi-CSI-PUCCH-ResourceList SEQUENCE (SIZE (1..2)) OF PUCCH-
ResourceId OPTIONAL, -- Need M
    dl-DataToUL-ACK SEQUENCE (SIZE (1..8)) OF INTEGER
(0..15) OPTIONAL, -- Need M
    spatialRelationInfoToAddModList SEQUENCE (SIZE
(1..maxNrofSpatialRelationInfos)) OF PUCCH-SpatialRelationInfo
OPTIONAL, -- Need N
    spatialRelationInfoToReleaseList SEQUENCE (SIZE
(1..maxNrofSpatialRelationInfos)) OF PUCCH-SpatialRelationInfoId
OPTIONAL, -- Need N
    pucch-PowerControl PUCCH-PowerControl
OPTIONAL, -- Need M
    ...,
[[
AckNackFeedbackModeENUMERATED {jointFeedback, seperateFeedback}
OPTIONAL, -- Need R
resourceSetToAddModListExt SEQUENCE (SIZE (1..maxNrofPUCCH-
ResourceSets)) OF PUCCH-ResourceSet OPTIONAL, -- Need N
    resourceSetToReleaseListExt SEQUENCE (SIZE (1..maxNrofPUCCH-
ResourceSets)) OF PUCCH-ResourceSetId2 OPTIONAL, -- Need N
    resourceToAddModListExt SEQUENCE (SIZE (1..maxNrofPUCCH-
Resources)) OF PUCCH-Resource OPTIONAL, -- Need N
    resourceToReleaseListExt SEQUENCE (SIZE (1..maxNrofPUCCH-
Resources)) OF PUCCH-ResourceId2 OPTIONAL, -- Need N
spatialRelationInfoToAddModList SEQUENCE (SIZE
(1..maxNrofSpatialRelationInfos)) OF PUCCH-SpatialRelationInfo2
OPTIONAL, -- Need N
    spatialRelationInfoToReleaseList SEQUENCE (SIZE
(1..maxNrofSpatialRelationInfos)) OF PUCCH-SpatialRelationInfoId2
]]
}
PUCCH-ResourceSetId ::= INTEGER (0..maxNrofPUCCH-
ResourceSets-1)
PUCCH-ResourceSetId2 ::= INTEGER (maxNrofPUCCH-
ResourceSets..maxNrofPUCCH-ResourceSetsExt-1)
PUCCH-ResourceId ::= INTEGER (0..maxNrofPUCCH-Resources-
1)
PUCCH-ResourceId2 ::= INTEGER (maxNrofPUCCH-
Resources..maxNrofPUCCH-ResourcesExt-1)
PUCCH-SpatialRelationInfo2 ::= SEQUENCE {
    pucch-SpatialRelationInfoId PUCCH-SpatialRelationInfoId2,
        servingCellId ServCellIndex
OPTIONAL, -- Need S
        referenceSignal CHOICE {
            ssb-Index SSB-Index,
            csi-RS-Index NZP-CSI-RS-ResourceId,
```

TABLE 3-continued

```
    srs SEQUENCE {
        resource SRS-ResourceId,
        uplinkBWP BWP-Id
        }
    },
    pucch-PathlossReferenceRS-Id PUCCH-PathlossReferenceRS-Id,
    p0-PUCCH-Id P0-PUCCH-Id,
    closedLoopIndex ENUMERATED { i0, i1 }
}
PUCCH-SpatialRelationInfoId2 ::= INTEGER
(1..maxNrofSpatialRelationInfos)
maxNrofPUCCH-Resources INTEGER ::= 128
maxNrofPUCCH-Resources-1 INTEGER ::= 127
maxNrofPUCCH-ResourceSets INTEGER ::= 4 -- Maximum
number of PUCCH Resource Sets
maxNrofPUCCH-ResourceSets-1 INTEGER ::= 3 -- Maximum
number of PUCCH Resource Sets minus 1.
maxNrofPUCCH-ResourcesExt INTEGER ::= 256
maxNrofPUCCH-ResourcesExt-1 INTEGER ::= 255
maxNrofPUCCH-ResourceSetsExt INTEGER ::= 8 -- Maximum
number of PUCCH ResourceSets for TRP2
maxNrofPUCCH-ResourceSetsExt-1 INTEGER ::= 7 -- Maximum
number of PUCCH Resource Sets minus 1 for TRP2.
```

Figure 1M:
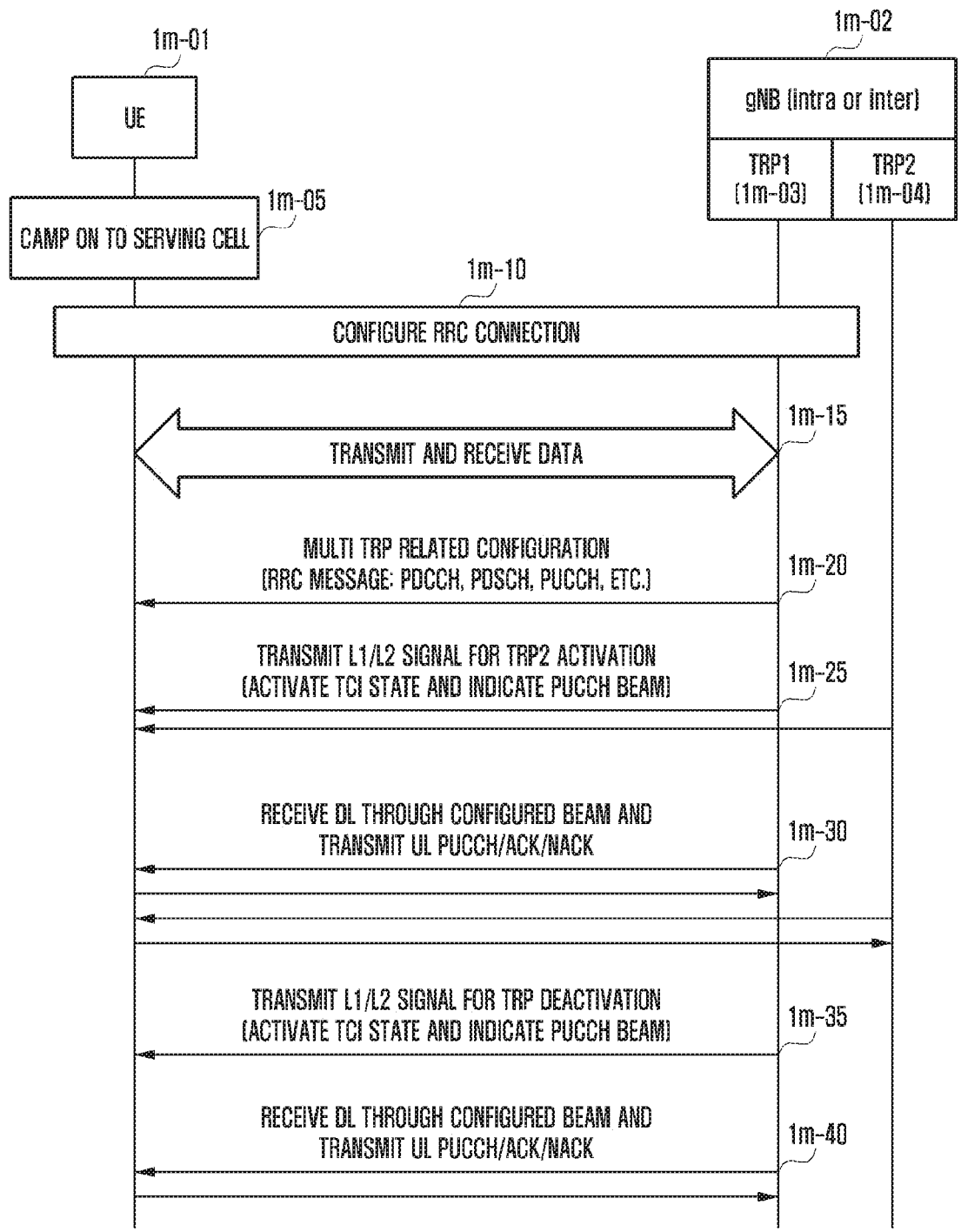
FIG. 1M is a diagram illustrating an overall operation of a UE for independently performing PDCCH/PDSCH reception and PUCCH transmission through a plurality of TRPs according to an embodiment of the disclosure.

FIG. 1M is a diagram illustrating an overall operation of a UE for independently performing PDCCH/PDSCH reception and PUCCH transmission through a plurality of TRPs according to an embodiment of the disclosure.

Referring to FIG. 1M, a UE 1m-01 in an idle mode RRC_IDLE camps on to an eNB 1m-02 (1m-05) while searching for a suitable cell, and then performs access to the eNB 1m-02 for reasons such as occurrence of data to be transmitted, or the like (1m-10). In the idle mode, data cannot be transmitted because the UE is not connected to a network for power saving, and a transition to a connected mode RRC_CONNECTED is required for data transmission. In addition, the camping-on means that the UE stays in the corresponding cell and receives a paging message to determine whether data is coming through a downlink. When the UE succeeds in the access procedure to the eNB 1m-02, the UE is changed to the connected mode RRC_CONNECTED, and the UE in the connected mode can transmit and receive data to and from the eNB (1m-15).

In the RRC_connected state, the eNB delivers configuration information related to a plurality of TRPs 1m-03 and 1m-04 to the UE through an RRC message (1m-20). The RRC message includes configuration information (PDCCH-Config, PDSCH-Config) for reception through a PDCCH and a PDSCH, and may include BWP configuration, CORESET configuration, scrambling configuration, TCI state configuration, and the like. In particular, TCI state-related configuration may be performed for each BWP and for each serving cell and may be included in PDCCH-Config and PDSCH-Config, respectively, and the beam configuration for PUCCH resource transmission is also included in the PUCCH-Config. For reference, in Rel-15, the eNB configures a downlink beam used for transmission to the UE through the PDCCH up to 64 beams as an RRC message, and one beam actually used among them is indicated through the MAC CE. In addition, the eNB also includes an operation of configuring and indicating the downlink beam used for transmission through the PDSCH. In certain conditions, the downlink beam used for transmission through the PDCCH may be used instead of the downlink beam used for transmission through the PDSCH. As the above conditions, a case in which the processing time for switching from the downlink beam for the PDCCH to the downlink beam for the PDSCH is shorter than the required processing time is given. In addition, among the configured PUCCH resources, one resource is activated together with beam information in which one resource is transmitted to the MAC CE. When the corresponding operation is configured, the UE and the eNB are in a state in which configuration of a plurality of TRPs is completed and transmission/reception through a TRP2 1m-04 is possible.

In operation 1m-25, the eNB may instruct the activation of a function requiring activation of the TRP operation through L1/L2 signaling with respect to the configuration for the TRP configured as the RRC configuration information. The L1 signaling means a DCI, and the L2 signaling means a MAC CE. For example, the corresponding MAC CE may be transmitted to activate the PDCCH TCI state for TRP1 and TRP2 (for example, FIG. 1i), and the corresponding MAC CE and DCI are sequentially transmitted to activate the PDSCH TCI state (for example, FIG. 1j). In addition, the corresponding MAC CE may be delivered (for example, FIG. 1l) for PUCCH resource activation and beam indication for TRP1 and TRP2.

In operation 1m-30, corresponding transmission/reception resources may be transmitted in each TRP (TRP1, TRP2) through the downlink beam (TCI state) and the uplink beam (PUCCH resource transmission beam) in which activation is indicated in operation 1m-35. The UE performs uplink and downlink data reception through beam configured for communication with the eNB. In operation 1m-35, the eNB may re-transmit the MAC CE for the purpose of updating the previously transmitted MAC CE. It is possible to update or deactivate the activated and deactivated beam. Alternatively, the beam can be changed through the DCI in the corresponding operation, and in operation 1m-40, the UE may change and apply active beam information in each TRP according to L1/L2 signaling received from the eNB.

Figure 1N:
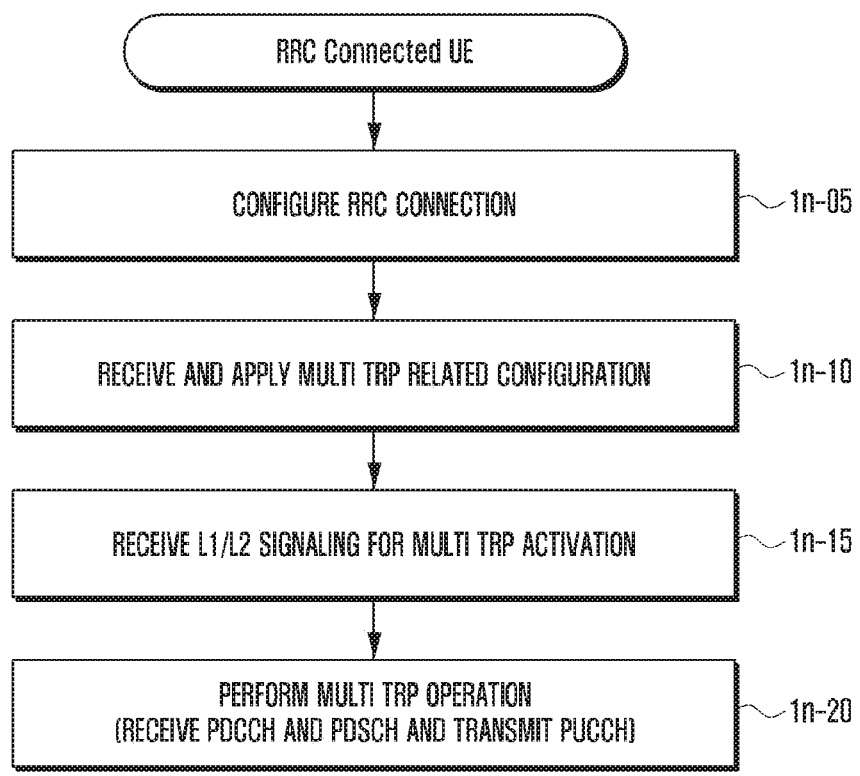
FIG. 1N is a diagram illustrating an overall operation of a UE according to an embodiment of the disclosure.
Figure 10:
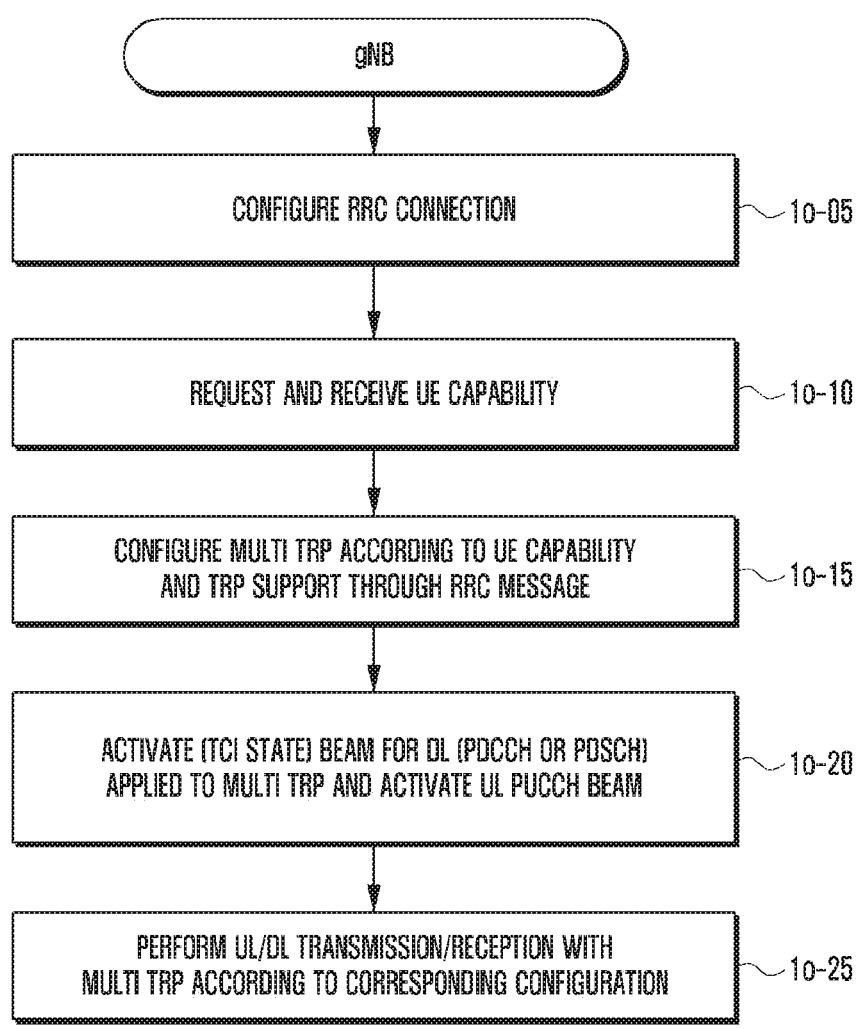

FIG. 1N is a diagram illustrating an overall operation of a UE according to an embodiment of the disclosure.

Referring to FIG. 1N, in operation 1n-05, a UE performs an RRC connection procedure with an eNB and transitions to an RRC_connected state. In operation 1n-10, the UE receives configuration information related to a plurality of TRPs through an RRCReconfiguration message from the eNB. The RRC message includes configuration information (PDCCH-Config, PDSCH-Config) for reception through the PDCCH and the PDSCH, and in detail, may include BWP configuration, CORESET configuration, scrambling configuration, TCI state configuration, and the like. In particular, TCI state-related configuration is performed for each BWP and for each serving cell and is included in PDCCH-Config and PDSCH-Config, respectively, and beam configuration for PUCCH resource transmission is also included in the PUCCH-Config.

In operation 1n-15, the UE may receive, from the eNB, an instruction for activating a function requiring activation of the plurality of TRPs configured as the RRC configuration information through L1/L2 signaling. For example, the corresponding MAC CE may be transmitted to activate the PDCCH TCI state for TRP1 and TRP2 (e.g., FIG. 1I), and the corresponding MAC CE and DCI are sequentially transmitted to activate the PDSCH TCI state (e.g., FIG. 1J). In addition, the corresponding MAC CE may be transmitted (e.g., FIG. 1L) for PUCCH resource activation and beam indication for TRP1 and TRP2.

If the L1/L2 signaling received by the UE in operation 1n-20 is beam activation information for the plurality of TRPs (for PDCCH, PDSCH, or PUCCH), the corresponding transmission/reception resources may be transmitted in each TRP (TRP 1 and TRP 2) through the downlink beam (TCI state) and the uplink beam (PUCCH resource transmission beam) for which activation is indicated. The UE performs uplink and downlink data reception through a beam configured for communication with the eNB.

FIG. 1O is a diagram illustrating an overall operation of an eNB to which embodiments of the disclosure are applied.

Referring to FIG. 1O, in operation 1o-05, the eNB establishes an RRC connected state with a UE, requests a UE capability from the UE in operation 1o-10, and receives corresponding UE capability information. The eNB may analyze the UE capability received in the above operation to determine whether the corresponding UE has the capability for the operation in a plurality of TRPs, and whether the eNB has configured the corresponding function may be confirmed (whether the configuration of the plurality of TRPs is possible or whether the requirements requiring the corresponding configuration are satisfied is confirmed). After the above confirmation is completed, in operation 1o-15, the eNB provides configuration information related to the plurality of TRPs according to the UE capability and TRP support to the UE through the RRC message. If the UE does not have the corresponding capability or the eNB determines that the configuration is not required, configuration information for one basic TRP operation may be provided instead of providing configuration information necessary for the operation in the plurality of TRPs.

In operation 1o-20, the eNB indicates, to the DCI or the MAC CE, one beam or a beam group which is required to be actually used for uplink and downlink (PDCCH, PDSCH, or PUCCH) data transmission among uplink and downlink (PDCCH, PDSCH, or PUCCH) candidate activation beam or beam groups configured to the RRC. Next, in operation 1o-25, downlink data transmission with the UE is performed through the configured beam direction.

Figure 1P:
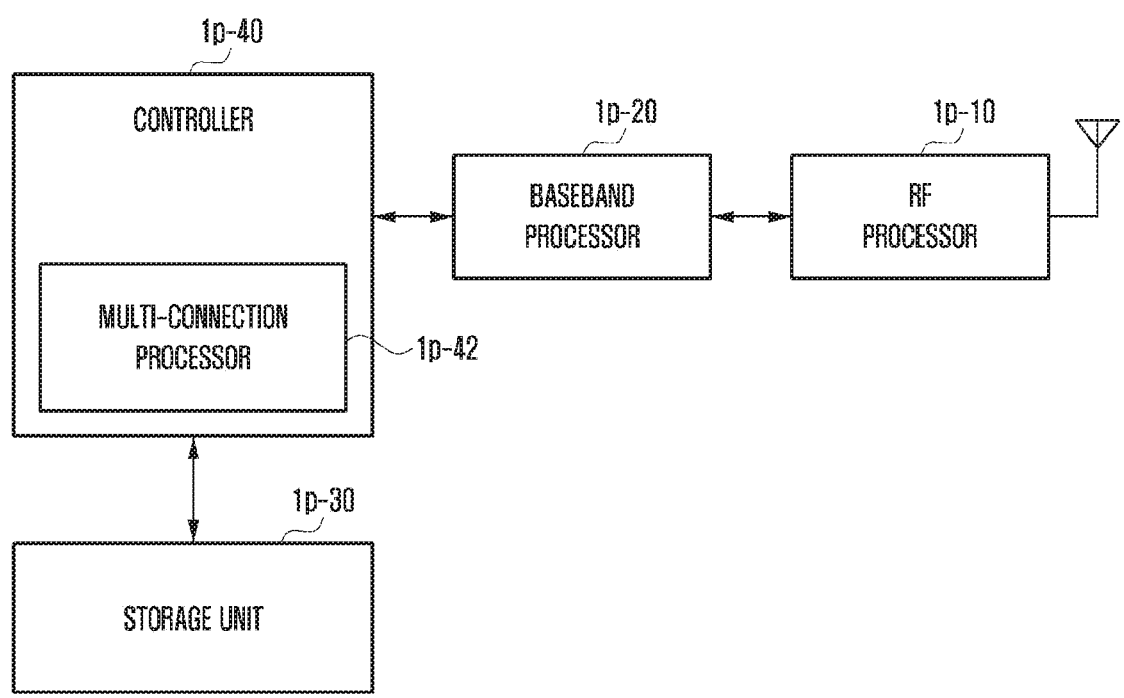
FIG. 1P is a block diagram illustrating a configuration of a UE according to an embodiment of the disclosure.

FIG. 1P is a block diagram illustrating an internal structure of a UE to which the disclosure is applied.

Referring to FIG. 1P, the UE includes a radio frequency (RF) processor 1p-10, a baseband processor 1p-20, a storage unit 1p-30, and a controller 1p-40.

The RF processor 1p-10 performs a function of transmitting and receiving signals through a wireless channel such as band conversion and amplification of the signals. The RF processor 1p-10 up-converts a baseband signal provided from the baseband processor 1p-20 to an RF band signal and transmits the obtained signal through an antenna, and the RF band signal received through the antenna is down-converted to a baseband signal. For example, the RF processor 1p-10 may include a transmission filter, a reception filter, an amplifier, a mixer, an oscillator, a digital to analog convertor (DAC), an analog to digital convertor (ADC), and the like. In the drawing, only one antenna is shown, but the UE may include a plurality of antennas. In addition, the RF processor 1p-10 may include a plurality of RF chains. Furthermore, the RF processor 1p-10 may perform beamforming. For the beamforming, the RF processor 1p-10 may adjust the phase and magnitude of each of signals transmitted/received through the plurality of antennas or antenna elements. In addition, the RF processor may perform MIMO and may receive multiple layers when performing the MIMO operation.

The baseband processor 1p-20 converts between a baseband signal and a bit stream according to the physical layer standard of the system. For example, when transmitting data, the baseband processor 1p-20 generates complex symbols by encoding and modulating a transmitted bit stream. In addition, when receiving data, the baseband processor 1p-20 restores the received bit stream through demodulation and decoding of the baseband signal provided from the RF processor 1p-10. For example, in the case of an orthogonal frequency division multiplexing (OFDM) scheme, when transmitting data, the baseband processor 1p-20 generates complex symbols by encoding and modulating a transmitted bit stream, maps the complex symbols to subcarriers, and then configures OFDM symbols through an inverse fast Fourier transform (IFFT) operation and a cyclic prefix (CP) insertion. In addition, when receiving data, the baseband processor 1p-20 divides the baseband signal provided from the RF processor 1p-10 in units of OFDM symbols, restores signals mapped to subcarriers through a fast Fourier transform (FFT) operation, and then restores a received bit stream through demodulation and decoding.

The baseband processor 1p-20 and the RF processor 1p-10 transmit and receive signals as described above. Accordingly, the baseband processor 1p-20 and the RF processor 1p-10 may be referred to as a transmitter, a receiver, a transceiver, or a communication unit. Furthermore, at least one of the baseband processor 1p-20 and the RF processor 1p-10 may include a plurality of communication modules to support a plurality of different radio access technologies. In addition, at least one of the baseband processor 1p-20 and the RF processor 1p-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.NRHz, NRhz) band, and a millimeter wave (e.g., 60 GHz) band.

The storage unit 1p-30 stores data such as a basic program, an application program, and configuration information for the operation of a UE. In particular, the storage unit 1p-30 may store information related to a second access node that performs wireless communication using a second radio access technology. In addition, the storage unit 1p-30 provides stored data according to the request of the controller 1p-40.

The controller 1p-40 controls overall operations of the UE. For example, the controller 1p-40 transmits and receives signals through the baseband processor 1p-20 and the RF processor 1p-10. In addition, the controller 1p-40 writes and reads data in the storage unit 1p-40. To this end, the controller 1p-40 may include at least one processor. For example, the controller 1p-40 may include a communication processor (CP) that controls communication and an application processor (AP) that controls higher layers such as an application program. The controller 1p-40 may further include a multi-connection processor 1p-42 for supporting multiple connections.

Figure 1Q:
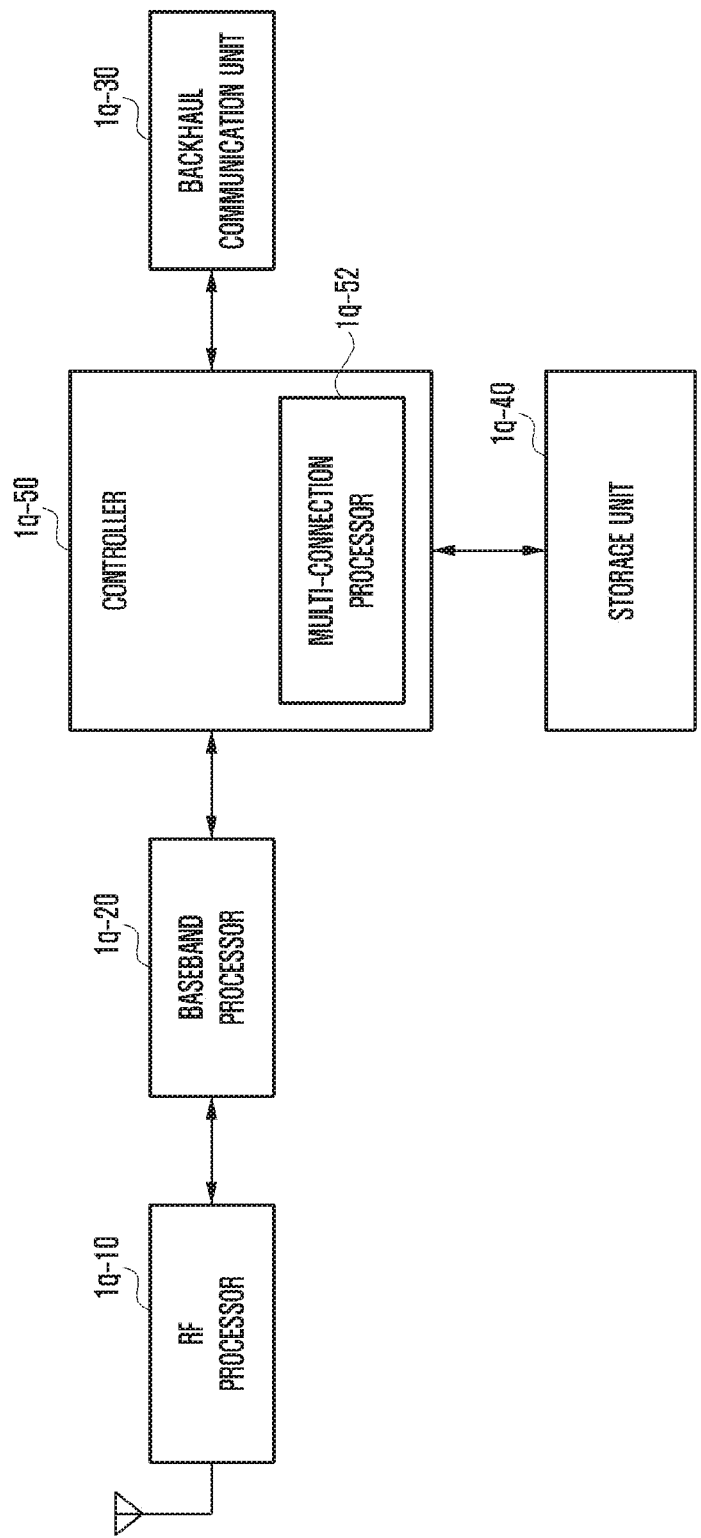
FIG. 1Q is a block diagram illustrating a configuration of an NR eNB according to an embodiment of the disclosure.

FIG. 1Q is a block diagram illustrating a configuration of an NR eNB according to an embodiment of the disclosure.

Referring to FIG. 1Q, an eNB includes an RF processor 1q-10, a baseband processor 1q-20, a backhaul communication unit 1q-30, a storage unit 1q-40, and a controller 1q-50.

The RF processor 1q-10 transmits and receives signals through a wireless channel such as band conversion and amplification of the signals. The RF processor 1q-10 up-converts a baseband signal provided from the baseband processor 1q-20 to an RF band signal, transmits the obtained signal through an antenna, and down-converts the RF band signal received through the antenna into a baseband signal. For example, the RF processor 1q-10 may include a transmission filter, a reception filter, an amplifier, a mixer, an oscillator, a DAC, an ADC, and the like. In FIG. 1Q, only one antenna is shown, but the first access node may include a plurality of antennas. In addition, the RF processor 1q-10 may include a plurality of RF chains. Furthermore, the RF processor 1q-10 may perform beamforming. For the beamforming, the RF processor 1q-10 may adjust the phase and magnitude of each of signals transmitted and received through the plurality of antennas or antenna elements. The RF processor may perform a downlink MIMO operation by transmitting one or more layers.

The baseband processor 1q-20 converts between a baseband signal and a bit stream according to a physical layer standard of a first radio access technology. For example, when transmitting data, the baseband processor 1q-20 generates complex symbols by encoding and modulating a transmitted bit stream. In addition, when receiving data, the baseband processor 1q-20 restores a received bit stream through demodulation and decoding of the baseband signal provided from the RF processor 1q-10. For example, in the case of the OFDM scheme, when transmitting data, the baseband processor 1q-20 generates complex symbols by encoding and modulating a transmitted bit stream, maps the complex symbols to subcarriers, and then configures the OFDM symbols through an IFFT operation and CP insertion. In addition, when receiving data, the baseband processor 1q-20 divides the baseband signal provided from the RF processor 1q-10 in units of OFDM symbols, restores the signals mapped to the subcarriers through an FFT operation, and then restores a received bit stream through demodulation and decoding. The baseband processor 1q-20 and the RF processor 1q-10 transmit and receive signals as described above. Accordingly, the baseband processor 1q-20 and the RF processor 1q-10 may be referred to as a transmitter, a receiver, a transceiver, a communication unit, or a wireless communication unit.

The backhaul communication unit 1q-30 provides an interface for performing communication with other nodes in a network. The backhaul communication unit 1q-30 converts a bit stream transmitted from the primary eNB to another node, for example, an auxiliary eNB, a core network, etc., into a physical signal, and converts the physical signal received from the other node into a bit stream.

The storage unit 1q-40 stores data such as a basic program, an application program, and configuration information for the operation of the primary eNB. In particular, the storage unit 1q-40 may store information on a bearer allocated to the connected UE, measurement results reported from the connected UE, and the like. In addition, the storage unit 1q-40 may store information that is a criterion for determining whether to provide or stop multiple connections to the UE. In addition, the storage unit 1q-40 provides stored data according to the request of the controller 1q-50.

The controller 1q-50 controls overall operations of the primary eNB. For example, the controller 1q-50 transmits and receives signals through the baseband processor 1q-20 and the RF processor 1q-10 or through the backhaul communication unit 1q-30. The controller 1q-50 writes and reads data in the storage unit 1q-40. To this end, the controller 1q-50 may include at least one processor. The controller 1q-50 may further include a multi-connection processor 1q-52 for supporting multiple connections.

Second Embodiment

In the disclosure, in relation to a TCI state used when indicating beam used when receiving a resource transmitted to a PDSCH of a UE in a next-generation mobile communication system, a method of improving the existing operation is considered. The method of the related art for indicating downlink beam is to indicate beam between one TRP and a UE, which means indicating beam transmitted from a specific BWP belonging to one serving cell. Hereinafter, in an embodiment of the disclosure, a method of simultaneously updating beam information applied to reception of a PDSCH configured in several serving cells and a plurality of BWPs of the corresponding cell is proposed. Accordingly, it is possible to reduce the delay time to which the corresponding configuration is applied, and reduce signaling overhead for this.

FIG. 2A is a diagram illustrating an overall procedure for indicating beam of a downlink signal transmitted to a PDSCH from an NR system according to an embodiment of the disclosure.

Referring to FIG. 2A, in the NR system, it is designed to perform data transmission/reception between a UE and an eNB using directional beam. As a characteristic of data communication through the directional beam, a high data rate can be supported through wide bandwidth and resources to use high frequencies, and on the other hand, there may be a limitation that the direction of the beam must be well configured. In the NR system, basically, a UE measures a synchronization signal through a synchronization signal (SS)/PBCH Block (SSB) in an initial access stage, and data transmission/reception may be performed through the beam direction in which the corresponding synchronization signal is detected. Thereafter, the eNB configures up to 64 downlink beams used for transmission through a PDCCH to the UE as RRC messages, and among them, the actually used beam is indicated through a MAC CE. In addition, the eNB also includes an operation of configuring and indicating downlink beam used for transmission through the PDSCH. In certain conditions, downlink beam used for transmission through the PDCCH may be used instead of the downlink beam used for transmission through the PDSCH. As the above conditions, a case in which the processing time for switching from the downlink beam for the PDCCH to the downlink beam for the PDSCH is shorter than the required processing time is given.

A UE 2a-20 may be configured with the direction (2a-06 to 2a-10) of beam through which a CSI-RS resource 2a-15 is transmitted to the connected eNB and TRP 2a-05. The beam configuration can be applied to beam in which all transmission resources transmitted from the PDSCH are transmitted. The procedure is as follows:

1. Operation 2a-25: configure a TCI state in PDSCH-Config for each BWP of a serving cell through RRC configuration (up to 128 beams can be configured in Rel-15)

2. Operation 2a-30: For the TCI state, which is the beam through which the PDSCH configured in the RRC message is transmitted, a beam candidate group to be activated to the UE is indicated by the MAC CE (In Rel-15, it is possible to activate up to 8 beams, that is, the TCI state). The purpose of the MAC CE can be understood as a process of selecting candidate beams that can be dynamically indicated by a DCI during the TCI state configured by an RRC, and reduces the TCI state that the UE must manage and reduces the number of bits indicated by the DCI.

3. Operation 2a-35: specific beam among the candidate beams indicated by the MAC CE is indicated through an indicator of the DCI (in Rel-15, it is composed of 3 bits)

The actual beam configuration configured and indicated in operations 2a-25 and 2a-30 are performed for each BWP. For example, the entire operation is applied to one serving cell (or TRP) and one BWP belonging to the corresponding cell. If the beam configuration for another serving cell and a specific BWP of the corresponding serving cell is desired to be changed, this is possible by repeatedly performing the entire operation on the corresponding cell. Meanwhile, in a situation in which a plurality of cells have the same beam configuration, if such a repetitive operation is omitted and the beam configuration in a plurality of serving cells can be updated/activated at the same time, the delay caused by the repetitive operation can be reduced and signaling overhead can be significantly reduced.

Figure 2B:
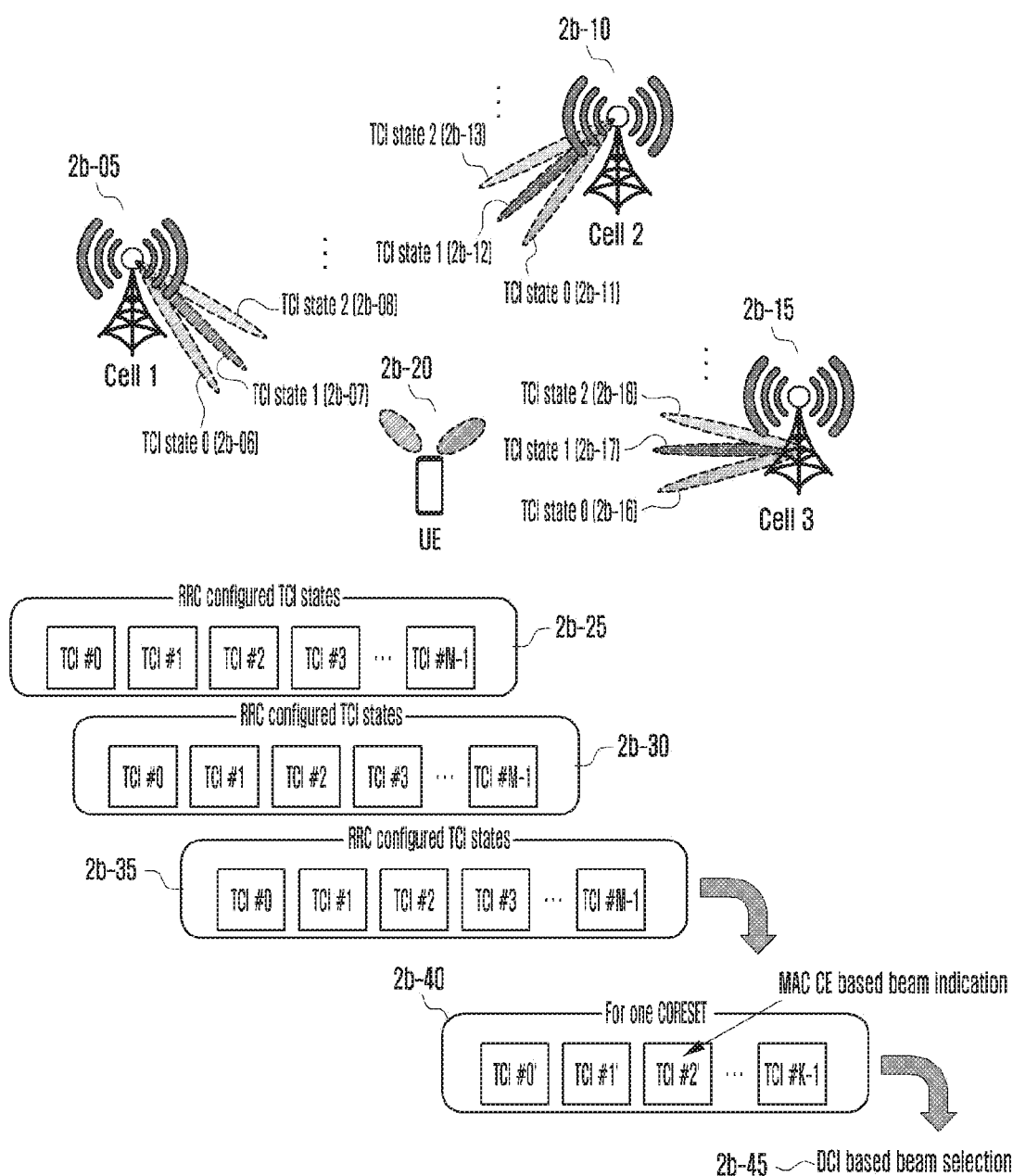
FIG. 2B is a diagram illustrating the entire procedure for simultaneously applying beam group activation of a downlink signal transmitted to a PDSCH through a plurality of serving cells and BWPs, to the plurality of serving cells and BWPs in an NR system according to an embodiment of the disclosure.

FIG. 2B is a diagram illustrating the entire procedure for simultaneously applying activation of a beam group of a downlink signal transmitted to a PDSCH through a plurality of serving cells and BWPs, to the plurality of serving cells and BWPs in an NR system applied to the disclosure.

Referring to FIG. 2B, the NR system is designed to perform data transmission/reception between a UE and an eNB using a directional beam. Currently, only beam (or TCI state) activation/deactivation for a specific bandwidth part (BWP) in one serving cell is possible. In the disclosure, in a CA scenario in which the plurality of serving cells are configured in the UE, an operation in which beam information applied to PDSCH reception configured in several serving cells and the plurality of BWPs of the corresponding cell can be simultaneously updated, an operation is proposed in which the delay time to which the corresponding configuration is applied is reduced and signaling overhead for this is reduced.

A UE 2b-20 receives the configuration of the direction of beam (2b-06 to 2a-08, 2b-11 to 2a-13, 2b-16 to 2a-18) through which a CSI-RS resource and a downlink data resource are transmitted to the configured eNB (serving cell) and a plurality of TRPs 2b-05, 2b-10, and 2b-15. The above beam configuration is configured by the RRC for each BWP and for each serving cell, and for a method in which beam activation for the PDSCH is simultaneously applied to a plurality of cells as proposed in this disclosure, configuration specifying a serving cell and a BWP to which the corresponding operation is applied is required. When the serving cell and the specific BWP in which the corresponding operation is supported are indicated through RRC configuration, the activation beam information of all serving cells and BWP configured through one MAC CE is then updated. Finally, the eNB transmits a DCI in the active BWP of the serving cell to indicate the actually operating beam, and the final beam is determined through a beam indicator included in the DCI. In other words, the simultaneous beam updating in the plurality of serving cells and BWPs is only an operation of updating the beam indicated in the MAC CE stage, and is not a stage in which the UE actually determines reception beam. More detailed operations are described below for each operation:

1. RRC configuration operation (2b-25, 2b-30, 2b-35): Operation of configuring a TCI state in PDSCH-Config for each BWP of a plurality of serving cells through RRC configuration (TCI states may be provided as a list in the above configuration, up to 128 TCI states may be configured, and the TCI states may be configured to a higher value)

For example, the TCI state such as 2b-25 is configured for each BWP configuration included in the serving cell 1, and this configuration exists in the PDSCH-Config. Similarly, for serving cell 2 and serving cell 3, TCI states such as 2b-30 and 2b-35 may be configured for each BWP configuration, respectively. In addition, for the serving cell and the BWP to which the same beam configuration is applied, information indicating this may be added.

Alternatively, common configuration application indication information through the RRC configuration may be omitted, and this may be indicated by a later MAC CE.

2. Operation of updating activation/deactivation of candidate TCI state through MAC CE (2b-40): For the TCI state (or tci-state-MultipleTRP, tci-state-group), which is beam through which the PDSCH is transmitted, the eNB indicates a beam candidate group to be activated to the UE to the MAC CE. The purpose of the MAC CE can be understood as a process of selecting a candidate beam group that can be dynamically indicated by the DCI during beam configuration of the TCI state configured by an RRC, and reduces the TCI state that the UE must manage and reduces the number of bits indicated by the DCI.

A TCI state update operation with respect to several serving cells and BWPs may be performed through one MAC CE among a plurality of serving cells and BWPs configured by the RRC message. To this end, there is a rule that a TCI state change indicated by the corresponding MAC CE is applied to all configured cells and BWPs, or there is a method of explicitly indicating the corresponding serving cell and BWP in the MAC CE.

3. Operation of indicating the beam actually used in the serving cell and the BWP through the DCI (2b-45): The eNB indicates a specific beam among candidate beams indicated by the MAC CE through an indicator of the DCI (In Rel-15, it is composed of 3 bits, and in the disclosure, it may be composed of 3 bits or 4 bits, etc. This is determined according to the number of beams indicated by the MAC CE.). The active BWP operating for each serving cell transmits the DCI and indicates the activation beam.

Figure 2C:
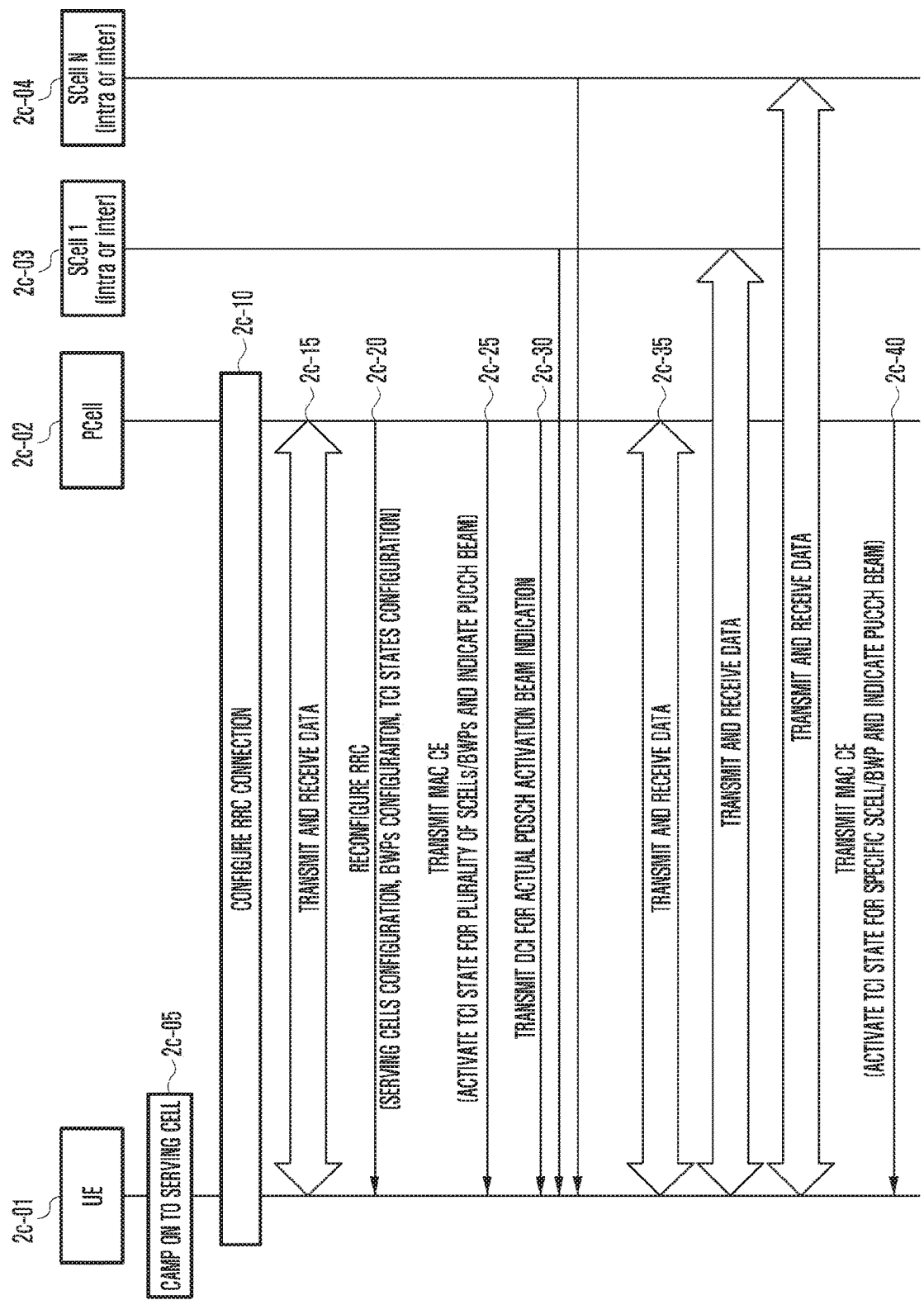
FIG. 2C is a diagram illustrating an overall operation of simultaneously applying activation and deactivation of beams for a PDSCH to a plurality of serving cells and BWPs as operations of all UEs and base stations according to an embodiment of the disclosure.

FIG. 2C is a diagram illustrating an overall operation of simultaneously applying activation and deactivation of beam for a PDSCH to a plurality of serving cells and BWPs, as operations of all UEs and eNBs according to an embodiment the disclosure.

Referring to FIG. 2C, a UE 2c-01 in an idle mode (RRC_IDLE) camps on to an eNB 2c-02 in operation 2c-05 while searching for a suitable cell, and then performs access to a PCell 2c-02 of the eNB for reasons such as occurrence of data to be transmitted, or the like in operation 2c-10. In the idle mode, data cannot be transmitted because the UE is not connected to a network for power saving, and a transition to a connected mode RRC_CONNECTED is required for data transmission. In addition, the camping-on means that the UE stays in the corresponding cell and receives a paging message to determine whether data is coming through a downlink. When the UE succeeds in the access procedure to the eNB 2c-02, the UE is changed to the connected mode RRC_CONNECTED, and the UE in the connected mode can transmit and receive data to and from the eNB in operation 2c-15.

In the RRC connected state, in operation 2c-20, the eNB delivers configuration information (ServingCellConfig) for configuring a plurality of serving cells and TRPs to the UE through an RRC message. The RRC message includes configuration information (PDCCH-Config, PDSCH-Config) for reception through PDCCH and PDSCH, and in particular, may include BWP configuration (BWP-Uplink, BWP-Downlink), CORESET configuration, scrambling configuration, TCI state (TCI-State in PDSCH-Config) configuration. TCI state-related configuration may be performed for each downlink BWP and for each serving cell and may be included in PDCCH-Config and PDSCH-Config, respectively, and the beam configuration for PUCCH resource transmission is also included in the PUCCH-Config. For reference, in Rel-15, the eNB configures downlink beam used for transmission to the UE through the PDCCH up to 64 beams as an RRC message, and one beam actually used among them is indicated through the MAC CE. In addition, the eNB also includes an operation of configuring and indicating the downlink beam used for transmission through the PDSCH. In certain conditions, downlink beam used for transmission through the PDCCH may be used instead of the downlink beam used for transmission through the PDSCH. As the above conditions, a case in which the processing time for switching from the downlink beam for the PDCCH to the downlink beam for the PDSCH is shorter than the required processing time is given.

In operation 2c-25, the eNB may instruct the activation of a function requiring activation of the TRP operation through L1/L2 signaling with respect to the configuration for TRP configured as the RRC configuration information. The L1 signaling means a DCI, and the L2 signaling means a MAC CE. For example, the corresponding MAC CE may be transmitted to activate the PDCCH TCI state for the PCell and SCell 1 (2c-03) and SCell 2 (2c-04). In operation 2c-25, in order to activate the PDSCH TCI state, a corresponding cell and a MAC CE for a specific BWP may be transmitted. In operation 2c-30, a DCI that activates one final beam may be sequentially delivered (see FIG. 2A).

The disclosure proposes a method of enabling simultaneous beam updating for a plurality of carriers and BWPs in operations 2c-20 and 2c-25, which will be described in detail below. In operation 2c-35, data transmission/reception to which corresponding transmission/reception resources are applied is performed through downlink beam (TCI state) and uplink beam (PUCCH resource transmission beam) in which activation is indicated in operations 2c-25 and 2c-30. For example, the UE performs uplink and downlink data reception through the beam configured for communication with the eNB. In operation 2c-40, the eNB may re-deliver the MAC CE for the purpose of updating the previously transmitted MAC CE, and may update or deactivate the activated and deactivated beam. In the disclosure, operation 2c-40 is intended to update only beam for individual carriers or BWPs, rather than simultaneously applying to the plurality of carriers and BWPs. For example, operation is proposed of activating all beam configurations for a plurality of carriers/BWPs in operation 2c-25 and performing an update for individual beams in operation 2c-40.

In addition, in or after the corresponding operation, the beam may be changed through the DCI, and in operation 2c-40, the UE may change and apply active beam information in each TRP according to the L1/L2 signaling received from the eNB.

In the following embodiments, as a method of indicating the above-descried TCI state for PDSCH reception (i.e., beam configuration and activation), a specific method of enabling simultaneous beam updating for a plurality of carriers and BWPs is proposed. Specifically, embodiment 2-1 and embodiment 2-2 considers a scenario applied in an intra-band CA situation, and embodiment 2-3 and embodiment 2-4 considers a scenario that can be applied even in an inter-band CA situation. In addition, by supporting not only the simultaneous beam updating for the plurality of carriers and BWPs, but also the beam update for existing individual serving cells and BWPs, efficient beam update operation may be supported with advantages of reducing the signaling overhead and the delay time. The overall operation follows the flow chart described in FIG. 2C, and specific operations will be described in the following embodiments.

Figure 2D:
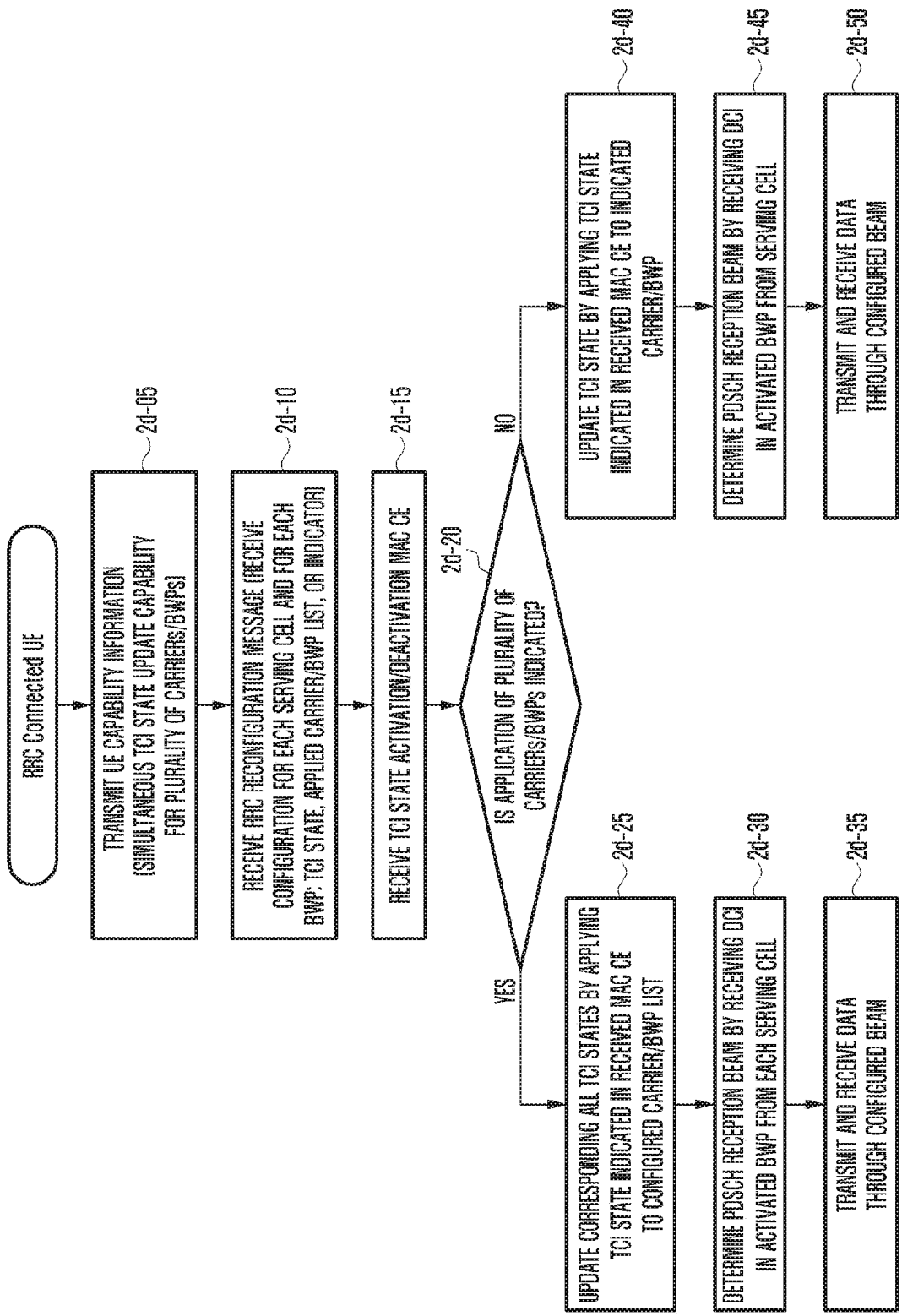
FIG. 2D is a diagram illustrating a method 2-1 of simultaneously updating a TCI state in all configured carriers and BWP through one TCI state activation/deactivation MAC CE with respect to a plurality of carriers and BWPs in a situation where intra-band CA is applied according to an embodiment of the disclosure (mapping the corresponding carrier/BWP information to radio resource control (RRC) configuration).

FIG. 2D is embodiment 2-1 according to an embodiment of the disclosure. FIG. 2D is a diagram illustrating a method 2-1 of simultaneously updating a TCI state in all configured carriers and BWP through one TCI state activation/deactivation MAC CE with respect to a plurality of carriers and BWPs in a situation where intra-band CA is applied according to embodiment 2-1 disclosed in this disclosure (mapping the corresponding carrier/BWP information to RRC configuration).

Referring to FIG. 2D, in operation 2d-05, a UE in the RRC connected state may generate and receive UE capability information in response to a UE capability request message of an eNB, and transmit the obtained information to the eNB. For example, in operation 2d-05, UE capability information including whether simultaneous beam updating for a plurality of carriers and BWPs is supported may be included. Two methods as follows are possible as an indication method for this:

1. First method for transmitting UE capability: 1-bit indicator is introduced to indicate whether the UE supports simultaneous beam updating for a plurality of carriers and BWPs. If it is indicated that the UE supports the corresponding capability, it is necessary to add a description that the corresponding capability is applied to all intra-band band combinations or intra-band contiguous band combinations included in the UE capability information (In case of not supporting intra-band non-contiguous band combination).

(1-bit indicator per UE, UE support this feature for all supported BCs (for intra-band BC only) which UE reports to the gNB)

2. Second method for transmitting UE capability: an indicator indicating whether simultaneous beam updating for the plurality of carriers and BWPs is supported for each band combination supported by the UE is included and indicated. In Embodiment 2-1, since it is assumed that the UE capability is supported for intra-band BC, it is necessary to insert a phrase stating that only an indicator belonging to the intra-band BC can configure the corresponding bit as an option. Alternatively, it is necessary to add a description that the corresponding ability is applied to intra-band contiguous band combinations (when intra-band non-contiguous band combinations are not supported).

(1-bit indicator per BC i.e. this feature can be supported for the among the CCs in the supported BC but only configured in the intra-band BC case)

When the corresponding indicator is indicated as TRUE for the above-described UE capability transmission methods, the UE may equally apply the corresponding capability to all BWPs belonging to the UE or the component carrier of the BC for which the corresponding function is configured. Alternatively, a UE capability indicating that the corresponding capability is supported for each BWP may be added.

In operation 2*d*-10, the eNB delivers configuration information (ServingCellConfig) for configuring a plurality of serving cells and TRPs to the UE through an RRC message. The RRC message includes configuration information (PDCCH-Config, PDSCH-Config) for reception through PDCCH and PDSCH, and in detail, may include BWP configuration (BWP-Uplink, BWP-Downlink), CORESET configuration, scrambling configuration, TCI state (TCI-State in PDSCH-Config) configuration. Specifically, the TCI state related configuration may be provided for each downlink BWP for each serving cell. For example, the TCI state related configuration is included in the PDCCH-Config and PDSCH-Config, respectively, and beam configuration for PUCCH resource transmission may also be included in the PUCCH-Config. As a characteristic of embodiment 2-1, in operation 2*d*-10, a cell list and a BWP list to which simultaneous beam updating for the plurality of carriers and BWPs are applied are provided as the RRC message. For example, the serving cell list (e.g., SCell ID list) and BWP list (e.g., BWP ID list) information to which the same configuration as the TCI state applied to the serving cell and BWP is applied may be added to the PDSCH-Config in which the TCI state is configured. The cell list (e.g., SCell ID list) and BWP list (e.g., BWP ID list) information to which the corresponding function is applied at a level of CellGroupConfig or ServingCellConfig may be provided. In this case, the TCI state configuration for each cell group or serving cell should be applied identically, and the corresponding configuration can be applied to all serving cells and BWPs in the indicated list.

In operation 2*d*-15, the UE may receive a MAC CE indicating activation/deactivation of the TCI state for PDSCH reception from the eNB. As described in FIGS. 2*a* and 2*b*, the MAC CE is not actually used for data transmission and reception by activating a plurality of actually indicated beams, but may play a role of scale-down (or down selection) to beam that can be indicated by the DCI among beams configured by RRC. In this operation, the UE may receive a MAC CE indicating beam activation for an existing individual serving cell and BWP, or a MAC CE indicating simultaneous beam updating for a plurality of newly defined carriers and BWPs. The specific MAC CE structure will be described later.

In operation 2*d*-20, the UE analyzes the MAC CE received in operation 2*d*-15 to determine whether the MAC CE indicates an operation, and then performs the related operation. If the received MAC CE indicates simultaneous beam updating for multiple carriers and BWPs by assigning a new LCID or including indication information indicating the new LCID in the existing MAC CE field (e.g., a 1-bit indicator and applied SCell/BWP ID), in operation 2*d*-25, the UE may update all corresponding TCI states by applying the TCI state indicated by the received MAC CE to the carrier and BWP list configured in operation 2*d*-10. The serving cell ID and BWP ID indicated to the MAC CE in operation 2*d*-25 may be one of the serving cells and BWPs configured in the carrier and BWP list configured in operation 2*d*-10, and may be, for example, a PCell ID and a downlink active BWP ID. Since the corresponding serving cell and BWP configurations are already configured to be applied at the same time, the update of the TCI state can be applied to all configured serving cell IDs and BWP IDs even if any associated SCell ID/BWP ID is indicated. In operation 2*d*-30, the UE may determine beam actually used for PDSCH reception by receiving DCI from the activated BWP from each serving cell. Unlike the MAC CE operation in operation 2*d*-25, the corresponding operation may be individually indicated for each serving cell/BWP through the DCI. In operation 2*d*-35, the UE may perform data transmission/reception through the configured beam. In case where the TCI state activation/deactivation MAC CE is received again, operation 2*d*-20 is repeated.

When the MAC CE received by the UE in operation 2*d*-20 indicates beam activation for an individual serving cell and BWP (i.e., in the case of an existing MAC CE: a case in which an existing LCID is allocated or a case in which indication information indicating the update of the beam for the plurality of serving cells and BWPs is not included in the existing MAC CE field), the UE may update the TCI state of the serving cell and the BWP by applying the TCI state indicated by the MAC CE received in operation 2*d*-40. In operation 2*d*-45, the BWP activated from each serving cell receives the DCI, determines the beam actually used for PDSCH reception, and transmits/receives data in operation 2*d*-50 through the corresponding beam. Next, when the TCI state activation/deactivation MAC CE is received again, operation 2*d*-20 may be repeated.

Specifically, FIG. 2E is a diagram illustrating a method 2-2 of simultaneously updating a TCI state in all configured carriers and BWPs through one TCI state activation/deactivation MAC CE with respect to a plurality of carriers and BWPs in a situation where intra-band CA is applied (specifying corresponding carrier/BWP information in MAC CE), according to an embodiment of the disclosure.

Referring to FIG. 2E, a UE in an RRC connected state may generate and receive UE capability information in response to a UE capability request message of an eNB in operation 2*e*-05 and transmit the obtained information to the eNB. For example, in operation 2*e*-05, UE capability information including whether simultaneous beam updating for a plurality of carriers and BWPs is supported may be included. Two methods as follows are possible as an indication method for this.

1. First method for transmitting UE capability: 1-bit indicator is introduced to indicate whether the UE supports simultaneous beam updating for a plurality of carriers and BWPs. If it is indicated that the UE supports the corresponding capability, it is necessary to add a description that the corresponding capability is applied to all intra-band band combinations or intra-band contiguous band combinations included in the UE capability information (In case of not supporting intra-band non-contiguous band combination).

(1-bit indicator per UE, UE support this feature for all supported BCs (for intra-band BC only) which UE reports to the gNB)

2. Second method for transmitting UE capability: an indicator indicating whether simultaneous beam updating for the plurality of carriers and BWPs is supported for each band combination supported by the UE is included and indicated. In Embodiment 2-2, since it is assumed that the UE capability is supported for intra-band BC, it is necessary to insert a phrase stating that only an indicator belonging to the intra-band BC can configure the corresponding bit as an option. Alternatively, it is necessary to add a description that the corresponding ability is applied to intra-band contiguous band combinations (when intra-band non-contiguous band combinations are not supported).

(1-bit indicator per BC i.e. this feature can be supported for the among the CCs in the supported BC but only configured in the intra-band BC case)

When the corresponding indicator is indicated as TRUE for the above-described UE capability transmission methods, the UE may equally apply the corresponding capability to all BWPs belonging to the UE or the component carrier of the BC for which the corresponding function is configured. Alternatively, a UE capability indicating that the corresponding capability is supported for each BWP may be added.

In operation 2e-10, the eNB delivers configuration information (ServingCellConfig) for configuring a plurality of serving cells and TRPs to the UE through an RRC message. The RRC message includes configuration information (PDCCH-Config, PDSCH-Config) for reception through PDCCH and PDSCH, and in detail, may include BWP configuration (BWP-Uplink, BWP-Downlink), CORESET configuration, scrambling configuration, TCI state (TCI-State in PDSCH-Config) configuration. In particular, the TCI state related configuration may be provided for each downlink BWP for each serving cell. The TCI state related configuration is included in the PDCCH-Config and PDSCH-Config, respectively, and beam configuration for PUCCH resource transmission may also be included in the PUCCH-Config. 1*n* addition, whether the plurality of carriers and BWPs are configured may be indicated in the corresponding RRC configuration. This can be seen by configuring the 1-bit indicator.

In operation 2e-15, the UE may receive a MAC CE indicating activation/deactivation of the TCI state for PDSCH reception from the eNB. As described in FIGS. 2a and 2b, the MAC CE is not actually used for data transmission and reception by activating a plurality of actually indicated beams, but may play a role of scale-down (or down selection) to beam that can be indicated by the DCI among beams configured by RRC. In Embodiment 2, in the RRC configuration information of operation 2e-10, there is no additional configuration and the configuration of the existing Rel-15 is used as it is, and a new MAC CE is introduced in the corresponding operation and beam activation for a plurality of serving cells and BWPs is indicated by receiving the new MAC CE. In other words, this is a method in which all Serving Cells and BWP identifiers to which beam update is applied in one new MAC CE are specified. In this operation, the UE may receive a MAC CE indicating beam activation for an existing individual serving cell and BWP, or a MAC CE indicating simultaneous beam updating for a plurality of newly defined carriers and BWPs may be received. The specific MAC CE structure will be described later.

In operation 2e-20, the UE analyzes the MAC CE received in operation 2e-15 to determine whether the MAC CE indicates an operation, and then performs the related operation. If the received MAC CE indicates simultaneous beam updating for multiple carriers and BWPs (by assigning a new LCID or including indication information indicating the new LCID in the existing MAC CE field (e.g., a 1-bit indicator and applied SCell/BWP ID)), in operation 2e-25, the UE may update all corresponding TCI states by applying the TCI state indicated by the received MAC CE to the entire indicated carrier and BWP list. In operation 2e-25, the serving cell and BWP to which the MAC CE is transmitted may be an activated serving cell and BWP, and for example, may be a downlink active BWP ID of a PCell. In operation 2e-30, the beam actually used for receiving the PDSCH may be determined by receiving the DCI from the activated BWP from each serving cell. Unlike the MAC CE operation in 2e-25, the corresponding operation may be individually indicated for each serving cell/BWP through the DCI. In operation 2e-35, the UE may perform data transmission/reception through the configured beam. In addition, when receiving the TCI state activation/deactivation MAC CE again, operation 2e-20 may be repeated.

In operation 2e-20, when the MAC CE received by the UE indicates beam activation for an individual serving cell and BWP (in the case of an existing MAC CE: an existing LCID is allocated, or a case in which indication information indicating the update of the beam for the plurality of serving cells and BWPs is not included in the existing MAC CE field), the UE may update the TCI state of the serving cell and the BWP by applying the TCI state indicated by the MAC CE received in operation 2e-40. In operation 2e-45, the BWP activated from each serving cell receives the DCI, determines the beam actually used for PDSCH reception, and transmits/receives data in operation 2e-50 through the corresponding beam. When the TCI state activation/deactivation MAC CE is received again, operation 2e-20 may be repeated.

Specifically, FIG. 2F is a diagram illustrating a method 2-3 of simultaneously updating a TCI state in all configured carriers and BWPs through one TCI state activation/deactivation MAC CE with respect to a plurality of carriers and BWPs in a situation where inter-band CA is applied according to embodiment 2-3 disclosed in this disclosure (mapping corresponding carrier/BWP information to RRC configuration), according to an embodiment of the disclosure.

Referring to FIG. 2F, a UE in an RRC connected state may generate and receive UE capability information in response to the UE capability request message of the eNB in operation 2f-05 and transmit the obtained information to the eNB. For example, in the corresponding operation, UE capability information including whether simultaneous beam updating for a plurality of carriers and BWPs is supported may be included. Two methods as follows are possible as an indication method for this.

1. First method for transmitting UE capability: 1-bit indicator is introduced to indicate whether the UE supports simultaneous beam updating for a plurality of carriers and BWPs. If it is indicated that the UE supports the corresponding capability, it is necessary to add a description that the corresponding capability is applied to all band combinations (including both intra-band BC and inter-band BC) included in the UE capability information.

(1-bit indicator per UE, UE support this feature for all supported BCs which UE reports to the gNB)

2. Second method for transmitting UE capability: an indicator indicating whether simultaneous beam updating for the plurality of carriers and BWPs is supported for each band combination supported by the UE is included and indicated. In embodiment 2-3, the indication information may be included in the BC not only for intra-band BC but also for inter-band BC.

(1-bit indicator per BC i.e. this feature can be supported for the among the CCs in the supported BC including intra-band and inter-band BC)

When the corresponding indicator is indicated as TRUE for the above-described UE capability transmission methods, the UE may equally apply the corresponding capability to all BWPs belonging to the UE or the component carrier of the BC for which the corresponding function is configured. Alternatively, a UE capability indicating that the corresponding capability is supported for each BWP may be added. In the case of indicating whether to support inter-band BC, the eNB should set actual configuration information in consideration of the MIMO capability indicated for each band, especially the tci-statePDSCH capability, as shown in Table 4 below.

TABLE 4

```
MIMO-ParametersPerBand ::= SEQUENCE {
    tci-StatePDSCH SEQUENCE {
        maxNumberConfiguredTCIstatesPerCC ENUMERATED {n4, n8, n16, n32, n64, n128} OPTIONAL,
        maxNumberActiveTCI-PerBWP ENUMERATED {n1, n2, n4, n8} OPTIONAL
}
```

In operation 2*f*-10, the eNB may transmit configuration information (ServingCellConfig) for configuring a plurality of serving cells and TRPs to the UE through an RRC message. The RRC message may include configuration information (PDCCH-Config, PDSCH-Config) for reception through PDCCH and PDSCH. In addition, BWP configuration (BWP-Uplink, BWP-Downlink), CORESET configuration, scrambling configuration, TCI state (TCI-State in PDSCH-Config) configuration may be included. In particular, TCI state-related configuration is provided for each downlink BWP and for each serving cell and is included in the PDCCH-Config and PDSCH-Config, respectively, and the beam configuration for PUCCH resource transmission may also be included in the PUCCH-Config. In embodiment 2-3, in operation 2*f*-10, a cell list and a BWP list to which simultaneous beam updating for the plurality of carriers and BWPs are applied are provided as the RRC message. Specifically, the serving cell list (e.g., SCell ID list) and BWP list (e.g., BWP ID list) information to which the same configuration as the TCI state applied to the corresponding serving cell and BWP is applied is configured may be added to the PDSCH-Config in which the TCI state. Cell list (e.g. SCell ID list) and BWP list (e.g. BWP ID list) information to which the corresponding function is applied at a level of CellGroupConfig or ServingCellConfig may be provided. In this case, the TCI state configuration for each cell group or serving cell should be applied identically, and the configuration can be applied to all serving cells and BWPs in the indicated list.

In operation 2*f*-15, the UE may receive a MAC CE indicating activation/deactivation of the TCI state for PDSCH reception from the eNB. As described in FIGS. 2*a* and 2*b*, the MAC CE is not actually used for data transmission and reception by activating a plurality of actually indicated beams, but may play a role of scale-down (or down selection) to beam that can be indicated by the DCI among beams configured by RRC. In this operation, the UE may receive a MAC CE indicating beam activation for an existing individual serving cell and BWP. Alternatively, a MAC CE indicating simultaneous beam updating for a plurality of newly defined carriers and BWPs. The specific MAC CE structure will be described later.

In operation 2*f*-20, the UE analyzes the MAC CE received in operation 2*f*-15 to determine whether the MAC CE indicates an operation, and then performs the related operation. If the received MAC CE indicates simultaneous beam updating for multiple carriers and BWPs (by assigning a new LCID or including indication information indicating the new LCID in the existing MAC CE field (e.g., a 1-bit indicator and applied SCell/BWP ID)), then in operation 2*f*-25, the UE may update all corresponding TCI states by applying the TCI state indicated by the received MAC CE to the carrier and BWP list configured in operation 2*f*-10. The serving cell ID and BWP ID indicated to the MAC CE in operation 2*f*-25 may be one of the serving cells and BWPs configured in the carrier and BWP list configured in operation 2*f*-10, and may be, for example, a PCell ID and a downlink active BWP ID. Since the corresponding serving cell and BWP configurations are already configured to be applied at the same time, the update of the TCI state can be applied to all configured serving cell IDs and BWP IDs even if any associated SCell ID/BWP ID is indicated. In operation 2*f*-30, the UE may determine beam actually used for PDSCH reception by receiving DCI from the activated BWP from each serving cell. Unlike the MAC CE operation in operation 2*f*-25, the corresponding operation may be individually indicated for each serving cell/BWP through the DCI. In operation 2*f*-35, the UE may perform data transmission/reception through the configured beam. In case where the TCI state activation/deactivation MAC CE is received again, operation 2*f*-20 is repeated.

When the MAC CE received by the UE in operation 2*f*-20 indicates beam activation for an individual serving cell and BWP (i.e., in the case of an existing MAC CE: a case in which an existing LCID is allocated or a case in which indication information indicating the update of the beam for the plurality of serving cells and BWPs is not included in the existing MAC CE field), the UE may update the TCI state of the serving cell and the BWP by applying the TCI state indicated by the MAC CE received in operation 2*f*-40. In operation 2*f*-45, the BWP activated from each serving cell receives the DCI, determines the beam actually used for PDSCH reception, and transmits/receives data in operation 2*f*-50 through the corresponding beam. When the TCI state activation/deactivation MAC CE is received again, operation 2*f*-20 may be repeated.

Figure 2G:
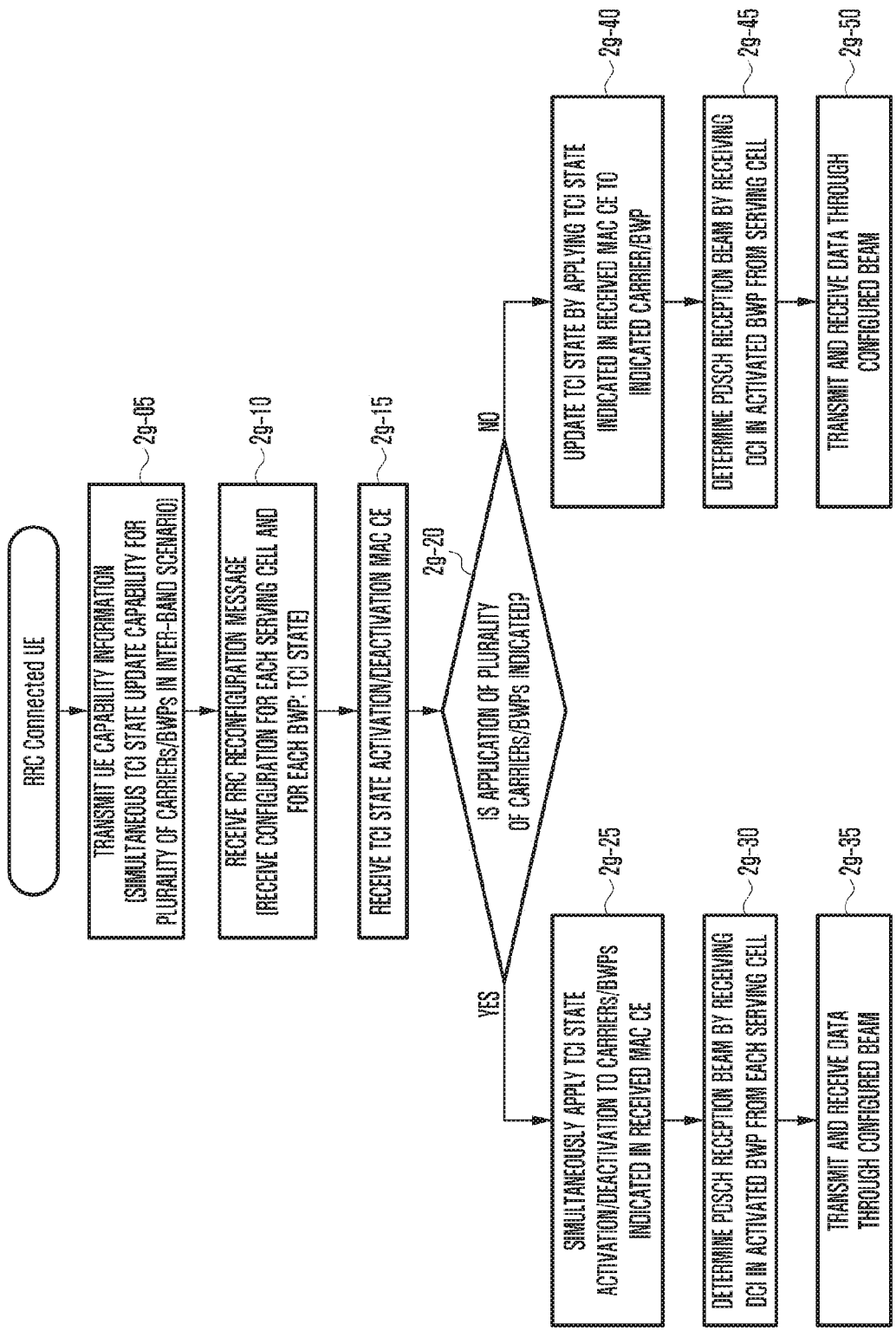
FIG. 2G is a diagram illustrating a method 2-4 of simultaneously updating a TCI state in all configured carriers and BWPs through one TCI state activation/deactivation MAC CE with respect to a plurality of carriers and BWPs in a situation where inter-band CA is applied according to an embodiment of the disclosure (specifying corresponding carrier/BWP information in MAC CE)

FIG. 2G is a diagram illustrating a method 2-4 of simultaneously updating a TCI state in all configured carriers and BWPs through one TCI state activation/deactivation MAC CE with respect to a plurality of carriers and BWPs in a situation where inter-band CA is applied according to embodiment according to an embodiment of the disclosure (specifying corresponding carrier/BWP information in MAC CE).

Referring to FIG. 2G, UE in an RRC connected state may generate and receive UE capability information in response to a UE capability request message of an eNB in operation 2*g*-05 and transmit the obtained information to the eNB. For example, in operation 2*g*-05, UE capability information including whether simultaneous beam updating for a plurality of carriers and BWPs is supported may be included. Two methods as follows are possible as an indication method for this.

1. First method for transmitting UE capability: 1-bit indicator is introduced to indicate whether the UE supports simultaneous beam updating for a plurality of carriers and BWPs. If it is indicated that the UE supports the corresponding capability, it is necessary to add a description that the corresponding capability is applied to all band combinations (including both intra-band BC and inter-band BC) included in the UE capability information.

(1-bit indicator per UE, UE support this feature for all supported BCs which UE reports to the gNB)

2. Second method for transmitting UE capability: an indicator indicating whether simultaneous beam updating for the plurality of carriers and BWPs is supported for each band combination supported by the UE is included and indicated. In embodiment 4, the indication information may be included in the BC not only for intra-band BC but also for inter-band BC.

(1-bit indicator per BC i.e. this feature can be supported for the among the CCs in the supported BC including intra-band and inter-band BC)

When the corresponding indicator is indicated as TRUE for the above-described UE capability transmission methods, the UE may equally apply the corresponding capability to all BWPs belonging to the UE or the component carrier of the BC for which the corresponding function is configured. Alternatively, a UE capability indicating that the corresponding capability is supported for each BWP may be added. In the case of indicating whether to support inter-band BC, the eNB should set actual configuration information in consideration of the MIMO capability indicated for each band, especially the tci-statePDSCH capability, as shown in Table 5 below.

TABLE 5

```
MIMO-ParametersPerBand ::= SEQUENCE {
    tci-StatePDSCH SEQUENCE {
        maxNumberConfiguredTCIstatesPerCC ENUMERATED {n4, n8, n16,
n32, n64, n128} OPTIONAL,
        maxNumberActiveTCI-PerBWP ENUMERATED {n1, n2, n4, n8}
OPTIONAL
}
```

In operation 2g-10, the eNB may transmit configuration information (ServingCellConfig) for configuring a plurality of serving cells and TRPs to the UE through an RRC message. The RRC message may include configuration information (PDCCH-Config, PDSCH-Config) for reception through PDCCH and PDSCH. In addition, BWP configuration (BWP-Uplink, BWP-Downlink), CORESET configuration, scrambling configuration, TCI state (TCI-State in PDSCH-Config) configuration may be included. For example, TCI state-related configuration is provided for each downlink BWP and for each serving cell and is included in the PDCCH-Config and PDSCH-Config, respectively, and the beam configuration for PUCCH resource transmission may also be included in the PUCCH-Config. whether the plurality of carriers and BWPs are configured may be indicated in the corresponding RRC configuration. This can be seen by configuring the 1-bit indicator.

In operation 2g-15, the UE may receive a MAC CE indicating activation/deactivation of the TCI state for PDSCH reception from the eNB. As described in FIGS. 2a and 2b, the MAC CE is not actually used for data transmission and reception by activating a plurality of actually indicated beams, but may play a role of scale-down (or down selection) to beam that can be indicated by the DCI among beams configured by RRC. In embodiment 4, a method is proposed in which the configuration of the existing Rel-15 is used as it is without additional configuration in the RRC configuration information of operation 2e-10, and a new MAC CE is introduced and a new MAC CE is received in the corresponding operation to indicate beam activation for the plurality of serving cells and BWP. Specifically, this is a method in which all Serving Cells and BWP identifiers to which beam update is applied in one new MAC CE are specified. In this operation, the UE may receive a MAC CE indicating beam activation for an existing individual serving cell and BWP. Alternatively, a MAC CE indicating simultaneous beam updating for a plurality of newly defined carriers and BWPs may be received. The specific MAC CE structure will be described later.

In operation 2g-20, the UE analyzes the MAC CE received in operation 2g-15 to determine whether the MAC CE indicates an operation, and then performs the related operation. If the received MAC CE indicates simultaneous beam updating for multiple carriers and BWPs (by assigning a new LCID or including indication information indicating the new LCID in the existing MAC CE field (e.g., a 1-bit indicator and applied SCell/BWP ID)), then in operation 2g-25, the UE may update all corresponding TCI states by applying the TCI state indicated by the received MAC CE to the indicated all carrier and BWP lists. The serving cell and BWP to which the MAC CE is transmitted in operation 2g-25 may be one configured serving cell and BWP, and may be, for example, a downlink active BWP ID of PCell. In operation 2g-30, by receiving the DCI from the activated BWP from each serving cell, it is possible to determine the beam actually used for PDSCH reception. Unlike the MAC CE operation in 2g-25, the corresponding operation may be individually indicated for each serving cell/BWP through the DCI. In operation 2g-35, the UE performs data transmission/reception through the configured beam, and if the UE receives the TCI state activation/deactivation MAC CE again, operation 2g-20 may be repeated.

When the MAC CE received by the UE in operation 2g-20 indicates beam activation for an individual serving cell and BWP (i.e., in the case of an existing MAC CE: a case in which an existing LCID is allocated or a case in which indication information indicating the update of the beam for the plurality of serving cells and BWPs is not included in the existing MAC CE field), the UE may update the TCI state of the serving cell and the BWP by applying the TCI state indicated by the MAC CE received in operation 2g-40. In operation 2g-45, the BWP activated from each serving cell receives the DCI, determines the beam actually used for PDSCH reception, and transmits/receives data in operation 2d-50 through the corresponding beam. When the TCI state activation/deactivation MAC CE is received again, operation 2g-20 may be repeated.

Figure 2H:
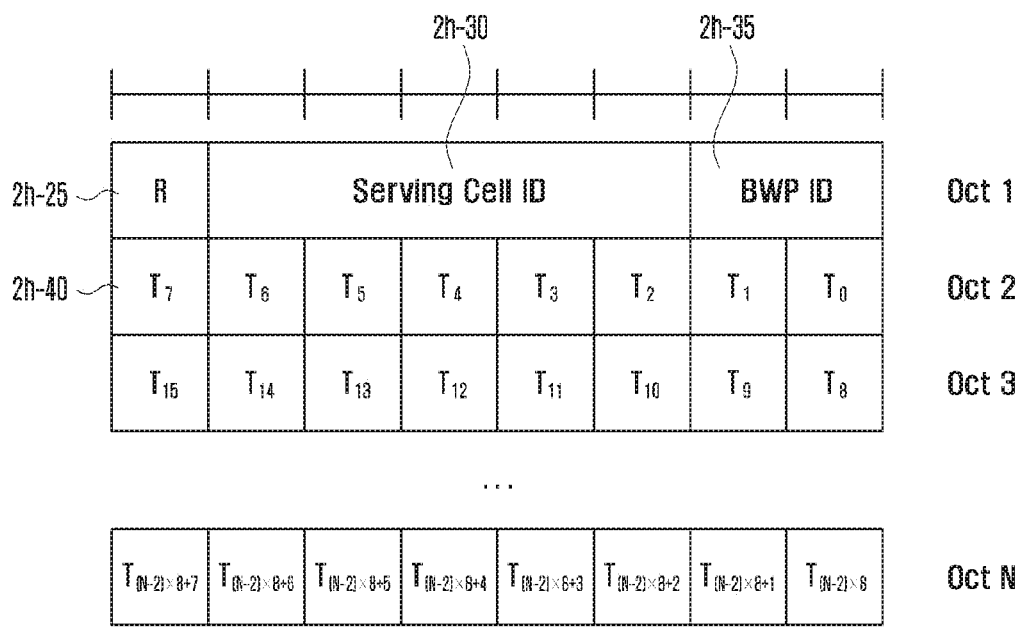
FIGS. 2HA, 2HB, 2HC, 2HD, and 2HE are diagrams illustrating an operation of simultaneously updating a TCI state for a plurality of carriers and BWPs, according to various embodiments of the disclosure.
Figure 2H:
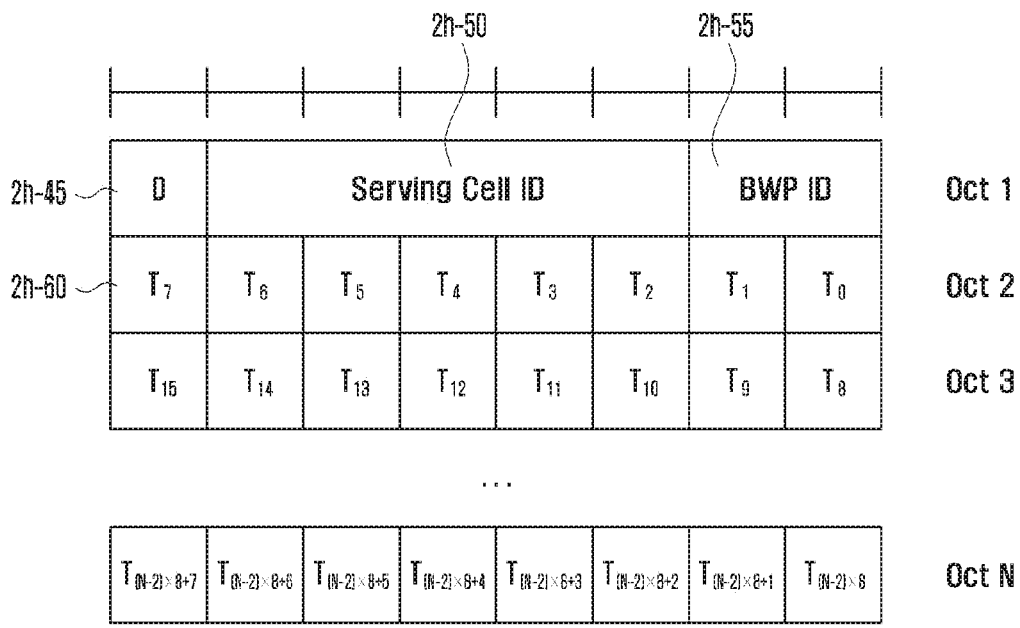
Figure 2H:
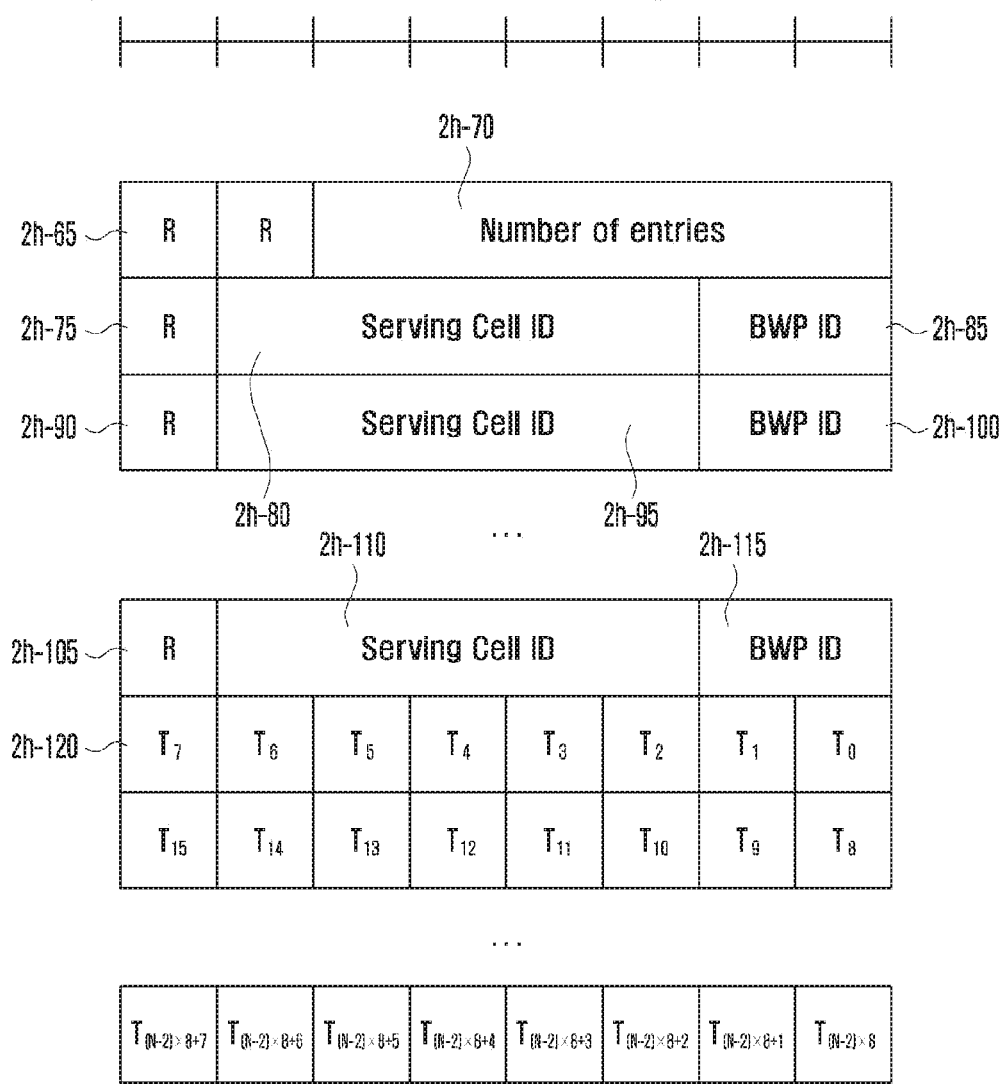
Figure 2H:
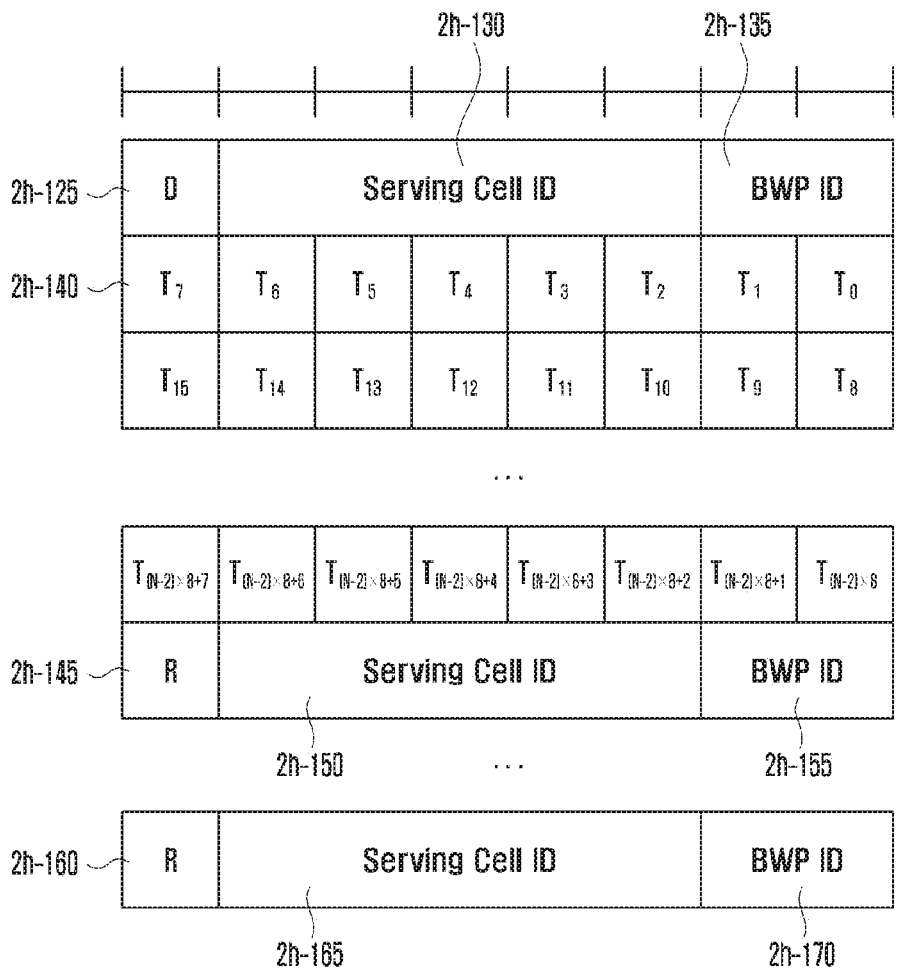

FIGS. 2HA, 2HB, 2HC, 2HD, and 2HE are diagrams illustrating an operation of simultaneously updating a TCI state for a plurality of carriers and BWPs, according to various embodiments of the disclosure.

Referring to FIGS. 2HA-2HE, based on "TCI States Activation/Deactivation for UE-specific PDSCH MAC CE" currently defined in Rel-15, it is possible to change to a new MAC CE or add a new field. As shown in FIG. 2HA, the existing MAC CE structure is composed of a reserved bit of 2h-05, a serving cell ID 2h-10, and a BWP ID 2h-15, and is composed of TCI state bitmap "T" fields 2h-20 in which activation is indicated. Through the existing MAC CE, it is possible to indicate downlink activation candidate beam for one serving cell.

In this disclosure, a first method (mapping corresponding carrier/BWP information mapping to RRC configuration) of simultaneously updating the TCI state in all configured carriers and BWPs through one TCI state activation/deactivation MAC CE and a second method (specifying corresponding carrier/BWP information to MAC CE) are proposed. For the two methods, basically used MAC CE structures are different from each other.

First, the MAC CE structure applied to the first method of providing a cell/BWP list for simultaneous beam updating of a plurality of carriers and BWPs through RRC configuration and updating the beam of the corresponding cell/BWP to the MAC CE will be described (embodiment 2-1 and embodiment 2-3).

Option 1: The existing MAC CE structure is used as it is, and a new LCID is introduced to use it as a new MAC CE. As shown in FIG. 2hb, the MAC CE structure is composed of a reserved bit of 2h-25, a serving cell ID 2h-30, and a BWP ID 2h-35, and a TCI state bitmap "T" field in which activation is indicated, and is composed of a TCI state bitmap "T" field 2h-40 in which activation is indicated. First, the UE can know that the corresponding MAC CE is a MAC CE for simultaneous beam updating of a plurality of carriers and BWPs through the LCID. Through the MAC CE, one serving cell and BWP among serving cell/BWP mapping provided by the previous RRC configuration can be specified, and when receiving the corresponding information, the UE may perform simultaneous beam updating with respect to all serving cells and BWPs configured as RRC.

Option 2: The existing MAC CE can be extended to be used as a MAC CE for simultaneous beam updating of multiple carriers and BWPs. As shown in FIG. 2hc, the existing LCID is used as it is, and the MAC CE is composed of a simultaneous beam updating indication (D) of 2h-45, a serving cell ID 2h-50, and a BWP ID 2h-55, and is composed of a TCI state bitmap "T" field 2h-60 in which activation is indicated. The UE can know whether the corresponding MAC CE is a MAC CE for simultaneous beam updating of a plurality of carriers and BWPs or a MAC CE for the existing individual carrier and BWP through the simultaneous beam updating branch (D) of 2h-45.

In the above option 1 and option 2, information (list) on the carrier and the BWP to which the simultaneous beam updating is applied is not provided, and the corresponding information may be received by RRC configuration in advance.

In the following, the MAC CE structure applied to the second method of providing and updating a cell/BWP list for simultaneous beam updating of a plurality of carriers and BWPs only through a MAC CE without receiving information (list) on the carrier and BWP to which the simultaneous beam updating is applied in RRC configuration will be described (embodiment 2-2 and embodiment 2-4).

Option 3: A new LCID is introduced and used as a new MAC CE. As shown in FIG. 2HD, in the MAC CE structure, reserved bits of 2h-65 and an indicator 2h-70 indicating the number of serving cells and BWPs to which the corresponding MAC CE is applied are introduced, and then the serving cell and BWP ID information is consecutively included as many as the number indicated in 2h-70. Specifically, the MAC CE structure is composed of reserved bits 2h-75, 2h-90, and 2h-105, serving cell IDs 2h-80, 2h-95, and 2h-110, BWP IDs 2h-85, 2h-100, and 2h-115, and may be composed of a TCI state bitmap "T" field 2h-120 in which activation is indicated. First, the UE can know that the corresponding MAC CE is a MAC CE for simultaneous beam updating of the plurality of carriers and BWPs through the LCID. With reference to the information transmitted through the MAC CE, the UE may perform simultaneous beam updating for all indicated serving cells and BWPs.

Figure 2I:
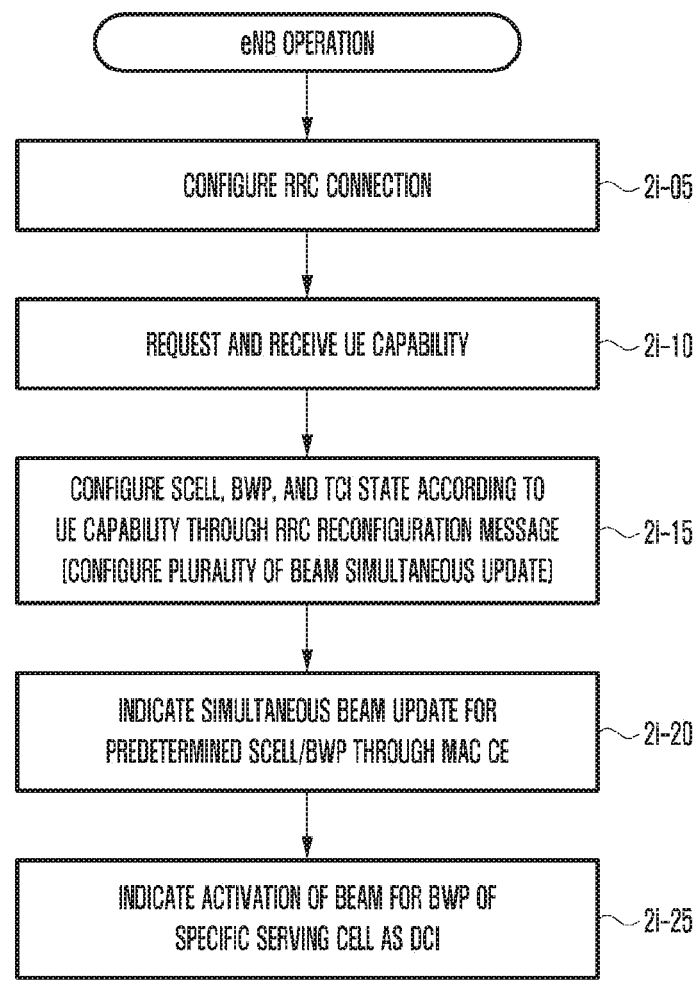
FIG. 2I is a diagram illustrating an overall operation of an eNB according to an embodiment of the disclosure.

Option 4: The existing MAC CE can be extended to be used as a MAC CE for simultaneous beam updating of multiple carriers and BWPs. As shown in FIG. 2I-1E, the existing LCID is used as it is, and the MAC CE is composed of a simultaneous beam updating indication (D) of 2h-125, a serving cell ID 2h-130, and a BWP ID 2h-135, and is composed of a TCI state bitmap "T" field 2h-140 in which activation is indicated. Information of the serving cell and BWP ID added afterwards may be continuously included. The MAC CE may be composed of reserved bits 2h-145 and 2h-160, serving cell IDs 2h-150 and 2h-165, and BWP IDs 2h-155 and 2h-170. The UE can know whether the corresponding MAC CE is a MAC CE for simultaneous beam updating of the plurality of carriers and BWPs or a MAC CE for an existing individual carrier and BWP through the simultaneous beam updating branch (D) of 2h-125.

FIG. 2I is a diagram illustrating an overall operation of an eNB according to an embodiment of the disclosure.

Referring to FIG. 2I, in operation 2i-05, an eNB may establish an RRC connection state with a UE. In operation 2i-10, UE capability may be requested from the UE, and corresponding UE capability information may be received. The eNB may analyze the UE capability received in the above operation and determine whether the UE has capability for simultaneous beam updating operation for a plurality of carriers and BWPs. In addition, it is possible to confirm whether the eNB has configured the corresponding function (it is possible to confirm whether the corresponding function is applicable to intra-band BC or inter-band BC).

After the above confirmation is completed, in operation 2i-15, the eNB may provide, to the UE, configuration information related to the simultaneous beam updating operation for the plurality of carriers and BWPs according to the UE capability through an RRC message. This corresponds to embodiments 2-1 and 2-3 of the disclosure, and in embodiments 2-2 and 2-4, additional information is not provided in the above operation. If the UE does not have the corresponding capability or the eNB determines that the configuration is not necessary, configuration information required for the simultaneous beam updating operation for the plurality of carriers and BWPs may not be provided, but configuration information for one basic TRP operation may be provided.

In operation 2i-20, based on PDSCH beam configuration information configured by the RRC (including information on the simultaneous beam updating operation for the plurality of carriers and BWPs), the eNB may instruct the beam update by delivering the MAC CE for beam update for a specific carrier and BWP. In this operation, the existing TCI state activation MAC CE may be used. In operation 2i-25, the eNB may indicate the beam information used for data communication by instructing the DCI to activate the beam for the BWP of the specific serving cell and may use the indicated beam information.

Figure 2J:
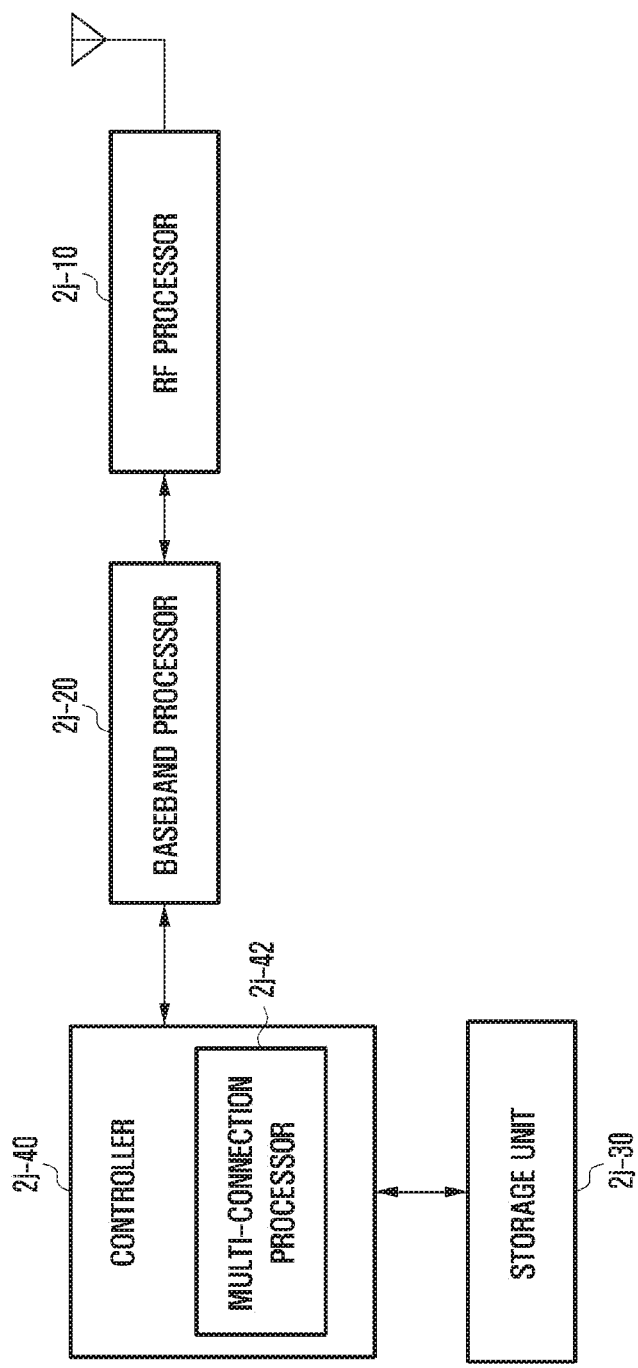
FIG. 2J is a block diagram illustrating an internal structure of a UE according to an embodiment of the disclosure.

FIG. 2J is a block diagram illustrating an internal structure of a UE according to an embodiment the disclosure.

Referring to FIG. 2J, a UE includes a radio frequency (RF) processor 2j-10, a baseband processor 2j-20, a storage unit 2j-30, and a controller 2j-40.

The RF processor 2j-10 transmits and receives signals through a wireless channel, such as band conversion and amplification of the signal. The RF processor 2j-10 up-converts a baseband signal provided from the baseband processor 2j-20 to an RF band signal, transmits the obtained signal through an antenna, and up-converts the RF band received through the antenna into a baseband signal. For example, the RF processor 2j-10 may include a transmission filter, a reception filter, an amplifier, a mixer, an oscillator, a digital to analog convertor (DAC), an analog to digital convertor (ADC), and the like. In the drawing, only one antenna is shown, but the UE may include a plurality of antennas. In addition, the RF processor 2j-10 may include a plurality of RF chains. Furthermore, the RF processor 2j-10 may perform beamforming. For the beamforming, the RF processor 2j-10 may adjust the phase and magnitude of each of signals transmitted/received through a plurality of antennas or antenna elements. In addition, the RF processor may perform MIMO, and may receive multiple layers when performing the MIMO operation.

The baseband processor 2j-20 converts between a baseband signal and a bit stream according to the physical layer standard of the system. For example, when transmitting data, the baseband processor 2j-20 generates complex symbols by encoding and modulating a transmitted bit stream. In addition, when receiving data, the baseband processor 2j-20 restores the received bit stream through demodulation and decoding of the baseband signal provided from the RF processor 2j-10. For example, in the case of an orthogonal frequency division multiplexing (OFDM) scheme, when transmitting data, the baseband processor 2j-20 generates complex symbols by encoding and modulating a transmitted bit stream, maps the complex symbols to subcarriers, and then configures OFDM symbols through an inverse fast Fourier transform (IFFT) operation and a cyclic prefix (CP) insertion. In addition, when receiving data, the baseband processor 2j-20 divides the baseband signal provided from the RF processor 2j-10 in units of OFDM symbols, restores signals mapped to subcarriers through a fast Fourier transform (FFT) operation, and then restores a received bit stream through demodulation and decoding.

The baseband processor 2j-20 and the RF processor 2j-10 transmit and receive signals as described above. Accordingly, the baseband processor 2j-20 and the RF processor 2j-10 may be referred to as a transmitter, a receiver, a transceiver, or a communication unit. Furthermore, at least one of the baseband processor 2j-20 and the RF processor 2j-10 may include a plurality of communication modules to support a plurality of different radio access technologies. In addition, at least one of the baseband processor 2j-20 and the RF processor 2j-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.NRHz, NRhz) band, and a millimeter wave (e.g., 60 GHz) band.

The storage unit 2j-30 stores data such as a basic program, an application program, and configuration information for the operation of a UE. In particular, the storage unit 2j-30 may store information related to a second access node that performs wireless communication using a second radio access technology. In addition, the storage unit 2j-30 provides stored data according to the request of the controller 2j-40.

The controller 2j-40 controls overall operations of the UE. For example, the controller 2j-40 transmits and receives signals through the baseband processor 2j-20 and the RF processor 2j-10. In addition, the controller 2j-40 writes and reads data in the storage unit 2j-40. To this end, the controller 2j-40 may include at least one processor. For example, the controller 2j-40 may include a communication processor (CP) that controls communication and an application processor (AP) that controls higher layers such as an application program. The controller 2j-40 may further include a multi-connection processor 2j-42 for supporting multiple connections.

Figure 2K:
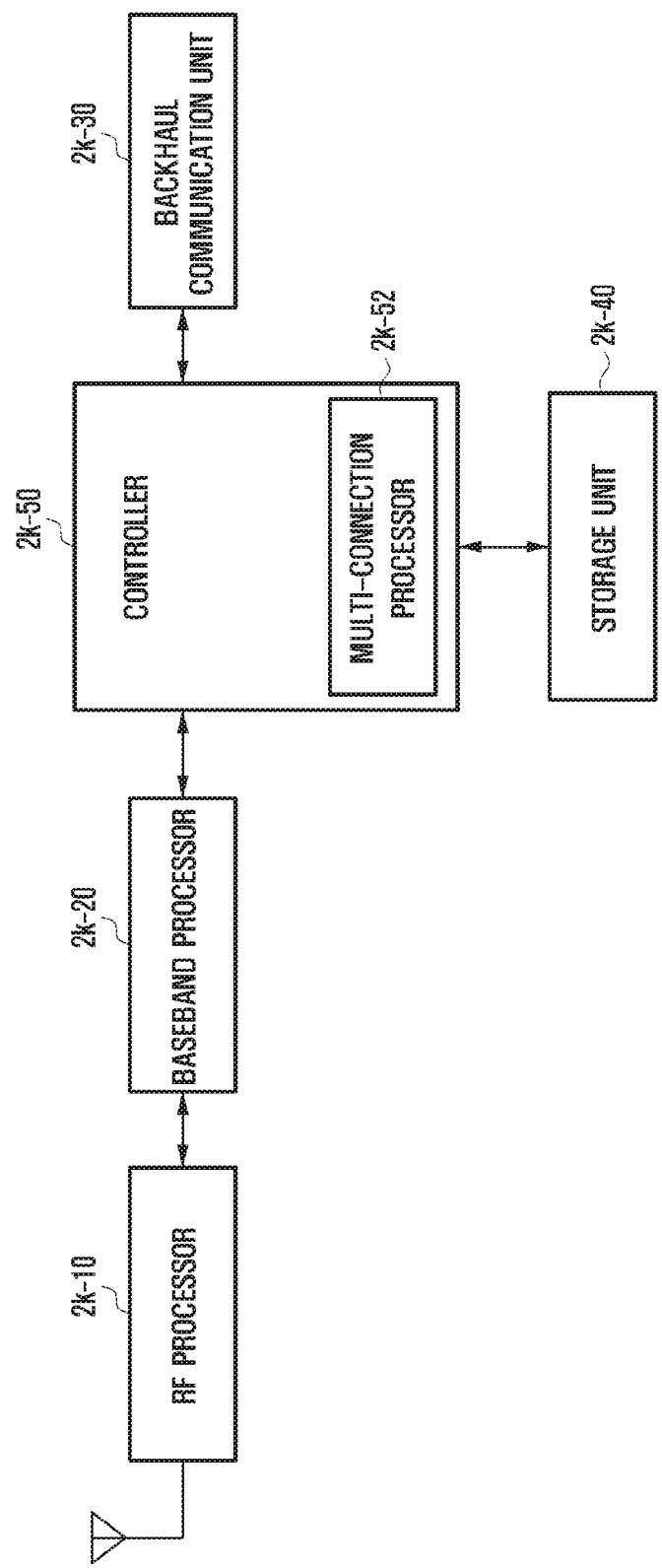
FIG. 2K is a block diagram illustrating a configuration of an NR eNB according to and embodiment of the disclosure.

FIG. 2K is a block diagram illustrating a configuration of an NR eNB according to an embodiment of the disclosure.

Referring to FIG. 2K, an eNB includes an RF processor 2k-10, a baseband processor 2k-20, a backhaul communication unit 2k-30, a storage unit 2k-40, and a controller 2k-50.

The RF processor 2k-10 transmits and receives signals through a wireless channel such as band conversion and amplification of the signals. The RF processor 2k-10 up-converts a baseband signal provided from the baseband processor 2k-20 to an RF band signal, transmits the obtained signal through an antenna, and down-converts the RF band signal received through the antenna into a baseband signal. For example, the RF processor 2k-10 may include a transmission filter, a reception filter, an amplifier, a mixer, an oscillator, a DAC, an ADC, and the like. In the drawing, only one antenna is shown, but the first access node may include a plurality of antennas. In addition, the RF processor 2k-10 may include a plurality of RF chains. Furthermore, the RF processor 2k-10 may perform beamforming. For the beamforming, the RF processor 2k-10 may adjust the phase and magnitude of each of signals transmitted and received through the plurality of antennas or antenna elements. The RF processor may perform a downlink MIMO operation by transmitting one or more layers.

The baseband processor 2k-20 performs a function of converting between a baseband signal and a bit stream according to a physical layer standard of a first radio access technology. For example, when transmitting data, the baseband processor 2k-20 generates complex symbols by encoding and modulating a transmitted bit stream. In addition, when receiving data, the baseband processor 2k-20 restores a received bit stream through demodulation and decoding of the baseband signal provided from the RF processor 2k-10. For example, in the case of the OFDM scheme, when transmitting data, the baseband processor 2k-20 generates complex symbols by encoding and modulating a transmitted bit stream, maps the complex symbols to subcarriers, and then configures the OFDM symbols through an IFFT operation and CP insertion. In addition, when receiving data, the baseband processor 2k-20 divides the baseband signal provided from the RF processor 2k-10 in units of OFDM symbols, restores the signals mapped to the subcarriers through an FFT operation, and then restores a received bit stream through demodulation and decoding. The baseband processor 2k-20 and the RF processor 2k-10 transmit and receive signals as described above. Accordingly, the baseband processor 2k-20 and the RF processor 2k-10 may be referred to as a transmitter, a receiver, a transceiver, a communication unit, or a wireless communication unit.

The backhaul communication unit 2k-30 provides an interface for performing communication with other nodes in a network. The backhaul communication unit 2k-30 converts a bit stream transmitted from the primary eNB to another node, for example, an auxiliary eNB, a core network, etc., into a physical signal, and converts the physical signal received from the other node into a bit stream.

The storage unit 2k-40 stores data such as a basic program, an application program, and configuration information for the operation of the primary eNB. In particular, the storage unit 2k-40 may store information on a bearer allocated to the connected UE, measurement results reported from the connected UE, and the like. In addition, the storage unit 2k-40 may store information that is a criterion for determining whether to provide or stop multiple connections to the UE. In addition, the storage unit 2k-40 provides stored data according to the request of the controller 2k-50.

The controller 2k-50 controls overall operations of the primary eNB. For example, the controller 2k-50 transmits and receives signals through the baseband processor 2k-20 and the RF processor 2k-10 or through the backhaul communication unit 2k-30. The controller 2k-50 writes and reads data in the storage unit 2k-40. To this end, the controller 2k-50 may include at least one processor. For example, the controller 2k-50 may include a communication processor (CP) that controls communication and an application processor (AP) that controls an upper layer such as an application program. The controller 2k-50 may further include a multi-connection processor 2k-52 for supporting multiple connections.

Methods disclosed in the claims and/or methods according to various embodiments of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

In addition, a specific embodiment may be partially or completely combined with some or all of one or more other embodiments to be performed as another embodiment.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving a radio resource control (RRC) message configuring a plurality of transmission configuration indicator (TCI) states associated with a physical downlink shared channel (PDSCH) and a control resource set (CORESET) configuration for a bandwidth part (BWP) of a serving cell;
   receiving a medium access control (MAC) control element (CE) including information bits corresponding to the plurality of TCI states and 1 bit indicating that at least one activated TCI state among the plurality of TCI states is associated with a transmission and reception point (TRP) which is one of a first TRP or a second TRP, wherein one bit of the information bits indicates an activation state or a deactivation state of each TCI state among the plurality of TCI states, and wherein the first TRP and the second TRP are for the BWP of the serving cell;
   receiving, from the TRP, downlink control information (DCI) scheduling a PDSCH, the DCI including TCI information indicating a TCI state for the PDSCH from the at least one activated TCI state for the TRP; and
   receiving, from the TRP, the PDSCH scheduled by the DCI based on the TCI state indicated by the TCI information,
   wherein the TRP is identified by a value of the 1 bit from the first TRP or the second TRP, based on the CORESET configuration for the BWP of the serving cell, the CORESET configuration being configured with an index for the CORESET.

2. The method of claim 1, wherein PDSCHs scheduled by a first physical downlink control channel (PDCCH) from the first TRP and a second PDCCH from the second TRP overlap in time and frequency domain.

3. A method performed by a transmission and reception point (TRP) in a wireless communication system, the method comprising:
   transmitting, to a terminal, a radio resource control (RRC) message configuring a plurality of transmission configuration indicator (TCI) states associated with a physical downlink shared channel (PDSCH) and a control resource set (CORESET) configuration for a bandwidth part (BWP) of a serving cell;
   transmitting, to the terminal, a medium access control (MAC) control element (CE) including information bits corresponding to the plurality of TCI states and 1 bit indicating that at least one activated TCI state among the plurality of TCI states is associated with a transmission and reception point (TRP) which is one of a first TRP or a second TRP, wherein one bit of the information bits indicates an activation state or a deactivation state of each TCI state among the plurality of TCI states, and wherein the first TRP and the second TRP are for the BWP of the serving cell;

transmitting, to the terminal, downlink control information (DCI) scheduling a PDSCH, the DCI including TCI information indicating a TCI state for the PDSCH from the at least one activated TCI state for the TRP; and transmitting, to the terminal, the PDSCH scheduled by the DCI based on the TCI state indicated by the TCI information, wherein the TRP is identified by a value of the 1 bit from the first TRP or the second TRP, based on the CORESET configuration for the BWP of the serving cell, the CORESET configuration being configured with an index for the CORESET.

4. The method of claim 3, wherein PDSCHs scheduled by a first physical downlink control channel (PDCCH) from the first TRP and a second PDCCH from the second TRP overlap in time and frequency domain.

5. A terminal in a wireless communication system, the terminal comprising:
a transceiver configured to transmit and receive a signal; and
a processor configured to:
receive a radio resource control (RRC) message configuring a plurality of transmission configuration indicator (TCI) states associated with a physical downlink shared channel (PDSCH) and a control resource set (CORESET) configuration for a bandwidth part (BWP) of a serving cell,
receive a medium access control (MAC) control element (CE) including information bits corresponding to the plurality of TCI states and 1 bit indicating that at least one activated TCI state among the plurality of TCI states is associated with a transmission and reception point (TRP) which is one of a first TRP or a second TRP, wherein one bit of the information bits indicates an activation state or a deactivation state of each TCI state among the plurality of TCI states, and wherein the first TRP and the second TRP are for the BWP of the serving cell,
receive, from the TRP, downlink control information (DCI) scheduling a PDSCH, the DCI including TCI information indicating a TCI state for the PDSCH from the at least one activated TCI state for the TRP, and
receive, from the TRP, the PDSCH scheduled by the DCI based on the TCI state indicated by the TCI information,
wherein the TRP is identified by a value of the 1 bit from the first TRP or the second TRP, based on the CORESET configuration for the BWP of the serving cell, the CORESET configuration being configured with an index for the CORESET.

6. The terminal of claim 5, wherein PDSCHs scheduled by a first physical downlink control channel (PDCCH) from the first TRP and a second PDCCH from the second TRP overlap in time and frequency domain.

7. A transmission and reception point (TRP) in a wireless communication system, the TRP comprising:
a transceiver configured to transmit and receive a signal; and
a processor configured to:
transmit, to a terminal, a radio resource control (RRC) message configuring a plurality of transmission configuration indicator (TCI) states associated with a physical downlink shared channel (PDSCH) and a control resource set (CORESET) configuration for a bandwidth part (BWP) of a serving cell,
transmit, to the terminal, a medium access control (MAC) control element (CE) including information bits corresponding to the plurality of TCI states and 1 bit indicating that at least one activated TCI state among the plurality of TCI states is associated with a transmission and reception point (TRP) which is one of a first TRP or a second TRP, wherein one bit of the information bits indicates an activation state or a deactivation state of each TCI state among the plurality of TCI states, and wherein the first TRP and the second TRP are for the BWP of the serving cell,
transmit, to the terminal, downlink control information (DCI) scheduling a PDSCH, the DCI including TCI information indicating a TCI state for the PDSCH from the at least one activated TCI state for the TRP, and transmit, to the terminal, the PDSCH scheduled by the DCI based on the TCI state indicated by the TCI information,
wherein the TRP is identified by a value of the 1 bit from the first TRP or the second TRP, based on the CORESET configuration for the BWP of the serving cell, the CORESET configuration being configured with an index for the CORESET.

8. The TRP of claim 7, wherein PDSCHs scheduled by a first physical downlink control channel (PDCCH) from the first TRP and a second PDCCH from the second TRP are overlapped in time and frequency domain.

* * * * *